(12) United States Patent
Yanai et al.

(10) Patent No.: US 9,285,570 B2
(45) Date of Patent: Mar. 15, 2016

(54) ZOOM LENS AND IMAGE PICKUP APPARATUS USING THE SAME

(71) Applicant: OLYMPUS IMAGING CORP., Tokyo (JP)

(72) Inventors: Tetsuya Yanai, Tokyo (JP); Minoru Ueda, Kanagawa (JP); Mayu Miki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 90 days.

(21) Appl. No.: 13/785,905

(22) Filed: Mar. 5, 2013

(65) Prior Publication Data

US 2013/0258498 A1 Oct. 3, 2013

(30) Foreign Application Priority Data

Mar. 30, 2012 (JP) ................................. 2012-082027
Mar. 30, 2012 (JP) ................................. 2012-082028

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)

(58) Field of Classification Search
CPC ...... G02B 15/173; G02B 15/14; G02B 13/18; G02B 13/009; G02B 13/0045; G02B 15/177; G02B 15/20
USPC ......... 359/676, 690, 687, 683, 686, 708, 715, 359/771–774, 685; 348/360, 240.3, 240.99
See application file for complete search history.

(56) References Cited

U.S. PATENT DOCUMENTS 6,449,433 B2    9/2002  Hagimori et al.
7,522,349 B2 *  4/2009  Eguchi ........................ 359/687

(Continued)

FOREIGN PATENT DOCUMENTS

JP    2001-350093    12/2001
JP    2001-356269    12/2001

(Continued)

OTHER PUBLICATIONS

Office Action (with English translation) issued Nov. 18, 2015 in counterpart Japanese Patent Application No. 2012-082027.

(Continued)

*Primary Examiner* — Scott J Sugarman
*Assistant Examiner* — Mustak Choudhury
(74) *Attorney, Agent, or Firm* — Kenyon & Kenyon LLP

(57) ABSTRACT

A zoom lens comprises in order from an object side,
  a first lens unit having a positive refractive power,
  a second lens unit having a negative refractive power, and
  a third lens unit having a positive refractive power, and
  the third unit having a positive refractive power comprises in order from the object side,
  a first lens component having a positive refractive power, and
  a second lens component having a negative refractive power in which, a lens having a positive refractive power and a lens having a negative refractive power are cemented, and
  the zoom lens satisfies the following conditional expressions (1), (2), and (3)

$1.4 < |f_{3\_2p}/f_{3\_2n}| < 2.6$  (1)

$n_{d3\_2p} - n_{d3\_2n} \geq 0$  (2)

$n_{d3\_2n} \geq 1.8$  (3).

10 Claims, 27 Drawing Sheets

(56) References Cited

U.S. PATENT DOCUMENTS

| | | |
|---|---|---|
| 7,724,447 B2 | 5/2010 | Miyazaki |
| 7,835,084 B2 | 11/2010 | Miyazawa |
| 7,864,443 B2 | 1/2011 | Sudoh et al. |
| 8,144,402 B2 | 3/2012 | Kim |
| 8,169,712 B2 | 5/2012 | Kakimoto |
| 8,767,312 B2 | 7/2014 | Adachi et al. |

FOREIGN PATENT DOCUMENTS

| | | |
|---|---|---|
| JP | 2003-207715 | 7/2003 |
| JP | 2004-061676 | 2/2004 |
| JP | 2006-208803 | 8/2006 |
| JP | 2007-148056 | 6/2007 |
| JP | 2007-293052 | 11/2007 |
| JP | 2008-039838 | 2/2008 |
| JP | 2008-310222 | 12/2008 |
| JP | 2009-058868 | 3/2009 |
| JP | 2009-236973 | 10/2009 |
| JP | 2010-217478 | 9/2010 |
| JP | 2011-203387 | 10/2011 |

OTHER PUBLICATIONS

Office Action (with English translation) issued Nov. 18, 2015 in counterpart Japanese Patent Application No. 2012-082028.

* cited by examiner

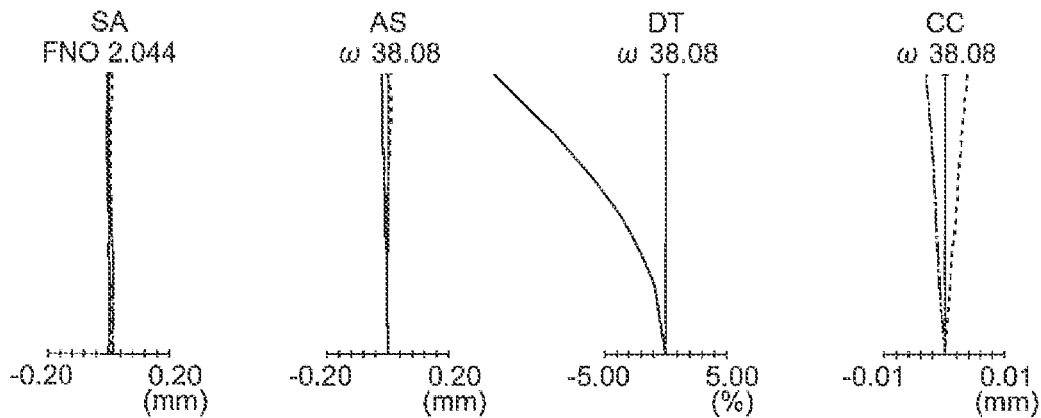
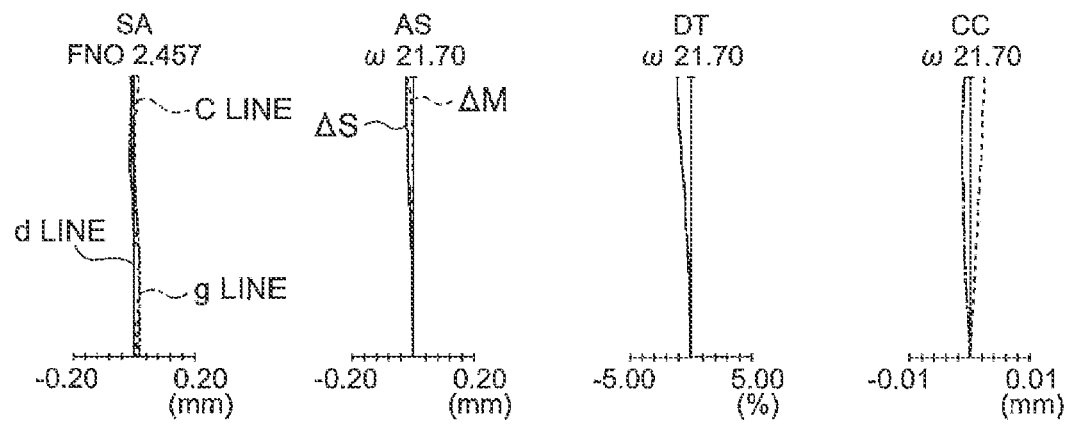
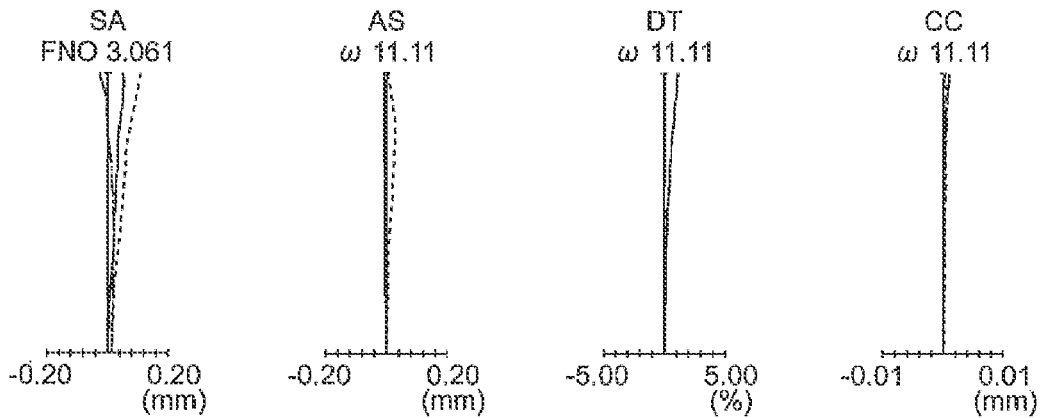

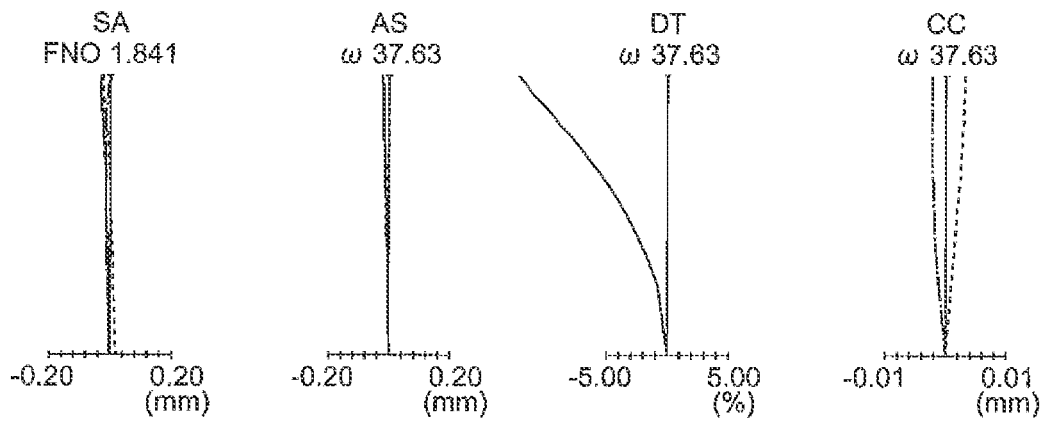
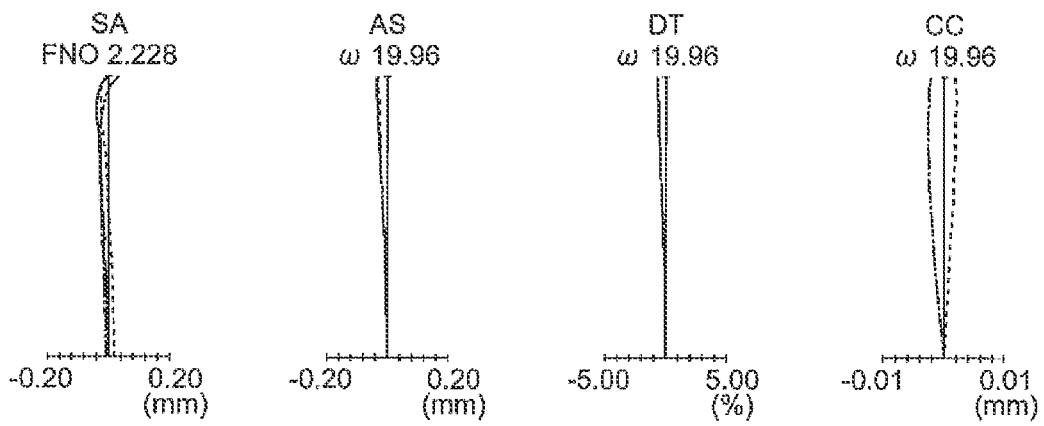
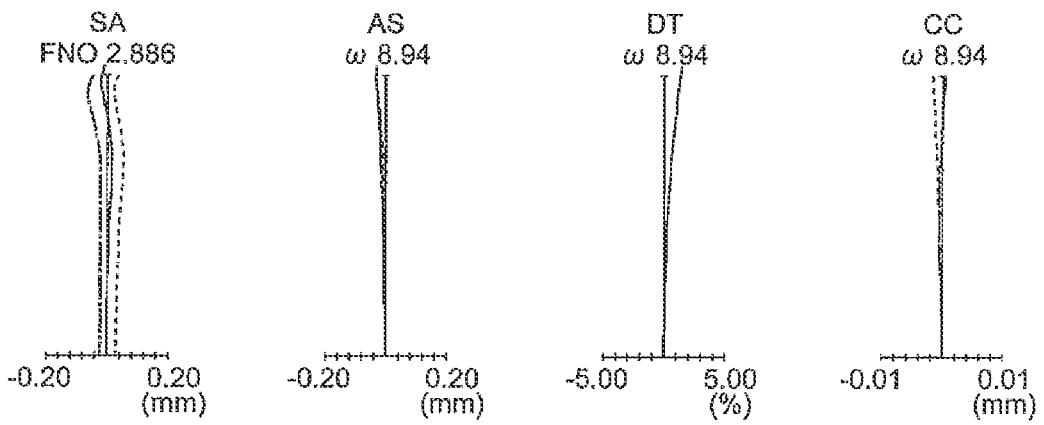

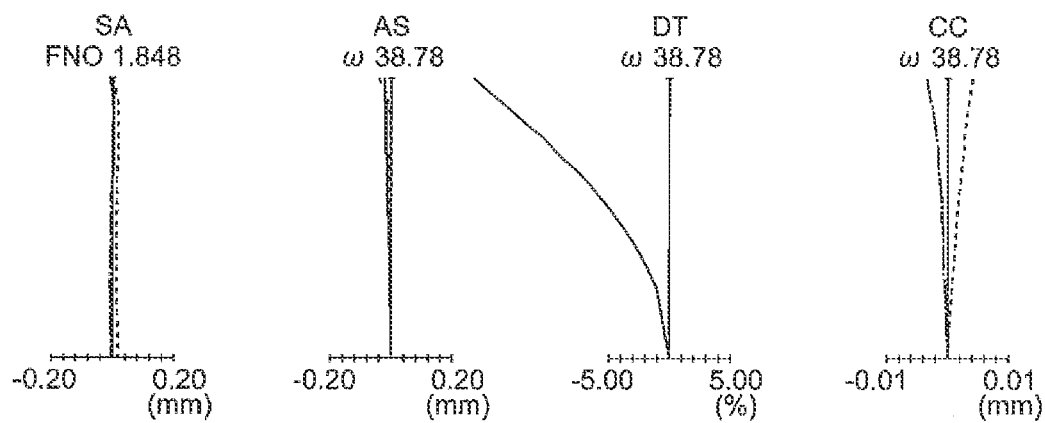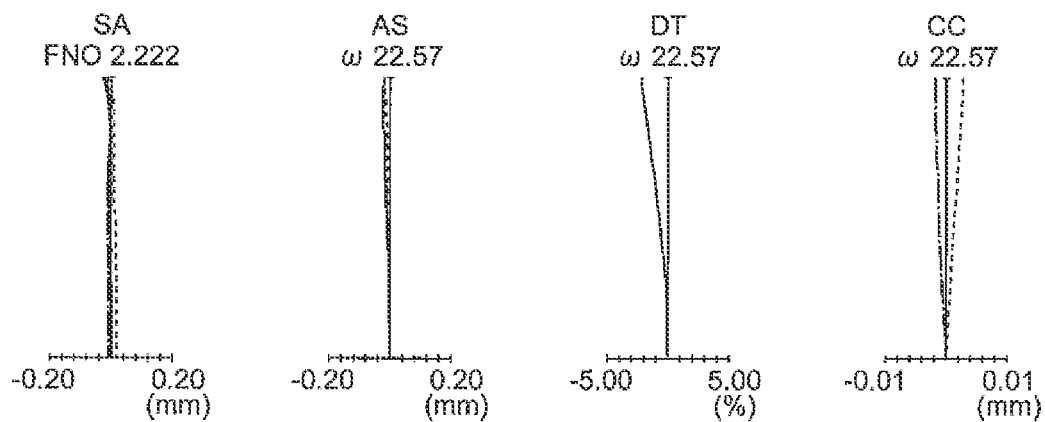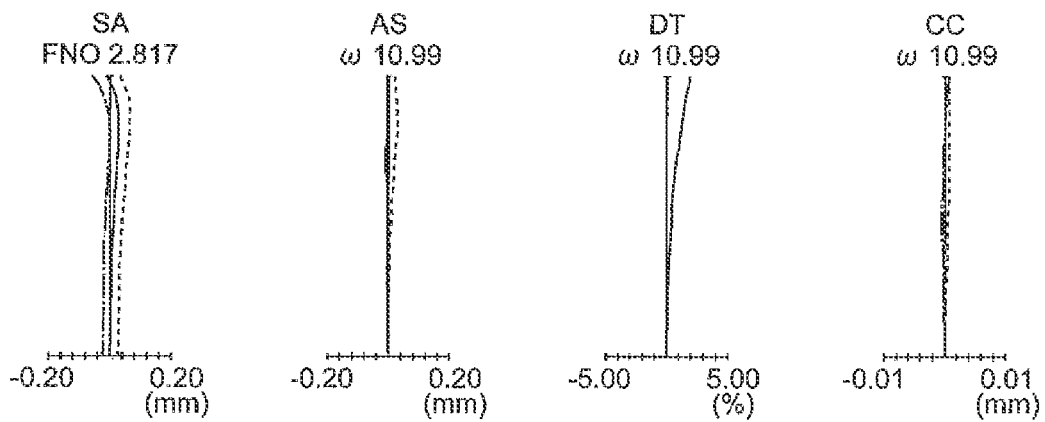

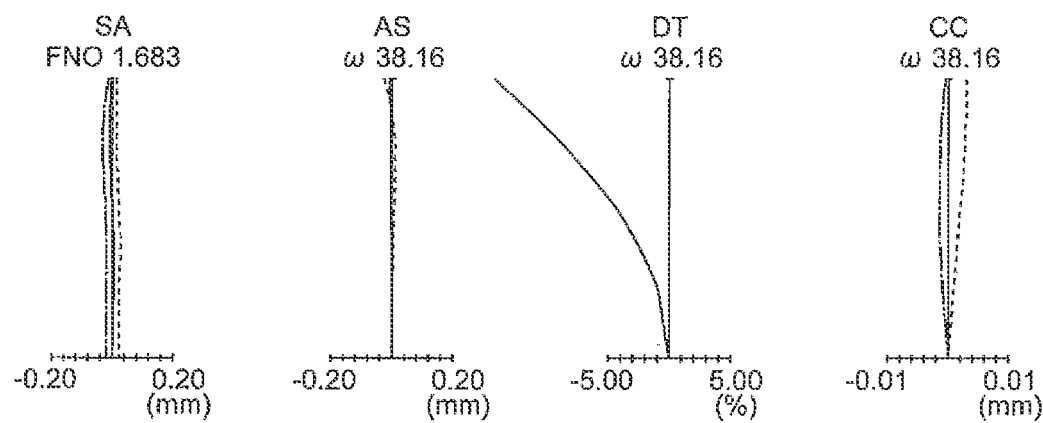
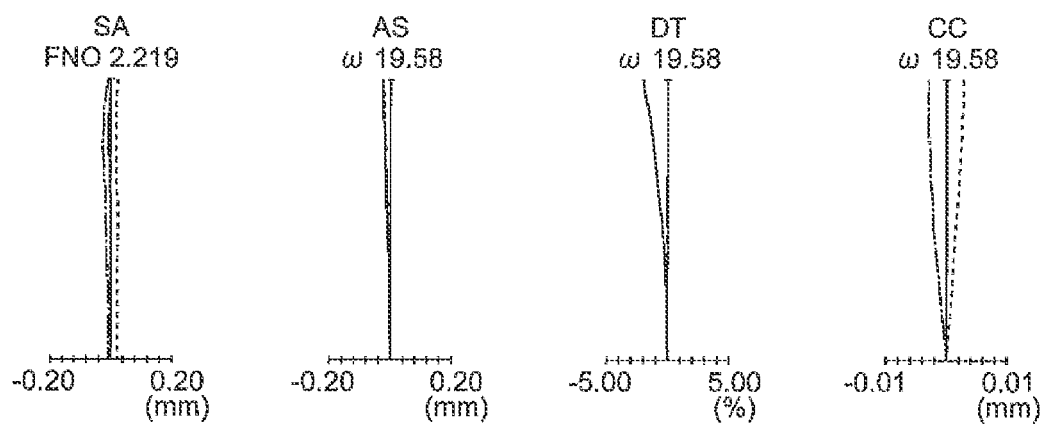
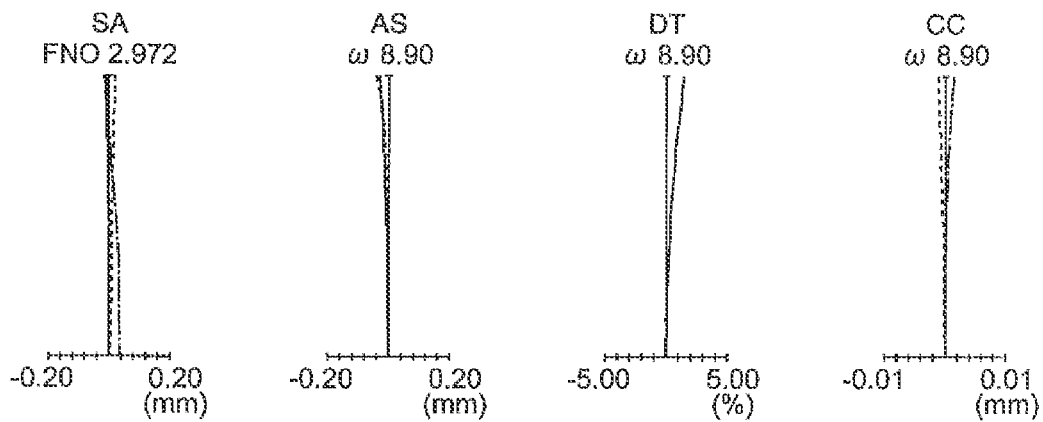

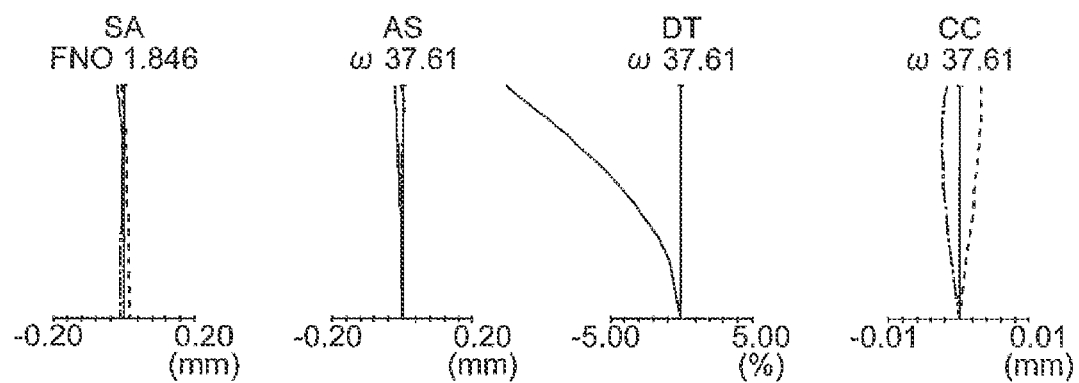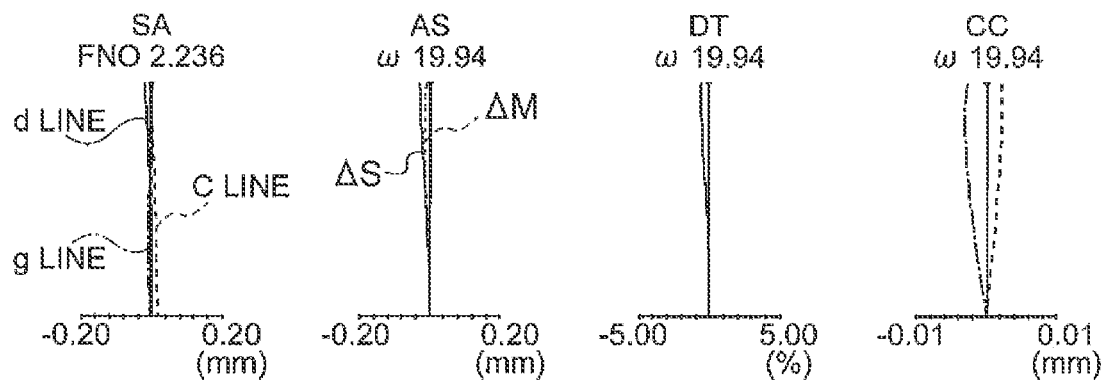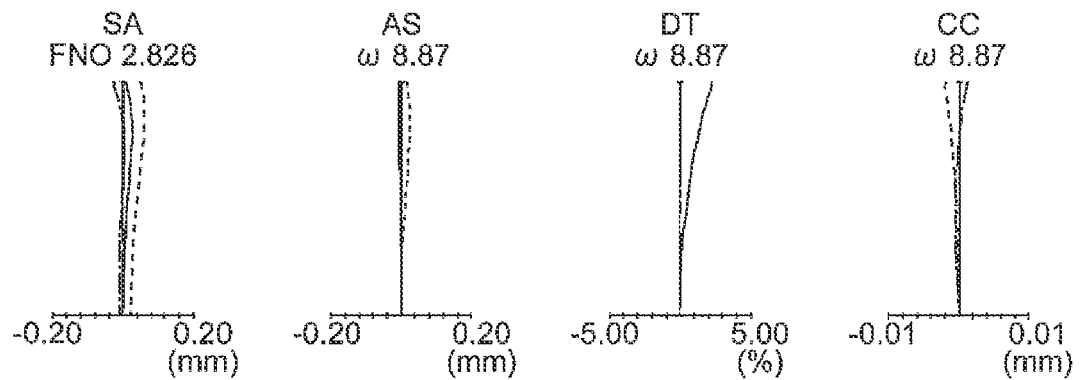

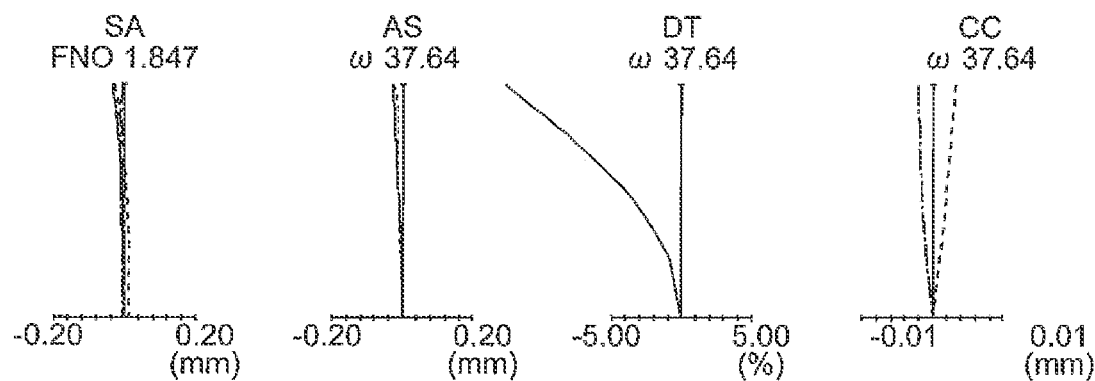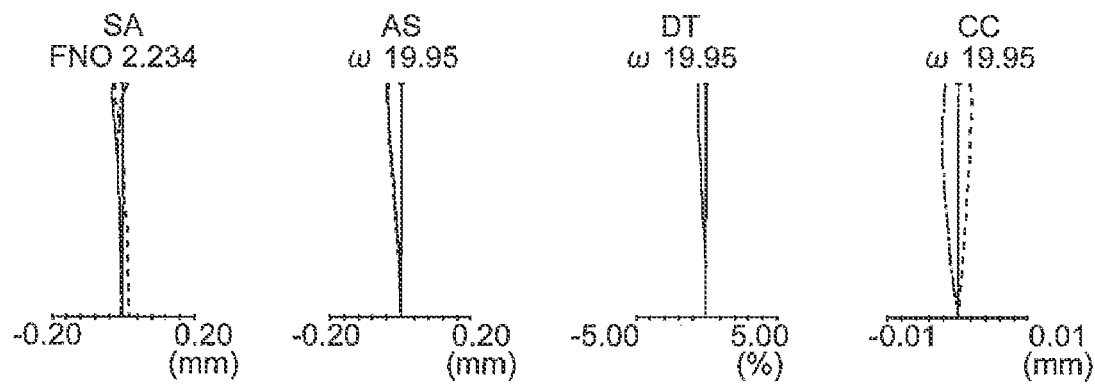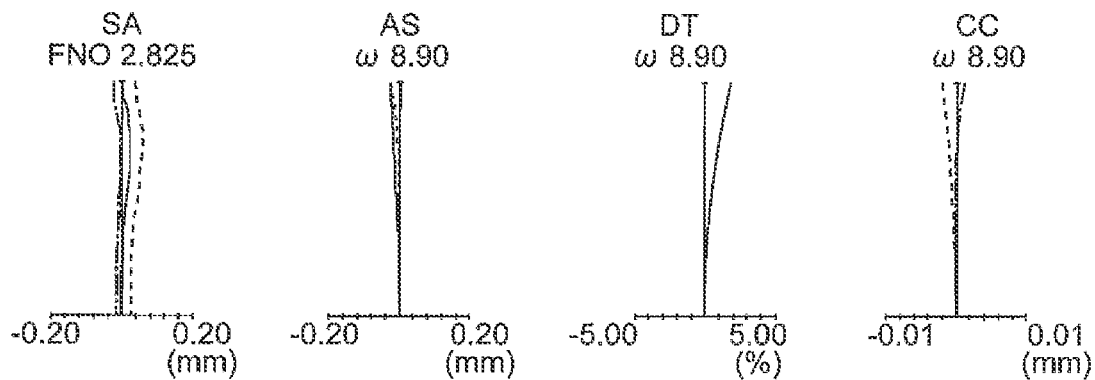

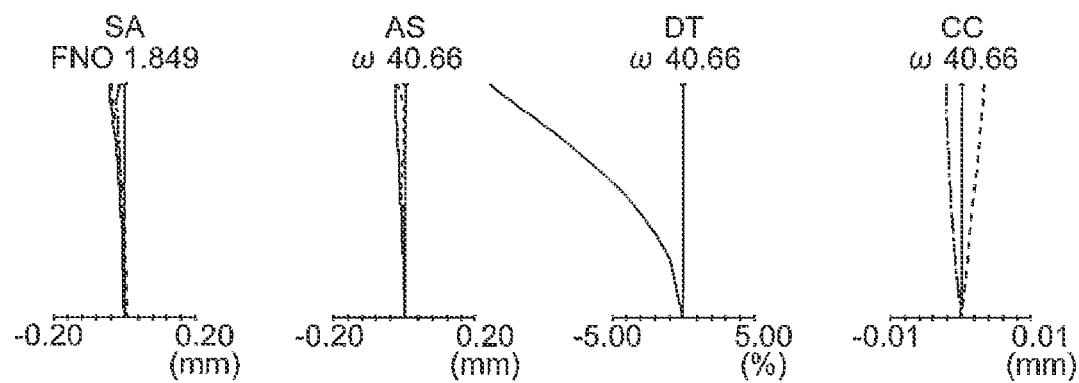
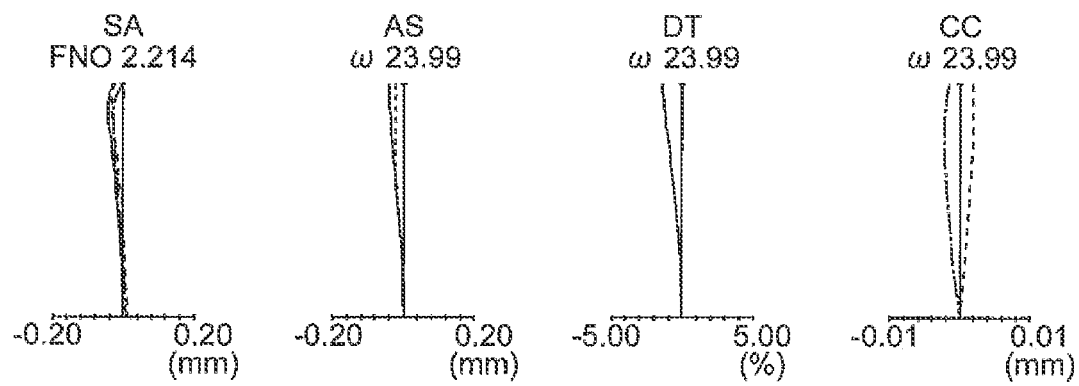
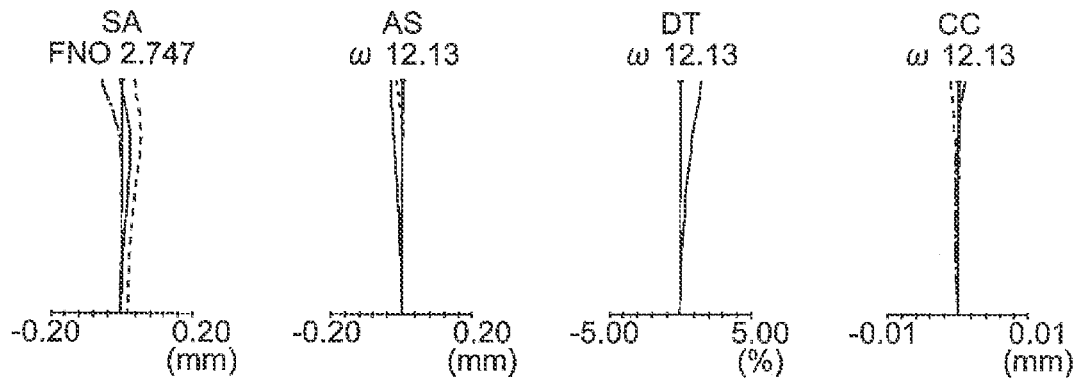

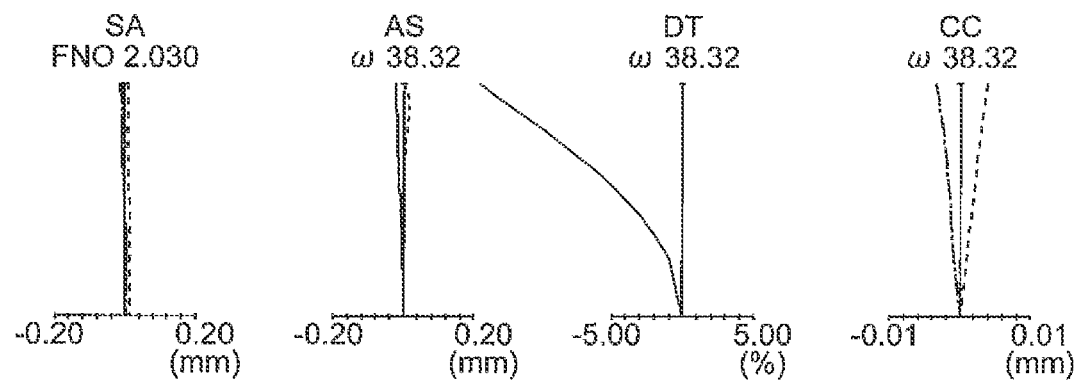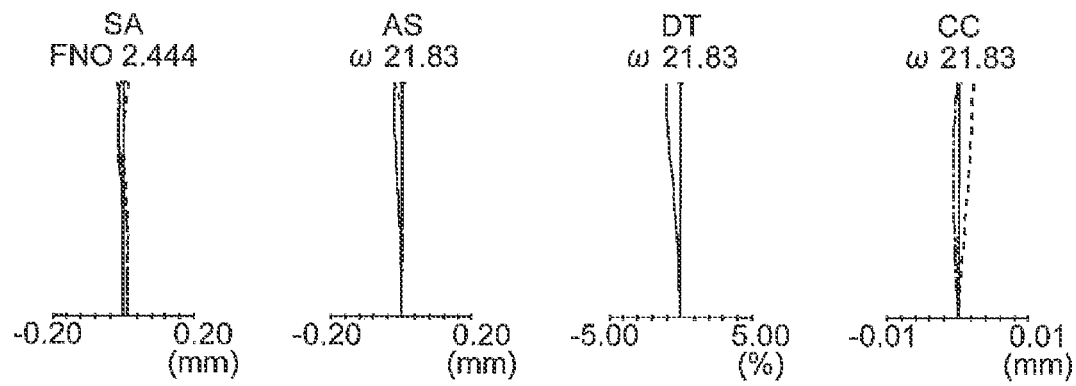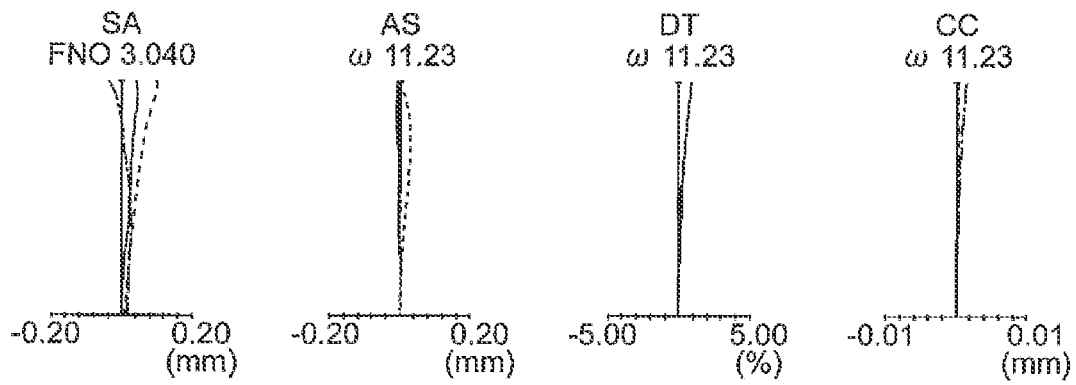

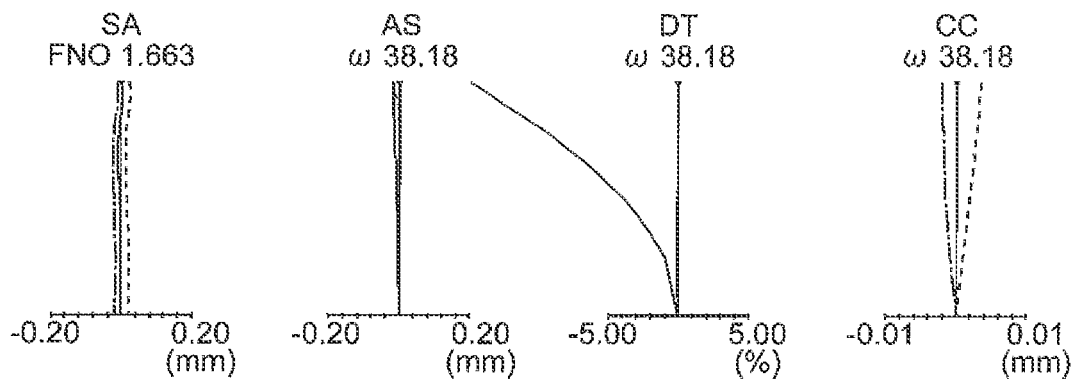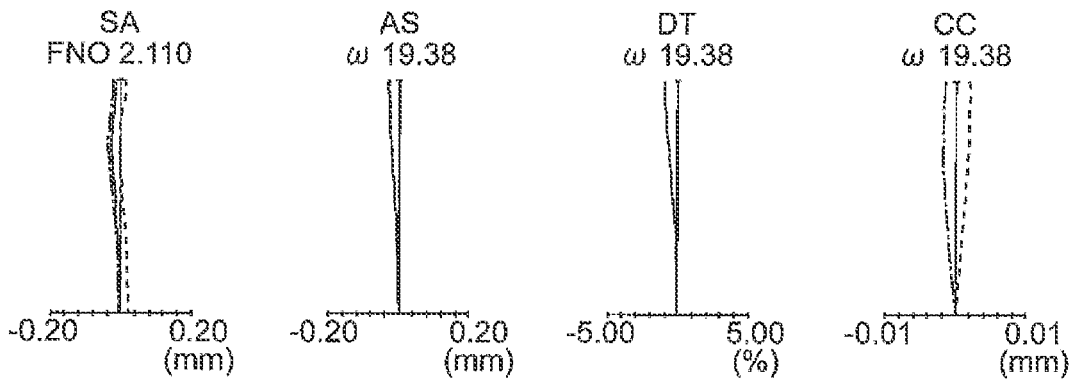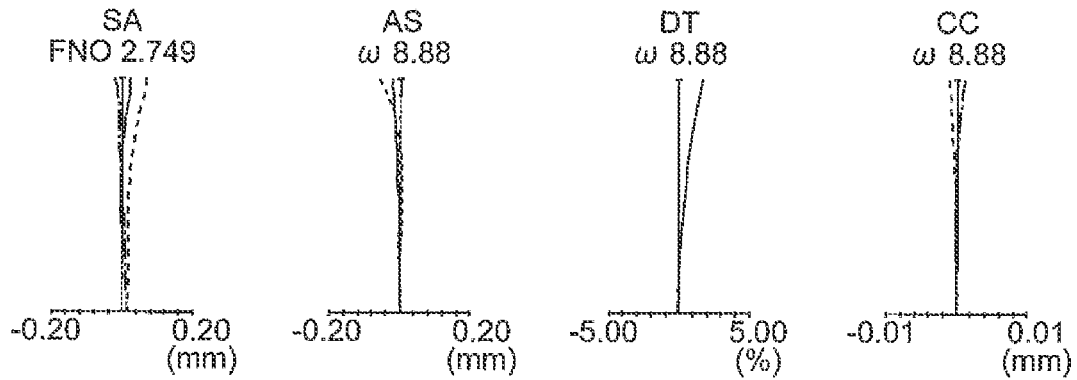

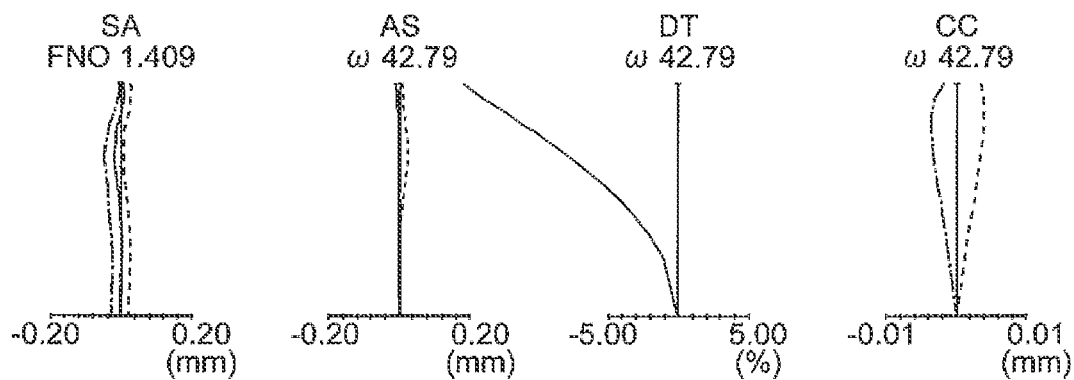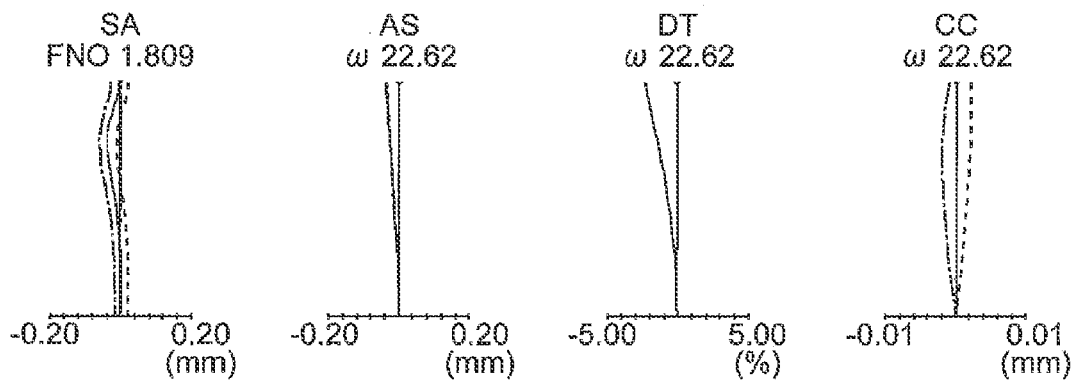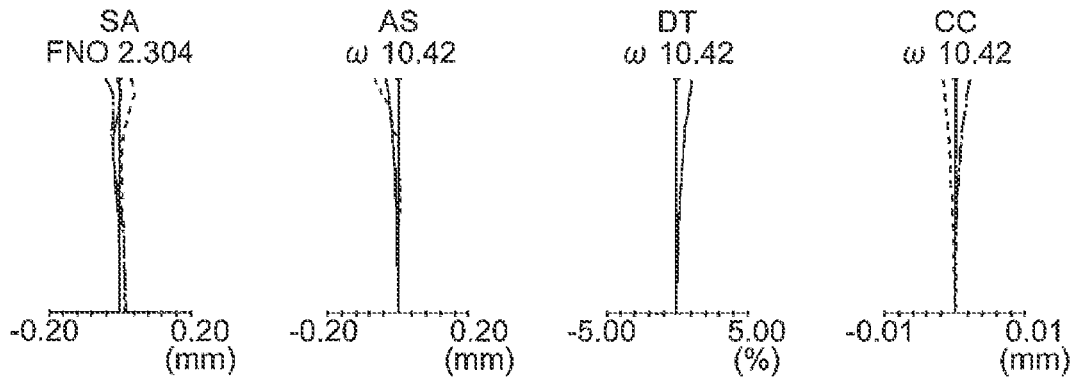

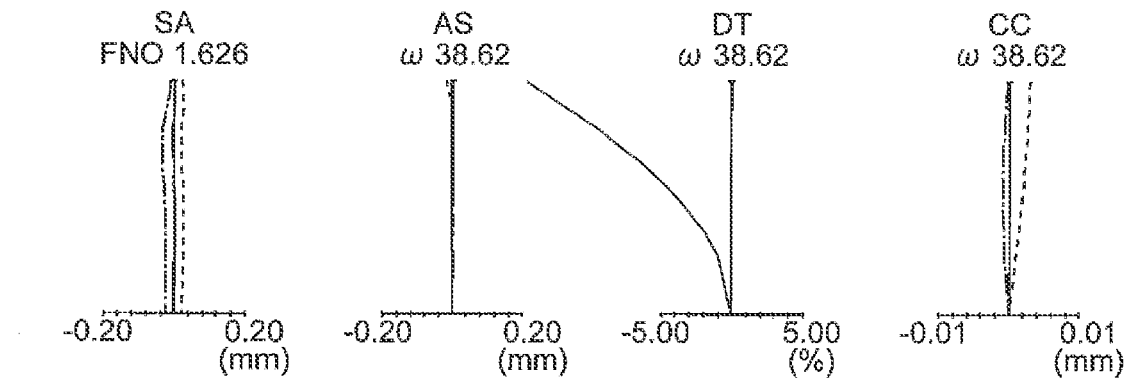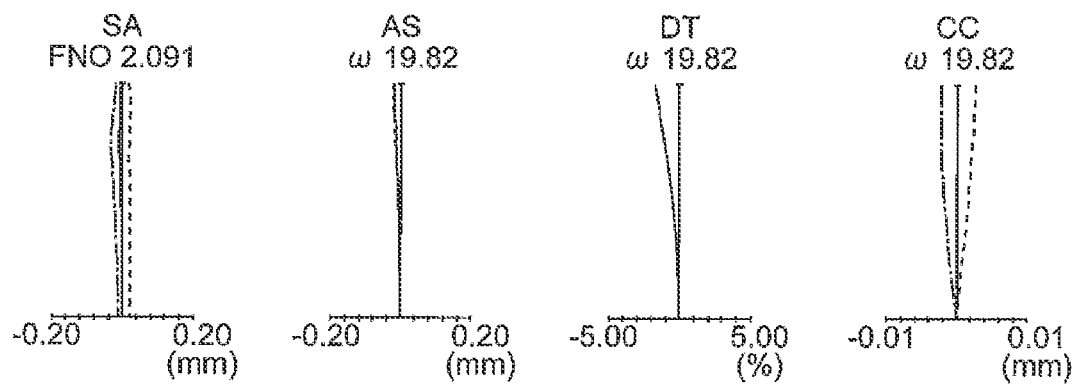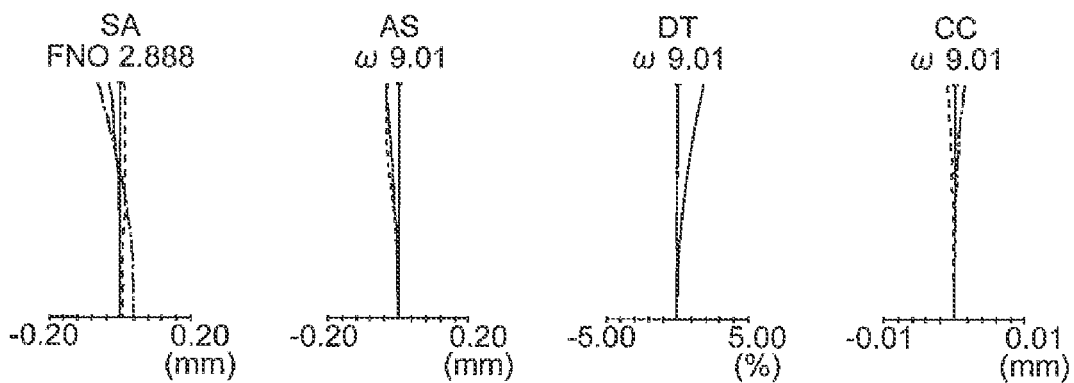

ZOOM LENS AND IMAGE PICKUP APPARATUS USING THE SAME

CROSS-REFERENCE TO RELATED APPLICATION

The present application is based upon and claims the benefit of priority from the prior Japanese Patent Application Nos. 2012-082027 filed on Mar. 30, 2012 and 2012-082028 filed on Mar. 30, 2012; the entire contents of which are incorporated herein by reference.

BACKGROUND OF THE INVENTION

1. Field of the Invention

The present invention relates to a zoom lens, and an image pickup apparatus using the same. The present invention, in particular, relates to a zoom lens and an image pickup apparatus which are suitable for a compact digital camera.

2. Description of the Related Art

In recent years, digital cameras in which, an arrangement is made to photograph an object by using a solid image pickup element such as a CCD (Charge Coupled Device) and a CMOS (Complementary Metal Oxide Semiconductor) have become mainstream, replacing a silver-salt film camera. Furthermore, such digital cameras have a wide range of categories from a high-function type for professional use to a compact popular type.

A user of such digital camera of the popular type seeks to enjoy photography by capturing readily a wide variety of scenes anytime and anywhere.

Therefore, a small-size product, particularly a slim digital camera, which can be accommodated easily in a pocket of clothes or a bag and carried conveniently, has been preferred. Moreover, further small-sizing of a taking lens system has been sought.

Furthermore, in order that capturing can be carried out also with high intensity, a digital camera which carries out image processing such as widening a sensitivity area of dynamic range has also been proposed. Accordingly, photography in which capture conditions are not restricted has become possible.

Even in such photography including photography at dark places, electronic correction of intensity is possible to a certain extent. Here, by adopting a lens having a large lens aperture, it is possible to deal with photography even at darker places. As a result, it is possible to widen conditions under which the photography is possible.

Furthermore, in the lens having a large aperture, photography with clarity is possible even with a small amount of incident light. Therefore, it is possible to increase a shutter speed in continuous capturing of a moving object, to further higher speed. In such manner, many options are made available to a photographer. Therefore, in recent years, a lens having a large lens aperture has been drawing attention.

Furthermore, from a point of view of widening of a capture area, the demand for high magnification zoom is still there. Therefore, further higher magnification has been anticipated.

As a prior art in which, a zoom lens having a small F-number with a comparatively higher zoom ratio, a technology in which, the zoom lens includes in order from an object side, a first lens unit having a positive refractive power, a second lens unit having a negative refractive power, a third lens unit having a positive refractive power, and a fourth lens unit having a positive refractive power, has been proposed (Japanese Patent Application Laid-open Publication No. 2010-217478).

SUMMARY OF THE INVENTION

A zoom lens according to a first aspect of the present invention comprises in order from an object side,
a first lens unit having a positive refractive power,
a second lens unit having a negative refractive power, and
a third lens unit having a positive refractive power, and
the third lens unit having a positive refractive power comprises in order from the object side,
a first lens component having a positive refractive power, and
a second lens component having a negative refractive power in which, a lens having a positive refractive power and a lens having a negative refractive power are cemented, and
the zoom lens satisfies the following conditional expressions (1), (2), and (3)

$$1.4 < |f_{3\_2p}/f_{3\_2n}| < 2.6 \quad (1)$$

$$n_{d3\_2p} - n_{d3\_2n} \geq 0 \quad (2)$$

$$n_{d3\_2n} \geq 1.8 \quad (3)$$

where,
$f_{3\_2p}$ denotes a focal length of the lens having a positive refractive power, in the second lens component having a negative refractive power, in the third lens unit having a positive refractive power,
$f_{3\_2n}$ denotes a focal length of the lens having a negative refractive power, in the second lens component having a negative refractive power, in the third lens unit having a positive refractive power,
$n_{d3\_2p}$ denotes a refractive index for a d-line of the lens having a positive refractive power, in the second lens component having a negative refractive power, in the third lens unit having a positive refractive power, and
$n_{d3\_2n}$ denotes a refractive index for the d-line of the lens having a negative refractive power, in the second lens component having a negative refractive power, in the third lens unit having a positive refractive power.

A zoom lens according to a second aspect of the present invention comprises in order from an object side,
a first lens unit having a positive refractive power,
a second lens unit having a negative refractive power, and
a third lens unit having a positive refractive power, and
the third lens unit having a positive refractive power comprises in order from the object side,
a first lens component having a positive refractive power,
a second lens component having a negative refractive power in which, a lens having a positive refractive power and a lens having a negative refractive power are cemented, and
a third lens component, and
the zoom lens satisfies the following conditional expressions (2a) and (4).

$$n_{d3\_2p} - n_{d3\_2n} \geq -0.1 \quad (2a)$$

$$\Sigma d_{3G}/f_t < 0.42 \quad (4)$$

where,
$n_{d3\_2p}$ denotes a refractive index for a d-line of the lens having a positive refractive power, in the second lens component having a negative refractive power, in the third lens unit having a positive refractive power, and
$n_{d3\_2n}$ denotes a refractive index for the d-line of the lens having a negative refractive power, in the second lens component having a negative refractive power, in the third lens unit having a positive refractive power, $\Sigma d_{3G}$ denotes a total length (not including an aperture) of the third lens unit, and $f_t$ denotes a focal length at a telephoto end of the overall zoom lens system.

A zoom lens according to a third aspect of the present invention comprises in order from an object side, a first lens unit having a positive refractive power,
a second lens unit having a negative refractive power, and
a third lens unit having a positive refractive power, and
the third lens unit having a positive refractive power comprises in order from the object side,
a first lens component having a positive refractive power,
a second lens component having a negative refractive power in which, a lens having a positive refractive power and a lens having a negative refractive power are cemented,
a third lens component, and
a fourth lens component, and
the zoom lens satisfies the following conditional expressions (2b) and (4)

$$n_{d3\_2p} - n_{d3\_2n} \geq -0.2 \quad (2b)$$

$$\Sigma d_{3G}/f_t < 0.42 \quad (4)$$

where, $n_{d3\_2p}$ denotes a refractive index for a d-line of the lens having a positive refractive power, in the second lens component having a negative refractive power, in the third lens unit having a positive refractive power, and $n_{d3\_2n}$ denotes a refractive index for the d-line of the lens having a negative refractive power, in the second lens component having a negative refractive power, in the third lens unit having a positive refractive power, $\Sigma d_{3G}$ denotes a total length (not including an aperture) of the third lens unit, and $f_t$ denotes a focal length at a telephoto end of the overall zoom lens system.

A zoom lens according to a fourth aspect of the present invention comprises in order from an object side, a first lens unit having a positive refractive power,
a second lens unit having a negative refractive power, and
a third lens unit having a positive refractive power, and
the third lens unit comprises in order from the object side,
a first lens component having a positive refractive power, and
a second lens component having a negative refractive power, and
the second lens component having a negative refractive power comprises not less than two lenses, and
the zoom lens satisfies the following conditional expressions (21) and (22).

$$0.06 < d_{3\_12\ air}/\Sigma d_{3\_12} < 0.2 \quad (21)$$

$$2.2 < f_3/f_w < 3.7 \quad (22)$$

where, $d_{3\_12\ air}$ denotes an air space between the first lens component having a positive refractive power and the second lens component having a negative refractive power, in the third lens unit having a positive refractive power, $\Sigma d_{3\_12}$ denotes an optical axial distance from a surface nearest to the object side of the first lens component having a positive refractive power up to a surface nearest to an image side of the second lens component having a negative refractive power, in the third lens unit having a positive refractive power, $f_3$ denotes a focal length of the third lens unit, and $f_w$ denotes a focal length at a wide angle end of the overall zoom lens system.

An image pickup apparatus according to the present invention comprises, a zoom lens according to the fourth aspect of the present invention, and an image pickup element which is disposed on an image side of the zoom lens, and which has an image pickup surface which receives an image by the zoom lens.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at a wide angle end, FIG. 2B shows an intermediate state, and FIG. 2C shows a state at a telephoto end;

FIG. 3A shows a state at a wide angle end, FIG. 3B shows an intermediate state, and FIG. 3C shows a state at a telephoto end;

FIG. 4A shows a state at a wide angle end, FIG. 4B shows an intermediate state, and FIG. 4C shows a state at a telephoto end;

FIG. 5A shows a state at a wide angle end, FIG. 5B shows an intermediate state, and FIG. 5C shows a state at a telephoto end;

FIG. 6A shows a state at a wide angle end, FIG. 6B shows an intermediate state, and FIG. 6C shows a state at a telephoto end;

FIG. 7A shows a state at a wide angle end, FIG. 7B shows an intermediate state, and FIG. 7C shows a state at a telephoto end;

FIG. 8A shows a state at a wide angle end, FIG. 8B shows an intermediate state, and FIG. 8C shows a state at a telephoto end;

FIG. 9A shows a state at a wide angle end, FIG. 9B shows an intermediate state, and FIG. 9C shows a state at a telephoto end;

FIG. 10A shows a state at a wide angle end, FIG. 10B shows an intermediate state, and FIG. 10C shows a state at a telephoto end;

FIG. 11A shows a state at a wide angle end, FIG. 11B shows an intermediate state, and FIG. 11C shows a state at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are aberration diagrams at the time of infinite object point focusing according to the first embodiment;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L (hereinafter, 'FIG. 13A to FIG. 13L') are aberration diagrams at the time of infinite object point focusing according to the second embodiment;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are aberration diagrams at the time of infinite object point focusing according to the third embodiment;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L (hereinafter, 'FIG. 15A to FIG. 15L') are aberration diagrams at the time of infinite object point focusing according to the fourth embodiment;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are aberration diagrams at the time of infinite object point focusing according to the fifth embodiment;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L (hereinafter, 'FIG. 17A to FIG. 17L') are aberration diagrams at the time of infinite object point focusing according to the sixth embodiment;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are aberration diagrams at the time of infinite object point focusing according to the seventh embodiment;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L (hereinafter, 'FIG. 19A to FIG. 19L') are aberration diagrams at the time of infinite object point focusing according to the eighth embodiment;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, 'FIG. 20A to FIG. 20L') are aberration diagrams at the time of infinite object point focusing according to the ninth embodiment;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L (hereinafter, 'FIG. 21A to FIG. 21L') are aberration diagrams at the time of infinite object point focusing according to the tenth embodiment;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L (hereinafter, 'FIG. 22A to FIG. 22L') are aberration diagrams at the time of infinite object point focusing according to the eleventh embodiment;

DETAILED DESCRIPTION OF THE INVENTION

Figure 1A:
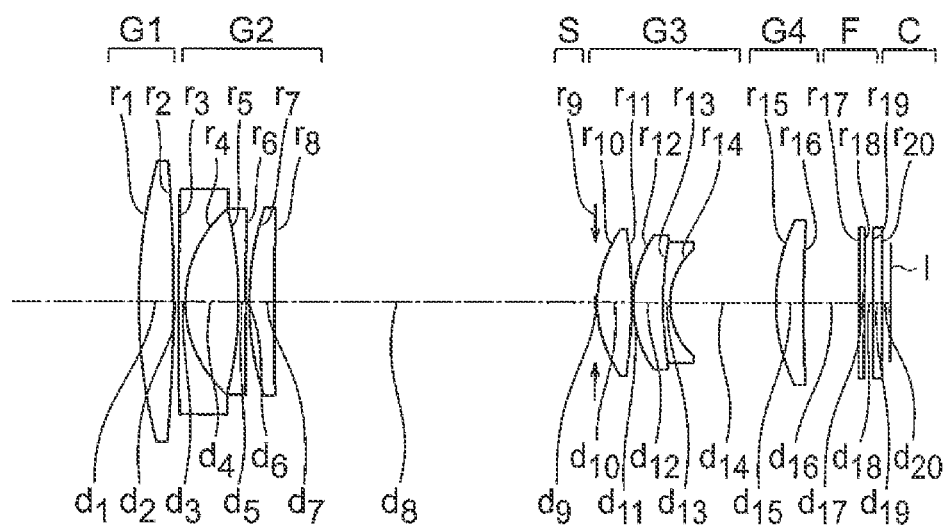
FIG. 1A, FIG. 1B, and FIG. 1C are cross-sectional views along an optical axis showing an optical arrangement at the time of infinite object point focusing of a zoom lens according to a first embodiment of the present invention, where.

Exemplary embodiments of a zoom lens and an image pickup apparatus according to the present invention will be described below by referring to the accompanying diagrams. However, the present invention is not restricted to the embodiments described below.

First of all, prior to the description of the embodiments, an action and an effect of the zoom lens and the image pickup apparatus according to the present invention will be described below.

A zoom lens according to a first aspect of the present invention comprises in order from an object side, a first lens unit having a positive refractive power, a second lens unit having a negative refractive power, and a third lens unit having a positive refractive power, and the third lens unit having a positive refractive power comprises in order from the object side, a first lens component having a positive refractive power, and a second lens component having a negative refractive power in which, a lens having a positive refractive power and a lens having a negative refractive power are cemented, and the zoom lens satisfies the following conditional expressions (1), (2), and (3)

$$1.4 < |f_{3\_2p}/f_{3\_2n}| < 2.6 \quad (1)$$

$$n_{d3\_2p} - n_{d3\_2n} \geq 0 \quad (2)$$

$$n_{d3\_2n} \geq 1.8 \quad (3)$$

where, $f_{3\_2p}$ denotes a focal length of the lens having a positive refractive power, in the second lens component having a negative refractive power, in the third lens unit having a positive refractive power, $f_{3\_2n}$ denotes a focal length of the lens having a negative refractive power, in the second lens component having a negative refractive power, in the third lens unit having a positive refractive power, $n_{d3\_2p}$ denotes a refractive index for a d-line of the lens having a positive refractive power, in the second lens component having a negative refractive power, in the third lens unit having a positive refractive power, and $n_{d3\_2n}$ denotes a refractive index for the d-line of the lens having a negative refractive power, in the second lens component having a negative refractive power, in the third lens unit having a positive refractive power.

In the zoom lens according to the present invention, by letting the zoom lens to be a positive-lead type zoom lens, it is possible to design a zoom lens which secures a high zoom ratio while suppressing an aperture of a lens unit which is preceding.

Moreover, by letting a negative-positive lens unit to be a lens unit at a rear side, it is possible to secure back focus up to certain extent while having a zoom arrangement such as of a retro focus type.

Moreover, the third lens unit includes the first lens component having a positive refractive power and the second lens component having a negative refractive power in which, the lens having a positive refractive power and the lens having a negative refractive power are cemented, and satisfies conditional expressions (1), (2), and (3). Accordingly, since it is possible to suppress an amount of aberration which occurs in the third lens unit, and to impart refractive power while letting a compact structure, it is possible to suppress a total length of the overall zoom lens system.

Conditional expression (1) regulates a ratio of the focal length of the lens having a positive refractive power and the focal length of the lens having a negative refractive power, in the second lens component having a negative refractive power, in the third lens unit.

When an upper limit of conditional expression (1) is surpassed, refractive power of the lens having a positive refractive power in the second lens component having a negative refractive power, in the third lens unit becomes weak. Accordingly, the negative refractive power of the second lens component in the third lens unit becomes relatively strong. As a result, power of the third lens unit having a positive refractive power as a whole becomes weak. Consequently, there is a degradation of a zoom ratio of the overall zoom lens system, and the total length of the overall zoom lens system becomes long and therefore, it is not preferable.

Moreover, when a lower limit of conditional expression (1) is not reached, the refractive power of the lens having a negative refractive power in the second lens component having a negative refractive power, in the third lens unit becomes weak. Accordingly, the negative refractive power as the second lens component having a negative refractive power, in the third lens unit becomes weak, and an effect of bringing a principal point of the third lens unit to a front side becomes weak. As a result, it is not possible to make small an aperture which is frontward of the third lens unit. Consequently, a diameter of the overall third lens unit becomes large, which is not preferable for a compact structure.

Moreover, since a lens diameter as a whole, becomes large, an occurrence of a spherical aberration, a coma aberration, and particularly a high-order aberration near outer peripheral portion of lens become substantial. Consequently, when the number of lenses in the third lens unit is increased for suppressing the abovementioned aberrations, the arrangement becomes complicated.

Moreover, conditional expression (2) regulates a difference in the refractive index of the lens having a positive refractive power and the refractive index of the lens having a negative refractive power, in the second lens component having a negative refractive power, in the third lens unit.

By letting a lower limit of conditional expression (2) to be not less than 0, it is possible to maintain the refractive power of the lens having a positive refractive power in the second lens component having a negative refractive power, in the third lens unit to be comparatively strong. Accordingly, it is possible to let the second lens component having a negative refractive power in the third lens unit have a small negative refractive power as a whole. As a result, it becomes easy to impart comparatively stronger refractive power to the third lens unit as a whole. Consequently, it is possible to suppress the total length of the overall zoom lens system, and moreover, to increase a degree of freedom of designing an optical system with respect to the zoom ratio.

Conditional expression (3) regulates the refractive index of the lens having a negative refractive power in the second lens component having a negative refractive power, in the third lens unit.

When a lower limit of conditional expression (3) is not reached, the refractive power of the lens having negative refractive power in the second lens component becomes excessively weak, and the principal point of the third lens unit moves rearward. Accordingly, since the aperture diameter becomes large, a diameter of a light beam becomes large, and the spherical aberration is degraded further, which is disadvantageous for a compact structure.

Moreover, when a radius of curvature on an image side out of the second lens component is made small for maintaining the negative refractive power of the second lens component in the third lens unit, an amount of aberration such as the coma aberration becomes large, and it becomes necessary to take measures such as adding a lens for aberration correction to a rear side, which is unfavorable for small-sizing.

A zoom lens according to a second aspect of the present invention comprises in order from an object side, a first lens unit having a positive refractive power, a second lens unit having a negative refractive power, and a third lens unit having a positive refractive power, and the third lens unit having a positive refractive power comprises in order from the object side, a first lens component having a positive refractive power, a second lens component having a negative refractive power in which, a lens having a positive refractive power and a lens having a negative refractive power are cemented, and a third lens component, and the zoom lens satisfies the following conditional expressions (2a) and (4).

$$n_{d3\_2p} - n_{d3\_2n} \geq -0.1 \quad (2a)$$

$$\Sigma d_{3G}/f_t < 0.42 \quad (4)$$

where, $n_{d3\_2p}$ denotes a refractive index for a d-line of the lens having a positive refractive power, in the second lens component having a negative refractive power, in the third lens unit having a positive refractive power, and $n_{d3\_2n}$ denotes a refractive index for the d-line of the lens having a negative refractive power, in the second lens component having a negative refractive power, in the third lens unit having a positive refractive power, $\Sigma d_{3G}$ denotes an overall length (not including an aperture) of the third lens unit, and $f_t$ denotes a focal length at a telephoto end of the overall zoom lens system.

It has already been mentioned above regarding the adoption of the arrangement in which, the lens unit having a positive refractive power, the lens unit having a negative refractive power, and the lens unit having a positive refractive power are arranged in order from the object side. Therefore, repetitive description will be omitted.

Moreover, the third lens unit includes the first lens component having a positive refractive power, the second lens component having a negative refractive power in which, the lens having a positive refractive power and the lens having a negative refractive power are cemented, and the third lens component, and satisfies conditional expressions (2a) and (4). Accordingly, it is possible to suppress an amount of aberration which occurs in the third lens unit, and to impart the refractive power while making the arrangement compact. Therefore, it is possible to suppress the total length of the overall zoom lens system.

Particularly, conditional expression (2a), similarly as the abovementioned conditional expression (2), regulates a condition for maintaining the refractive power of the lens having a positive refractive power, in the second lens component having a negative refractive power, in the third lens unit to be comparatively strong, and for letting the second lens component as a whole having a negative refractive power, in the third lens unit, have a weak negative refractive power.

Here, as compared to the arrangement according to the abovementioned aspect, the negative refractive power of the second lens component in the third lens unit becomes strong. Therefore, for making the refractive power of the overall third lens unit strong, the refractive power of the first lens component having the positive refractive power becomes relatively strong, and even though an amount of the spherical aberration which occurs has increased, it is possible to compensate by carrying out correction of the aberration which has occurred, by the third lens component in the third lens unit.

Conditional expression (4) regulates the total length of the third lens unit. When an upper limit of conditional expression (4) is surpassed, the third lens unit becomes excessively large with respect to the overall zoom lens system, and it becomes difficult to adopt a compact structure.

It is desirable that the third lens component is a single lens.

Moreover, a zoom lens according to a third aspect of the present invention comprises in order from an object side, a first lens unit having a positive refractive power,
a second lens unit having a negative refractive power, and
a third lens unit having a positive refractive power, and
the third lens unit having a positive refractive power comprises in order from the object side,
a first lens component having a positive refractive power,
a second lens component having a negative refractive power in which, a lens having a positive refractive power and a lens having a negative refractive power are cemented,
a third lens component, and
a fourth lens component, and
the zoom lens satisfies the following conditional expressions (2b) and (4).

$$n_{d3\_2p} - n_{d3\_2n} \geq -0.2 \tag{2b}$$

$$\Sigma d_{3G}/f_t < 0.42 \tag{4}$$

where, $n_{d3\_2p}$ denotes a refractive index for a d-line of the lens having a positive refractive power, in the second lens component having a negative refractive power, in the third lens unit having a positive refractive power, and $n_{d3\_2n}$ denotes a refractive index for the d-line of the lens having a negative refractive power, in the second lens component having a negative refractive power, in the third lens unit having a positive refractive power, $\Sigma d_{3G}$ denotes an overall length (not including an aperture) of the third lens unit, and $f_t$ denotes a focal length at a telephoto end of the overall zoom lens system.

It has already been mentioned above regarding the adoption of the arrangement according to the first aspect. Therefore, repetitive description will be omitted.

Moreover, conditional expression (2b), similarly as the abovementioned conditional expression (2), has an effect of maintaining the refractive power of the lens having a positive refractive power, in the second lens component having a negative refractive power, in the third lens unit to be comparatively strong, and regulates a condition for letting the second lens component as a whole having a negative refractive power, in the third lens unit, have a weak negative refractive power.

Here, according to the third aspect of the present invention, the negative refractive power of the second lens component having a negative refractive power, in the third lens unit becomes stronger than the negative refractive power of the second lens component in the abovementioned first aspect and the second aspect. Accordingly, for making the refractive power of the overall third lens unit strong, the refractive power of the first lens component having a positive refractive power becomes relatively strong, and even though the amount of spherical aberration and the amount of chromatic aberration which occur has increased, it is possible to compensate by carrying out correction of the aberration which has occurred, by the third lens component in the third lens unit.

Moreover, conditional expression (4) is a regulation regarding the total length of the third lens unit. When an upper limit of conditional expression (4) is surpassed, the third lens unit becomes excessively large with respect to the overall zoom lens system, and adopting a compact structure becomes difficult.

According to a preferable aspect of the present invention, it is desirable that the zoom lens satisfies the following conditional expression (5).

$$0.6 < |f_{3\_1}/f_3| < 1.2 \tag{5}$$

where, $f_{3\_1}$ denotes a focal length of the first lens component having a positive refractive power, in the third lens unit, and $f_3$ denotes a focal length of the third lens unit.

Conditional expression (5) standardizes the focal length of the first lens component having a positive refractive power, in the third lens unit by the focal length of the third lens unit.

When a lower limit of conditional expression (5) is not reached, the refractive power of the first lens component having a positive refractive power, in the third lens unit becomes excessively strong, and occurrence of the spherical aberration becomes substantial which is not preferable.

When an upper limit of conditional expression (5) is surpassed, the refractive power of the first lens component having a positive refractive power, in the third lens unit becomes excessively weak, and the refractive power of the third lens unit also becomes weak. Consequently, for securing a similar zoom ratio, a measure such as making large increasing an amount of movement of the third lens unit is necessary. As a result, the total length becomes long.

Moreover, according to a preferable aspect of the present invention, it is desirable that the zoom lens satisfies the following conditional expression (6).

$$0.7 < |f_{3\_2}/f_3| < 3 \tag{6}$$

where, $f_{3\_2}$ denotes a focal length of the second lens component having a negative refractive power, in the third lens unit, and $f_3$ denotes a focal length of the third lens unit.

When a lower limit of conditional expression (6) is not reached, the refractive power of the second lens component having a negative refractive power, in the third lens unit becomes excessively strong, and the refractive power of the overall third lens unit becomes weak, which is not preferable from a point of small-sizing.

When an upper limit of conditional expression (6) is surpassed, the refractive power of the first lens component having a positive refractive power, in the third lens unit becomes excessively strong relatively. Accordingly, it becomes difficult to correct aberrations such as the spherical aberration and the coma aberration which occur in the first lens component having a positive refractive power, in the third lens unit, and therefore it is not preferable.

Moreover, according to a preferable aspect of the present invention, it is desirable that the zoom lens satisfies the following conditional expression (7).

$$1 < |f_{3\_2}/f_{3\_1}| < 4 \tag{7}$$

where, $f_{3\_1}$ denotes a focal length of the first lens component having a positive refractive power, in the third lens unit, and $f_{3\_2}$ denotes a focal length of the second lens component having a negative refractive power, in the third lens unit.

Conditional expression (7) regulates a ratio of the focal length of the first lens component having a positive refractive power, in the third lens unit, and the focal length of the second lens component having a negative refractive power, in the third lens unit.

When a lower limit of conditional expression (7) is not reached, the refractive power of the second lens component having a negative refractive power, in the third lens unit becomes excessively strong, and the refractive power of the overall third lens unit becomes excessively weak, which is not preferable from the point of small-sizing.

When an upper limit of conditional expression (7) is surpassed, the refractive power of the first lens component having a positive refractive power becomes excessively strong, and it becomes difficult to correct aberrations such as the spherical aberration and the coma aberration which occur in the first lens component having a positive refractive power, in the third lens unit, and therefore it is not preferable.

According to a preferable aspect of the present invention, it is desirable that the zoom lens satisfies the following conditional expression (8).

$$2 < |f_3/f_w| < 4 \tag{8}$$

where, $f_3$ denotes a focal length of the third lens unit, and $f_w$ denotes a focal length at a wide angle end of an overall zoom lens system.

Conditional expression (8) is an expression in which, the focal length of the third lens unit is regulated, and the focal length at the wide angle end of the overall zoom lens system is standardized.

When a lower limit of conditional expression (8) is not reached, the refractive power of the third lens unit becomes excessively strong, due to which, occurrence of the spherical aberration and the coma aberration becomes substantial, thereby making it difficult to carry out the correction, and therefore, it is not preferable.

When an upper limit of conditional expression (8) is surpassed, the refractive power of the third lens unit becomes excessively weak, and for securing a similar zoom ratio, measures such as making the amount of movement of the third lens unit large becomes necessary, due to which the total length of the overall zoom lens system becomes long, and small-sizing becomes difficult.

Moreover, according to a preferable aspect of the present invention, it is desirable that the zoom lens satisfies the following conditional expression (4).

$$\Sigma d_{3G}/f_t < 0.42 \tag{4}$$

where, $\Sigma d_{3G}$ denotes a total length of the third lens unit.

Regarding conditional expression (4), since the description has already been made, the repetitive description thereof will be omitted.

Moreover, according to a preferable aspect of the present invention, it is desirable that the zoom lens satisfies the following conditional expression (9).

$$L_t/f_t < 2.7 \tag{9}$$

where, $L_t$ denotes a total length at a telephoto end of the overall zoom lens system, and $f_t$ denotes a focal length at the telephoto end of the overall zoom lens system.

Conditional expression (9) is an expression in which, the total length at the telephoto end of the overall zoom lens system is regulated, and standardized by the focal length at the telephoto end of the overall zoom lens system.

When an upper limit of conditional expression (9) is surpassed, the total length at the telephoto end of the overall zoom lens system becomes excessively long, which is not favorable for small-sizing.

The 'total length' means a distance (an air-conversion distance) along an optical axis from a lens surface nearest to the object side, up to an image plane.

Moreover, according to a preferable aspect of the present invention, it is desirable that the zoom lens satisfies the following conditional expression (10).

$$n_{d3\_2p} \geq 1.8 \tag{10}$$

where, $n_{d3\_2p}$ denotes the refractive index for the d-line of the lens having a positive refractive power, in the second lens component having a negative refractive power, in the third lens unit having a positive refractive power.

By letting the refractive index to be balanced such that conditional expression (10) is satisfied, it is possible make strong the refractive power of the lens having a positive refractive power, in the second lens component having a negative refractive power, in the third lens unit having a positive refractive power. Accordingly, since the refractive power of the second lens component becomes weak, it is possible to maintain the refractive power of the third lens unit having a positive refractive power, to be strong.

Moreover, according to a preferable aspect of the present invention, it is desirable that the zoom lens satisfies the following conditional expression (3).

$$n_{d3\_2n} \geq 1.8 \tag{3}$$

where, $n_{d3\_2n}$ denotes the refractive index for the d-line of the lens having a negative refractive power, in the second lens component having a negative refractive power, in the third lens unit having a positive refractive power.

Moreover, according to a preferable aspect of the present invention, it is desirable that the zoom lens satisfies the following conditional expression (1).

$$1.4 < |f_{3\_2p}/f_{3\_2n}| < 2.6 \tag{1}$$

where, $f_{3\_2p}$ denotes a focal length of the lens having a positive refractive power, in the second lens component having a negative refractive power, in the third lens unit having a positive refractive power, and $f_{3\_2n}$ denotes a focal length of the lens having a negative refractive power in the second lens component having a negative refractive power, in the third lens unit having a positive refractive power.

Moreover, according to a preferable aspect of the present invention, it is desirable that the zoom lens satisfies the following conditional expression (11).

$$0.3<(\beta_{2t}/\beta_{2w})/(\beta_{3t}/\beta_{3w})<0.7 \quad (11)$$

where, $\beta_{2t}$ denotes a lateral magnification at a telephoto end of the second lens unit, $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

Conditional expression (11) is an expression in which, a ratio of a zoom ratio of the second lens unit and a zoom ratio of the third lens unit is regulated.

When an upper limit of conditional expression (11) is surpassed, a load of zooming on the second lens unit becomes excessively large, and an occurrence of a chromatic aberration of magnification and a curvature of field at the wide angle end becomes substantial. Therefore, by increasing the number of lenses for correction of such aberrations, a structural load becomes large, which is not favorable for small-sizing.

When a lower limit of conditional expression (11) is not reached, a load of zooming on the third lens unit becomes excessively large, and the occurrence of aberrations such as the spherical aberration and the coma aberration becomes substantial. Moreover, a fluctuation in a longitudinal chromatic aberration becomes large, and correction of such aberrations and fluctuation becomes difficult.

Moreover, an image pickup apparatus according to an aspect of the present invention includes, a zoom lens, and an image pickup element which is disposed on an image side of the zoom lens, and which has an image pickup surface which receives an image by the zoom lens, and the zoom lens is the abovementioned zoom lens.

Accordingly, it is possible to provide an image pickup apparatus in which a zoom lens having a compact structure and high performance while being a zoom lens with a small F-number (a large aperture diameter) and high magnification is used.

A zoom lens according to a fourth aspect of the present invention comprises in order from an object side, a first lens unit having a positive refractive power, a second lens unit having a negative refractive power, and a third lens unit having a positive refractive power, and the third lens unit comprises in order from the object side, a first lens component having a positive refractive power, and a second lens component having a negative refractive power, and the second lens component having a negative refractive power comprises not less than two lenses, and the zoom lens satisfies the following conditional expressions (21) and (22).

$$0.06<d_{3\_12\,air}/\Sigma d_{3\_12}<0.2 \quad (21)$$

$$2.2<f_3/f_w<3.7 \quad (22)$$

where, $d_{3\_12\,air}$ denotes an air space between the first lens component having a positive refractive power and the second lens component having a negative refractive power, in the third lens unit having a positive refractive power, $\Sigma d_{3\_12}$ denotes an optical axial distance from a surface nearest to the object side of the first lens component having a positive refractive power up to a surface nearest to an image side of the second lens component having a negative refractive power, in the third lens unit having a positive refractive power, $f_3$ denotes a focal length of the third lens unit, and $f_w$ denotes a focal length at a wide angle end of the overall zoom lens system.

By letting the zoom lens to be a positive-lead type zoom lens, it is possible to design a zoom lens which secures a high zoom ratio while suppressing an aperture of a lens unit which is preceding.

Moreover, by letting a negative-positive lens unit to be a lens unit at a rear side, it is possible to secure back focus up to certain extent while having a zoom arrangement such as of a retro focus type.

Furthermore, by the third lens unit including the first lens component having a positive refractive power and the second lens component having a negative refractive power, and satisfying conditional expressions (21) and (22), it is possible to suppress an amount of aberration which occurs in the third lens unit, and to impart refractive power while letting the structure to be compact. Therefore, it is possible to suppress the total length of the overall zoom lens system.

Conditional expression (21) is an expression in which, the air space between the first lens component having a positive refractive power and the second lens component having a negative refractive power, in the third lens unit having a positive refractive power is regulated. Also, conditional expression (21) is an expression in which, an optical axial distance from a surface nearest to the object side of the first lens component having a positive refractive power up to a surface nearest to the image side of the second lens component having a negative refractive power, in the third lens unit having a positive refractive power, is standardized.

When the air space between the first lens component having a positive refractive power and the second lens component having a negative refractive power, in the third lens unit having a positive refractive power is secured to certain extent, it is possible to take a principal point of the second lens component having a negative refractive power backward (to a rear side), and to bring a position of a principal point of the overall third lens unit frontward.

When an upper limit of conditional expression (21) is surpassed, since the air space between the first lens component having a positive refractive power and the second lens component having a negative refractive power becomes large, making the zoom lens compact, becomes difficult.

When a lower limit of conditional expression (21) is not reached, the air space between the first lens component having a positive refractive power and the second lens component having a negative refractive power, in the third lens unit having a positive refractive power decreases, and a position of the principal point of the second lens does not go backward (to a rear side). Therefore, the position of the principal point of the overall third lens unit cannot be brought frontward (to a front side). Therefore, it is not possible to suppress an aperture which is disposed on the front side of the third lens unit, and due to designing a fast lens with a large aperture, correction of aberration in a surrounding portion becomes difficult. Moreover, when a curvature of a lens following the aperture is made gentle in order to suppress occurrence of aberration, the refractive power of the third lens unit becomes weak, and the zoom ratio is degraded and the overall length of the lens increases, and therefore it is not preferable.

Conditional expression (22) is an expression in which, the focal length of the third lens unit is regulated, and the focal length at the wide angle end of the overall zoom lens system is standardized.

When a lower limit of conditional expression (22) is not reached, the refractive power of the third lens unit becomes excessively large. Therefore, occurrence of the spherical aberration and the coma aberration becomes substantial, and it becomes difficult to correct the aberration, and therefore it is not preferable.

When an upper limit of conditional expression (22) is surpassed, the refractive power of the third lens unit becomes excessively weak, and for securing similar zoom ratio, a measure such as making the amount of movement of the third lens unit large becomes necessary. As a result, the total length of the overall zoom lens system becomes long, and small-sizing becomes difficult.

In the zoom lens according to a preferable aspect of the present invention, it is desirable that the zoom lens satisfies the following conditional expression (23).

$$0.6 < |f_{3\_1}/f_3| < 1.2 \tag{23}$$

where, $f_{3\_1}$ denotes a focal length of the first lens component having a positive refractive power, in the third lens unit, and $f_3$ denotes the focal length of the third lens unit.

Conditional expression (23) is an expression in which, the focal length of the first lens component having a positive refractive power in the third lens unit is regulated, and is standardized by the focal length of the third lens unit.

When a lower limit of conditional expression (23) is not reached, the refractive power of the first lens component having a positive refractive power in the third lens unit becomes excessively strong, and occurrence of the spherical aberration becomes substantial. Therefore, it is not preferable.

When an upper limit of conditional expression (23) is surpassed, the refractive power of the first lens component having a positive refractive power, in the third lens unit becomes excessively weak, and the refractive power of the third lens unit also becomes weak. Therefore, for securing similar zoom ratio, it is necessary to take measures such as making the amount of movement of the third lens unit large, and as a result, the total length becomes long.

In the zoom lens according to a preferable aspect of the present invention, it is desirable that the zoom lens satisfies the following conditional expression (24).

$$0.7 < |f_{3\_2}/f_3| < 2.5 \tag{24}$$

where, $f_{3\_2}$ denotes a focal length of the second lens component having a negative refractive power, in the third lens unit, and $f_3$ denotes the focal length of the third lens unit.

Conditional expression (24) is an expression in which, the focal length of the second lens component having a negative refractive power, in the third lens unit is regulated, and also conditional expression (24) standardizes (by) the focal length of the third lens unit.

When a lower limit of conditional expression (24) is not reached, the refractive power of the second lens component having a negative refractive power, in the third lens unit becomes excessively strong, and the refractive power of the overall third lens unit becomes weak, which is not favorable from a point of small-sizing.

When an upper limit of conditional expression (24) is surpassed, the refractive power of the first lens component having a positive refractive power, in the third lens unit becomes excessively strong relatively, and it becomes difficult to correct aberrations such as the spherical aberration and the coma aberration which occur in the first lens component having a positive refractive power, in the third lens unit. Therefore it is not preferable.

In the zoom lens according to a preferable aspect of the present invention, it is desirable that the zoom lens satisfies the following conditional expression (25).

$$1 < |f_{3\_2}/f_{3\_1}| < 3 \tag{25}$$

where, $f_{3\_1}$ denotes a focal length of the first lens component having a positive refractive power, in the third lens unit, and $f_{3\_2}$ denotes a focal length of the second lens component having a negative refractive power, in the third lens unit.

Conditional expression (25) is an expression in which, a ratio of the focal length of the first lens component having a positive refractive power and the focal length of the second lens component having a negative refractive power, in the third lens unit is regulated.

When a lower limit of conditional expression (25) is not reached, the refractive power of the second lens component having a negative refractive power, in the third lens unit becomes excessively strong, and the refractive power of the overall third lens unit becomes weak, which is not favorable from the point of small-sizing.

When an upper limit of conditional expression (25) is surpassed, the refractive power of the first lens component having a positive refractive power, in the third lens unit becomes excessively strong, and it becomes difficult to correct aberrations such as the spherical aberration and the coma aberration which occur in the first lens component having a positive refractive power, in the third lens unit. Therefore, it is not preferable.

In the zoom lens according to a preferable aspect of the present invention, it is desirable that the zoom lens satisfies the following conditional expression (26).

$$\Sigma d_{3G}/f_t < 0.52 \tag{26}$$

where, $\Sigma d_{3G}$ denotes an overall length of the third lens unit, and $f_t$ denotes a focal length at the telephoto end of the overall zoom lens system.

Conditional expression (26) is a regulation regarding the overall length of the third lens unit. When an upper limit of conditional expression (26) is surpassed, the third lens unit becomes excessively large with respect to the overall zoom lens system, and it becomes difficult to adopt a compact structure.

In the zoom lens according to a preferable aspect of the present invention, it is desirable that the zoom lens satisfies the following conditional expression (27).

$$L_t/f_t < 3.3 \tag{27}$$

where, $L_t$ denotes a total length at a telephoto end of the overall zoom lens system, and $f_t$ denotes a focal length at the telephoto end of the overall zoom lens system.

Conditional expression (27) is an expression in which, the total length at the telephoto end of the overall zoom lens system is regulated, and is standardized by the focal length at the telephoto end of the overall zoom lens system.

When an upper limit of conditional expression (27) is surpassed, the total length at the telephoto end of the overall zoom lens system becomes excessively long, which is not favorable for small-sizing.

In the zoom lens according to a preferable aspect of the present invention, it is desirable that the zoom lens satisfies the following conditional expression (28).

$$0.3<(\beta_{2t}/\beta_{2w})/(\beta_{3t}/\beta_{3w})<0.75 \quad (28)$$

where, $\beta_{2t}$ denotes a lateral magnification at a telephoto end of the second lens unit, $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

Conditional expression (28) is an expression in which, a ratio (proportion) of the zoom ratio of the second lens unit and the zoom ratio of the third lens unit is regulated.

When an upper limit of conditional expression (28) is surpassed, the load of zooming on the second lens unit becomes excessively large, and the occurrence of the chromatic aberration of magnification and the curvature of field at the wide angle end becomes substantial. Therefore, by taking measures such as increasing the number of lenses for correction of the chromatic aberration of magnification and the curvature of field, the structural load becomes large, which is not favorable for small-sizing.

When a lower limit of conditional expression (28) is not reached, the load of zooming on the third lens unit becomes excessively large, and the occurrence of aberrations such as the spherical aberration and the coma aberration becomes substantial. Moreover, the fluctuation in the longitudinal chromatic aberration becomes large, and correction of the aberrations becomes difficult.

An image pickup apparatus according to an aspect of the present invention includes, a zoom lens, and an image pickup element which is disposed on an image side of the zoom lens, and which has an image pickup surface which receives an image by the zoom lens, and the zoom lens is the abovementioned zoom lens.

Moreover, for making the function (action and effect) more assured, it is preferable to let a lower limit value and an upper limit value of each of the abovementioned conditional expressions as follows.

For conditional expression (1), it is preferable to let a lower limit value to be 1, and 1.4 is more preferable.

Moreover, for conditional expression (1), it is preferable to let an upper limit value to be 2.5, and 2.45 is more preferable.

For conditional expression (2), it is more preferable to let a lower limit value to be 0.02.

For conditional expression (2a), it is preferable to let a lower limit value to be −0.05, and 0 is more preferable.

For conditional expression (2b), it is preferable to let a lower limit value to be −0.1, and 0 is more preferable.

For conditional expression (3), it is more preferable to let a lower limit value to be 1.81.

For conditional expression (4), it is more preferable to let an upper limit value to be 0.4.

For conditional expression (5), it is more preferable to let a lower limit value to be 0.65.

Moreover, for conditional expression (5), it is preferable to let an upper limit value to be 1.2, and 1.0 is more preferable.

For conditional expression (6), it is preferable to let a lower limit value to be 0.8, and 0.9 is more preferable.

Moreover, for conditional expression (6), it is preferable to let an upper limit value to be 2.5, and 2 is more preferable.

For conditional expression (7), it is preferable to let a lower limit value to be 1.1, and 1.2 is more preferable.

Moreover, for conditional expression (7), it is preferable to let an upper limit value to be 3, and 2.5 is more preferable.

For conditional expression (8), it is preferable to let a lower limit value to be 2.1, and 2.2 is more preferable.

Moreover, for conditional expression (8), it is preferable to let an upper limit value to be 3.7, and 3.5 is more preferable.

For conditional expression (9), it is more preferable to let an upper limit value to be 2.6.

For conditional expression (10), it is more preferable to let a lower limit value to be 1.82.

For conditional expression (11), it is more preferable to let a lower limit value to be 0.35.

Moreover, for conditional expression (11), it is more preferable to let an upper limit value to be 0.65.

For conditional expression (21), it is preferable to let an upper limit value to be 0.18, and 0.17 is more preferable.

Moreover, for conditional expression (21), it is preferable to let a lower limit value to be 0.08, and 0.09 is more preferable.

For conditional expression (22), it is more preferable to let an upper limit value to be 3.5.

Moreover, for conditional expression (22), it is preferable to let a lower limit value to be 2.3.

For conditional expression (23), it is more preferable to let an upper limit value to be 1.

Moreover, for conditional expression (23), it is preferable to let a lower limit value to be 0.65.

For conditional expression (24), it is more preferable to let an upper limit value to be 2.2.

Moreover, for conditional expression (24), it is preferable to let a lower limit value to be 0.8.

For conditional expression (25), it is preferable to let an upper limit value to be 2.7, and 2.5 is more preferable.

Moreover, for conditional expression (25), it is preferable to let a lower limit value to be 1.1, and 1.2 is more preferable.

For conditional expression (26), it is preferable to let an upper limit value to be 0.45, and 0.4 is more preferable.

For conditional expression (27), it is preferable to let an upper limit value to be 2.9, and 2.6 is more preferable.

For conditional expression (28), it is more preferable to let an upper limit value to be 0.68.

Moreover, for conditional expression (28), it is preferable to let a lower limit value to be 0.32.

The abovementioned zoom lens may satisfy the plurality of arrangements simultaneously. Making such an arrangement is preferable for achieving a zoom lens and an image pickup apparatus which are favorable. Moreover, combinations of preferable arrangements are arbitrary. For each conditional expression, only an upper limit value or a lower limit value in a more specified numerical range of a conditional expression may be restricted.

Exemplary embodiments from a first embodiment to an eleventh embodiment of the zoom lens according to the present invention will be described below. Lens cross-sectional views at a wide angle end at the time of infinite object point focusing of the embodiments from the first embodiment to the eleventh embodiment are shown in FIG. 1A, FIG. 2A, FIG. 3A, FIG. 4A, FIG. 5A, FIG. 6A, FIG. 7A, FIG. 8A, FIG. 9A, FIG. 10A, and FIG. 11A respectively. Lens cross-sectional views in an intermediate focal length state at the time of infinite object point focusing of the embodiments from the first embodiment to the eleventh embodiment are shown in FIG. 1B, FIG. 2B, FIG. 3B, FIG. 4B, FIG. 5B, FIG. 6B, FIG. 7B, FIG. 8B, FIG. 9B, FIG. 10B, and FIG. 11B respectively. Lens cross-sectional views at a telephoto end at the time of infinite object point focusing of the embodiment from the first embodiment to the eleventh embodiment are shown in FIG. 1C, FIG. 2C, FIG. 3C, FIG. 4C, FIG. 5C, FIG. 6C, FIG. 7C, FIG. 8C, FIG. 9C, FIG. 10C, and FIG. 11C respectively. In diagrams from FIG. 1A to FIG. 11C, a first lens unit is denoted by G1, a second lens unit is denoted by G2, a third lens unit is denotes by G3, a fourth lens unit is denoted by G4, a fifth lens unit is denoted by G5, and an aperture stop is denoted by S. Moreover, a flat and parallel plate which forms a low-pass filter on which, a wavelength-region restricting coating which restricts infra-red rays is applied, is denoted by F, a flat and parallel plate of a cover glass of an electronic image pickup element is denoted by C, and an image plane is denoted by I. A multi-layer film for restricting wavelength region may be applied to a surface of the cover glass C. Moreover, an arrangement may be made to impart an effect of a low-pass filter to the cover glass C. An arrangement may be made such that the flat and parallel plate F does not have a function of a low-pass filter. Moreover, for embodiments in which, a filter F has not been shown, the cover glass C also has a function of the filter F.

For cutting off a ghost image and a flare, a flare aperture may be disposed apart from the aperture stop S. A location for disposing the flare aperture may be any of the locations namely, on an object side of the first lens unit G1, between the first lens unit G1 and the second lens unit G2, and between the second lens unit G2 and the third lens unit G3. Moreover, in a case in which, the zoom lens includes four lens units, the location of disposing the flare aperture may be any of the locations namely, between the third lens unit G3 and the fourth lens unit G4, and between the fourth lens unit G4 and the image plane I.

Moreover, in a case in which, the zoom lens includes five lens units, the location of the flare aperture may be any of the locations namely, between the third lens unit G3 and the fourth lens unit G4, between the fourth lens unit G4 and the fifth lens unit G5, and between the fifth lens unit G5 and the image plane I.

An arrangement may be made such that the unnecessary light is cut off by a frame member. Also, an arrangement may be made such that the unnecessary light is cut off by using another member. Moreover, a pattern for cutting off the unnecessary light may be painted or printed directly on an optical system (optical surface). A member such as a seal which cuts off the unnecessary light may be adhered (stuck) to the optical system.

For the flare aperture, and for the member and the pattern for cutting off the unnecessary light, a shape of an area which cuts off the unnecessary light may be any shape such as a circular shape, an elliptical shape, a polygonal shape, and a shape enclosed by a predetermined curve. Moreover, using these, not only the unnecessary light (harmful light beam) but also a light beam which causes a phenomenon such as a coma flare around a screen may be cut off. The predetermined curve may be a curve expressed by a function.

An antireflection coating may be applied to a lens in each lens unit, and the ghost image and the flare may be reduced. When the antireflection coating is let to be a multi coating, it is possible to reduce the ghost image and the flare effectively. Moreover, a coating which cuts off infra-red rays may be applied to a lens surface and a cover glass.

A shading of brightness around an image may be reduced by shifting a micro lens of the CCD. For instance, a design of the micro lens of the CCD may be changed according to an angle of incidence of light rays at each image height. Moreover, an amount of degradation around an image may be corrected by image processing.

For preventing the occurrence of the ghost image and flare, generally, an antireflection coating is applied to a surface in contact with air of a lens. However, a refractive index of an adhesive at a cemented surface of a cemented lens is sufficiently higher than a refractive index of air. Therefore, since a reflectivity of the cemented surface in many cases, is originally at par with a reflectivity of a single-layer coating, or less than the reflectivity of the single-layer coating, the antireflection coating is applied to the cemented surface in few number of cases. However, when the antireflection coating is applied also to the cemented surface with a positive approach, since it is possible to reduce further the ghost image and flare, it enables to achieve more favorable image.

Particularly, recently, a glass material having a high refractive index has been used widely. Since the glass material having a high refractive index has a superior effect of aberration correction, it has been used a lot in optical systems for camera. However, when the glass material having a high refractive index is used for a cemented lens, reflection at a cemented surface cannot be disregarded. In such a case, applying the antireflection coating on the cemented surface is particularly effective.

An effective usage of the antireflection coating for the cemented surface has been disclosed in literatures such as Japanese Patent Application Laid-open Publication Nos. Hei 2-27301, 2001-324676, 2005-92115, and U.S. Pat. No. 7,116,482. In the abovementioned literatures, a zoom lens of a positive-lead type has been disclosed, and with regard to the antireflection coating, particularly, an antireflection coating of a cemented surface in a first lens unit has been mentioned.

Therefore, even in the zoom lens according to the present invention, for a cemented lens in the first lens unit G1, a coating is to be applied as disclosed in the abovementioned literatures. A material to be used for coating is to be selected appropriately according to a refractive index of a lens which is a base, and a refractive index of an adhesive material. For example, as a coating material having a comparatively high refractive index, a material such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$, and as a coating material having a comparatively low refractive index, a material such as $MgF_2$, $SiO_2$, and $Al_2O_3$ may be used appropriately, and a film thickness is to be selected such that a phase condition is satisfied.

As a matter of course, the antireflection coating on the cemented surface may be let to be a multi coating similarly as the coating on the surface in contact with air of the lens. Moreover, by combining the number of films (not less than two layers) and the film thickness, it is possible to reduce the reflectivity further, and to control characteristics such as spectral characteristics and angular characteristics.

Moreover, it is needless to mention that even for a cemented surface of a lens in a lens unit other than the first lens unit G1, applying the antireflection coating on the cemented surface based on a similar principle.

In a case in which, the zoom lens includes four lens unit, it is desirable to carry out focusing for adjusting a focus by the third lens unit G3, and in a case in which, the zoom lens includes five lens units, it is desirable to carryout focusing by the third lens G3 or the fourth lens unit G4. Since weight of a lens in the third lens unit G3 is light, when the focusing is carried out by the third lens unit G3, a load exerted on a motor is small.

The focusing may be carried out by other lens units. Moreover, the focusing may be carried out by moving the plurality of lens units. The focusing may also be carried out by drawing out the entire zoom lens system, or by drawing out some of the lenses, and the focusing may be carried out by drawing in.

In each embodiment, numerical data is data in a state when focused at an object at infinity. A unit of length of each numerical value is mm and a unit of angle of each numerical value is ° (degrees). Furthermore, zoom data are values at a wide angle end (wide angle), an intermediate focal length state (intermediate), and at a telephoto end (telephoto).

Figure 1B:
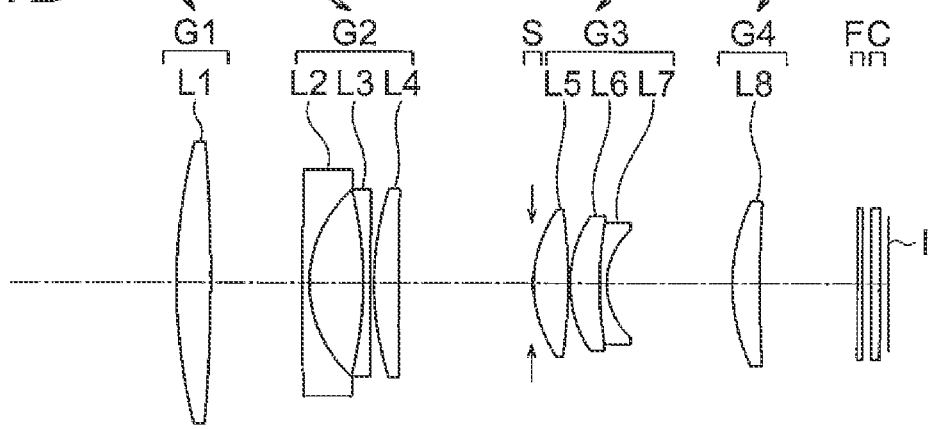
Figure 1C:
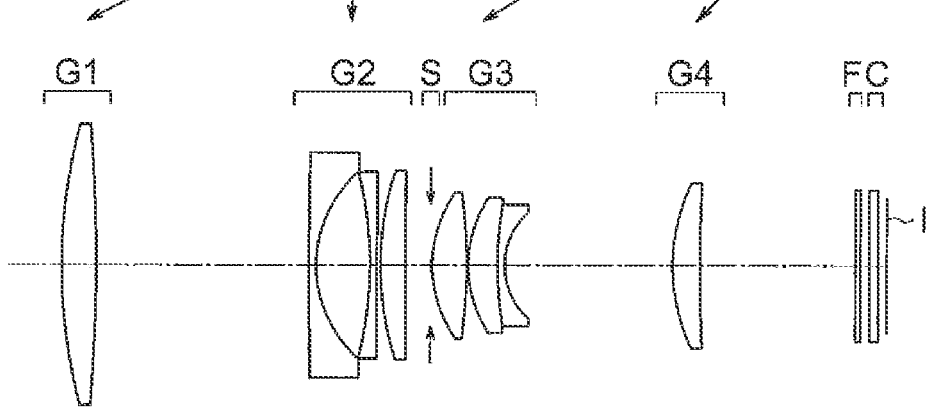

A zoom lens according to the first embodiment, as shown in FIG. 1A, FIG. 1B, and FIG. 1C includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a negative meniscus lens L2 having a convex surface directed toward the object side, a biconcave negative lens L3, and a positive meniscus lens L4 having a convex surface directed toward the object side.

The third lens unit G3 includes a biconvex positive lens L5, and a cemented lens of a positive meniscus lens L6 having a convex surface directed toward the object side and a negative meniscus lens L7 having a convex surface directed toward the object side.

The fourth lens unit G4 includes a positive meniscus lens L8 having a convex surface directed toward the object side.

An aspheric surface is used for three surfaces namely, both surfaces of the biconvex positive lens L5, and a surface on the object side of the positive meniscus lens L8.

Figure 2A:
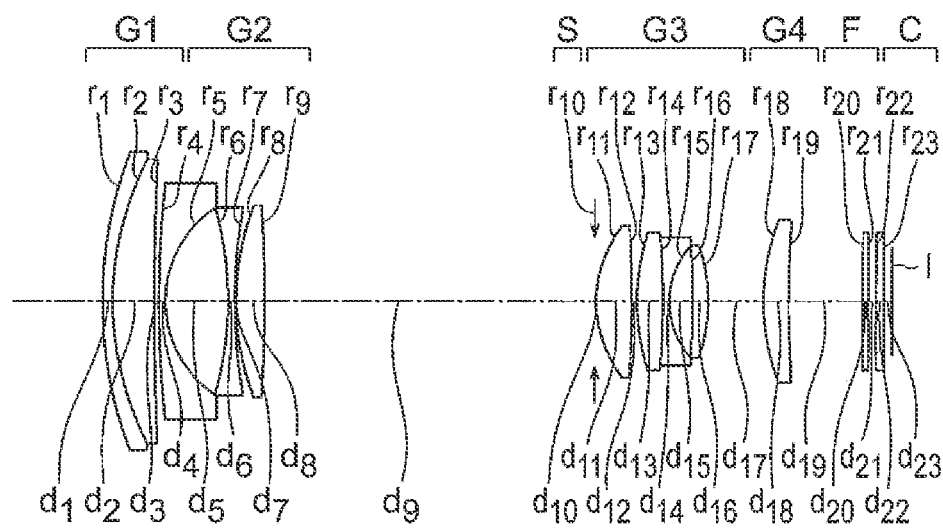
FIG. 2A, FIG. 2B, and FIG. 2C are cross-sectional views along an optical axis showing an optical arrangement at the time of infinite object point focusing of a zoom lens according to a second embodiment of the present invention, where.
Figure 2B:
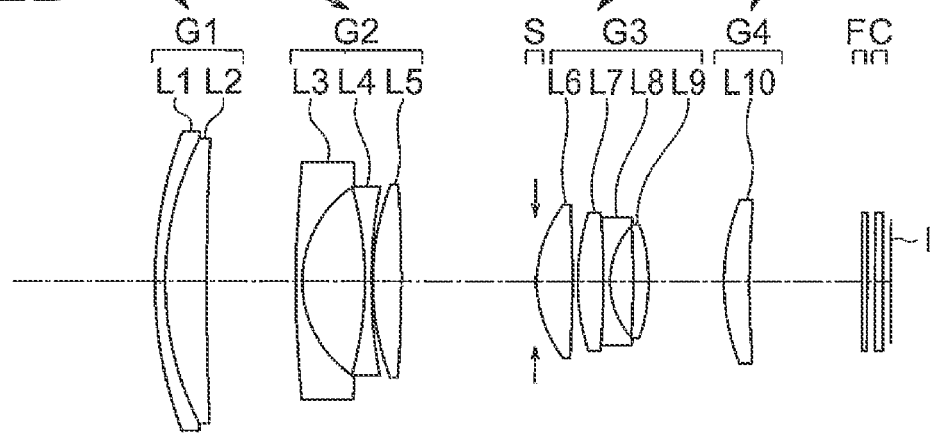
Figure 2C:
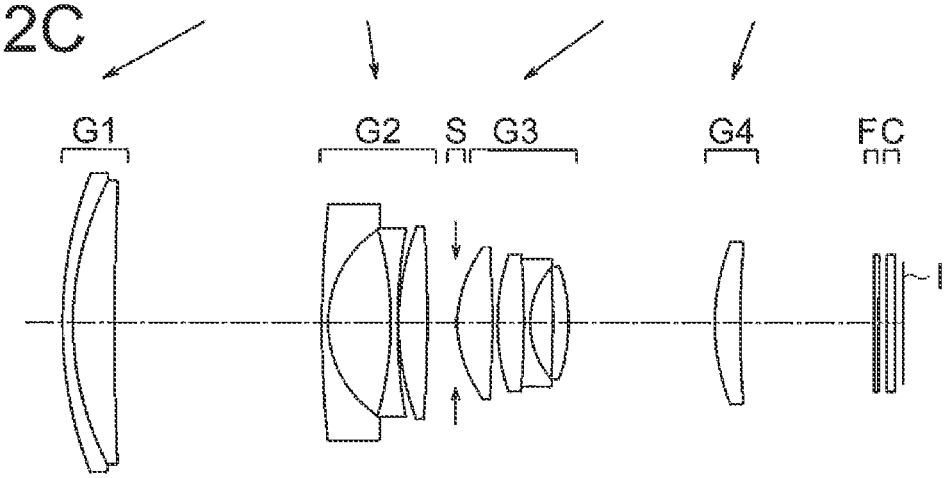

A zoom lens according to the second embodiment, as shown in FIG. 2A, FIG. 2B, and FIG. 2C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a biconvex positive lens L7 and a biconcave negative lens L8, and a positive meniscus lens L9 having a convex surface directed toward the image side.

The fourth lens unit G4 includes a positive meniscus lens L10 having a convex surface directed toward the object side.

An aspheric surface is used for four surfaces namely, both surfaces of the biconvex positive lens L6, an image-side surface of the positive meniscus lens L9, and an object-side surface of the positive meniscus lens L10.

Figure 3A:
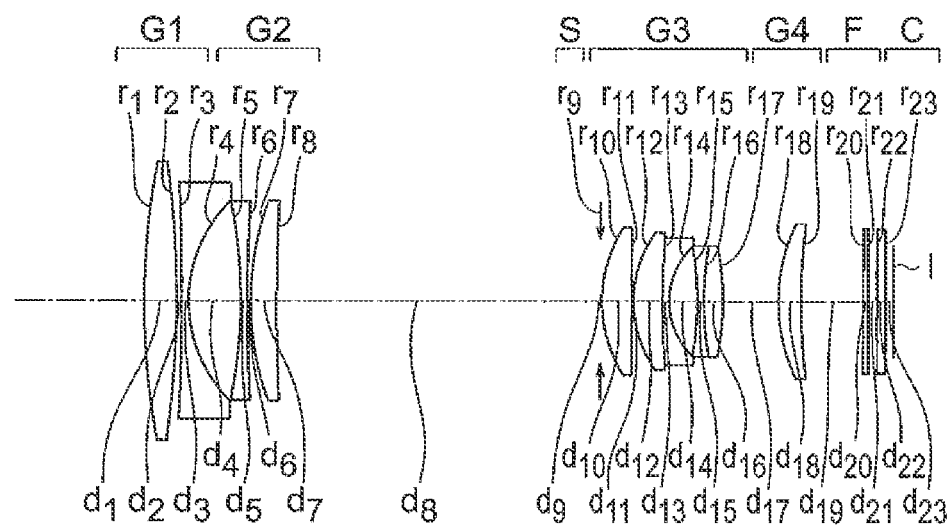
FIG. 3A, FIG. 3B, and FIG. 3C are cross-sectional views along an optical axis showing an optical arrangement at the time of infinite object point focusing of a zoom lens according to a third embodiment of the present invention, where.
Figure 3B:
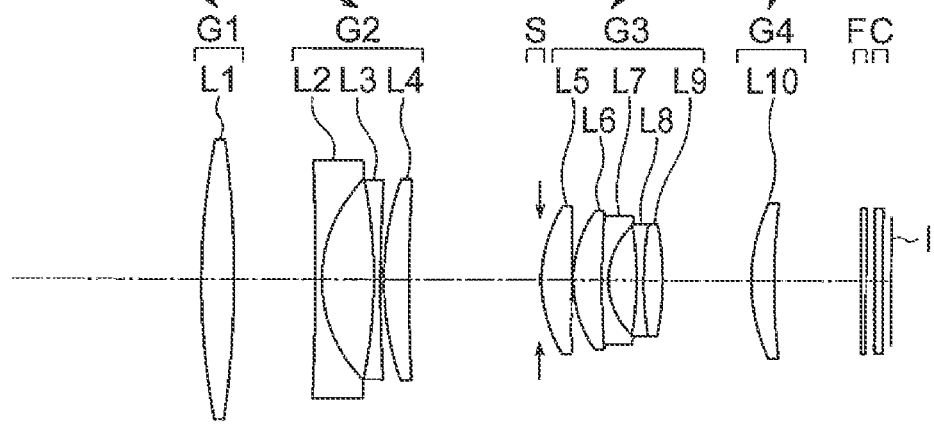
Figure 3C:
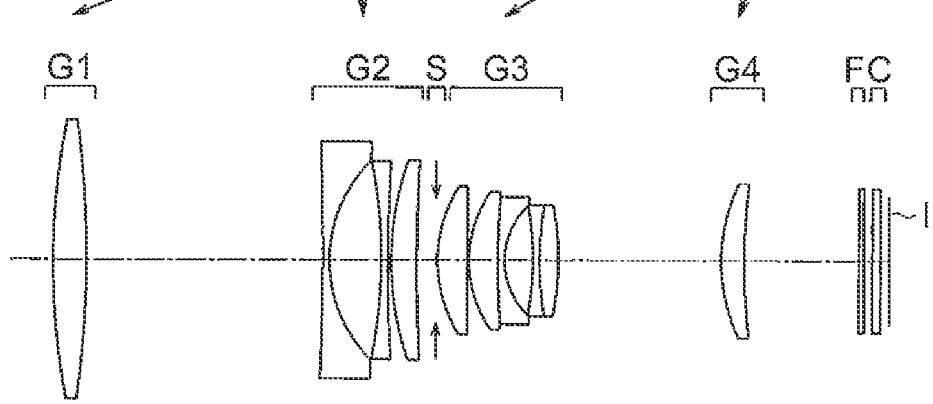

A zoom lens according to the third embodiment, as shown in FIG. 3A, FIG. 3B, and FIG. 3C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a biconcave negative lens L2, a biconcave negative lens L3, and a positive meniscus lens L4 having a convex surface directed toward the object side.

The third lens unit G3 includes a positive meniscus lens L5 having a convex surface directed toward the object side, a cemented lens of a positive meniscus lens L6 having a convex surface directed toward the object side and a negative meniscus lens L7 having a convex surface directed toward the object side, and a cemented lens of a biconcave negative lens L8 and a biconvex positive lens L9.

The fourth lens unit G4 includes a positive meniscus lens L10 having a convex surface directed toward the object side.

An aspheric surface is used for four surfaces namely, both surfaces of the positive meniscus lens L5, a surface on the image side of the biconvex positive lens L9, and a surface on the object side of the positive meniscus lens L10.

Figure 4A:
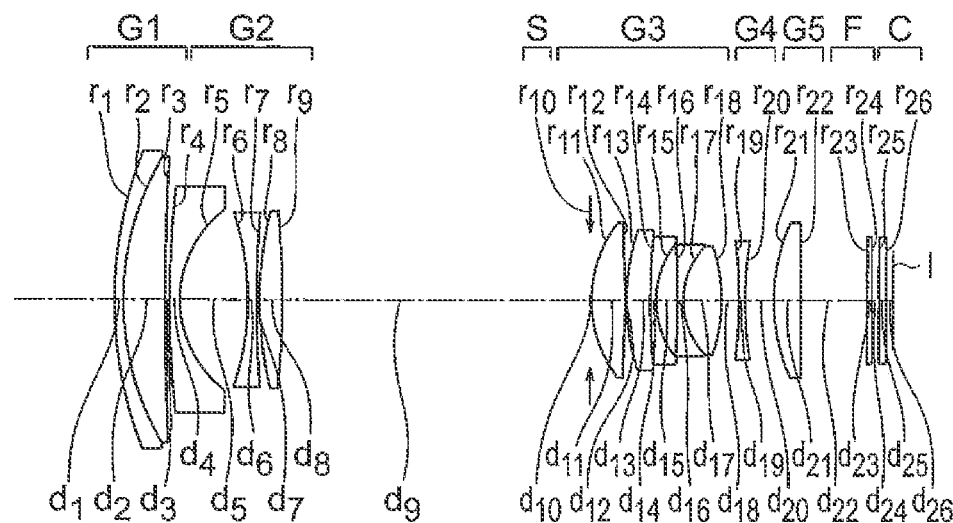
FIG. 4A, FIG. 4B, and FIG. 4C are cross-sectional views along an optical axis showing an optical arrangement at the time of infinite object point focusing of a zoom lens according to a fourth embodiment of the present invention, where.
Figure 4B:
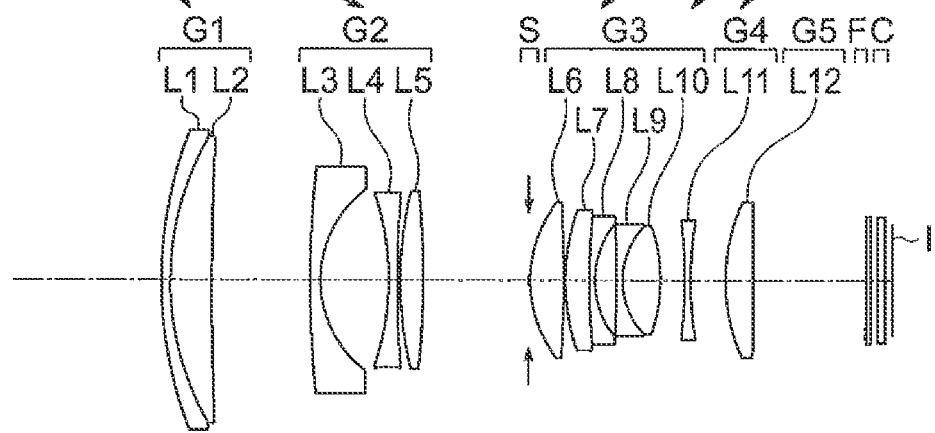
Figure 4C:
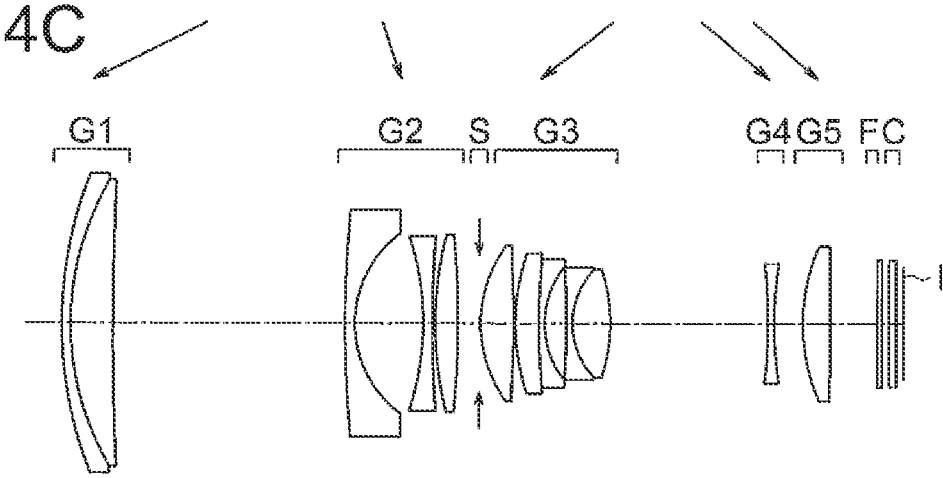

A zoom lens according to the fourth embodiment, as shown in FIG. 4A, FIG. 4B, and FIG. 4C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4, after moving toward the object side, moves toward the image side. The fifth lens unit G5, after moving toward the object side, moves toward the image side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a positive meniscus lens L7 having a convex surface directed toward the object side and a negative meniscus lens L8 having a convex surface directed toward the object side, and a cemented lens of a biconcave negative lens L9 and a biconvex positive lens L10.

The fourth lens unit G4 includes a biconcave negative lens L11.

The fifth lens unit G5 includes a biconvex positive lens L12.

An aspheric surface is used for four surfaces namely, both surfaces of the biconvex positive lens L6, a surface on the image side of the biconvex positive lens L10, and a surface on the object side of the biconvex positive lens L12.

Figure 5A:
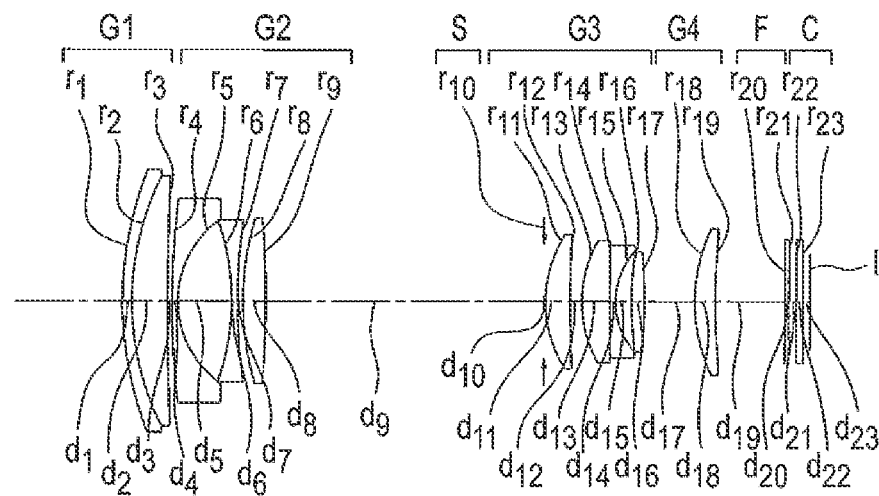
FIG. 5A, FIG. 5B, and FIG. 5C are cross-sectional views along an optical axis showing an optical arrangement at the time of infinite object point focusing of a zoom lens according to a fifth embodiment of the present invention, where.
Figure 5B:
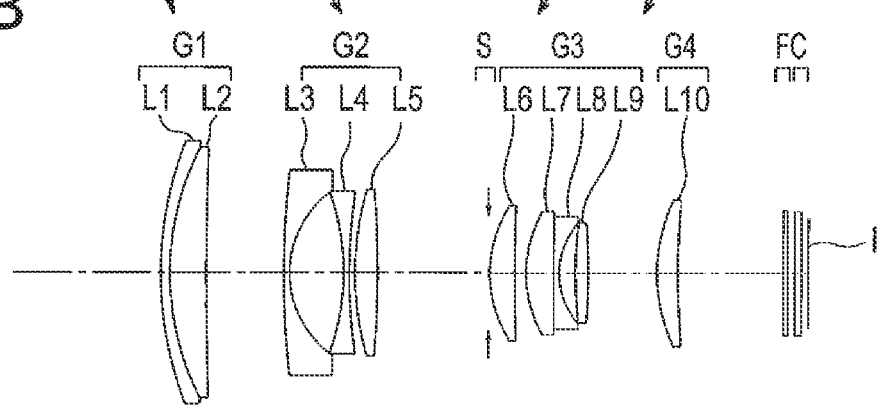
Figure 5C:
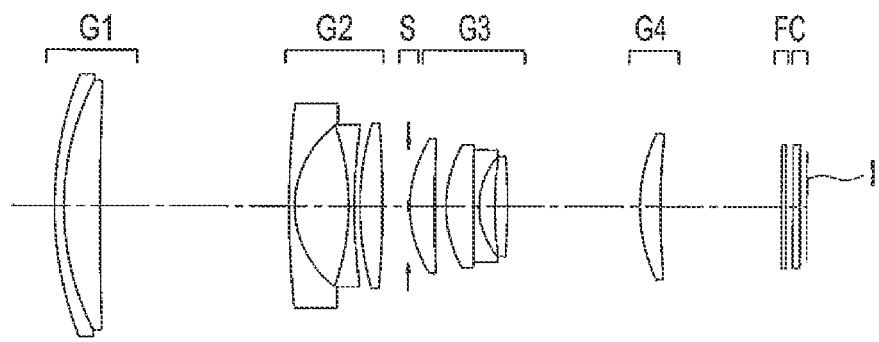

A zoom lens according to the fifth embodiment, as shown in FIG. 5A, FIG. 5B, and FIG. 5C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a cemented lens of a positive meniscus lens L7 having a convex surface directed toward the object side and a negative meniscus lens L8 having a convex surface directed toward the object side, and a biconvex positive lens L9.

The fourth lens unit G4 includes a positive meniscus lens L10 having a convex surface directed toward the object side.

Here, the positive meniscus lens L6 is the first lens component having a positive refractive power, and the cemented lens of the positive meniscus lens L7 and the negative meniscus lens L8 is the second lens component having a negative refractive power.

An aspheric surface is provided to five surfaces namely, a surface on the object side of the biconcave negative lens L4, both surfaces of the positive meniscus lens L6, a surface on the image side of the biconvex positive lens L9, and a surface on the object side of the positive meniscus lens L10.

Figure 6A:
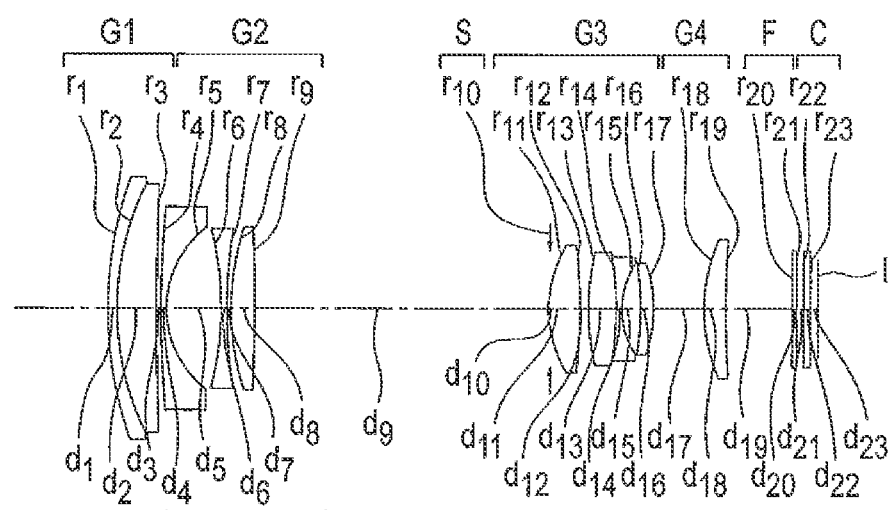
FIG. 6A, FIG. 6B, and FIG. 6C are cross-sectional views along an optical axis showing an optical arrangement at the time of infinite object point focusing of a zoom lens according to a sixth embodiment of the present invention, where.
Figure 6B:
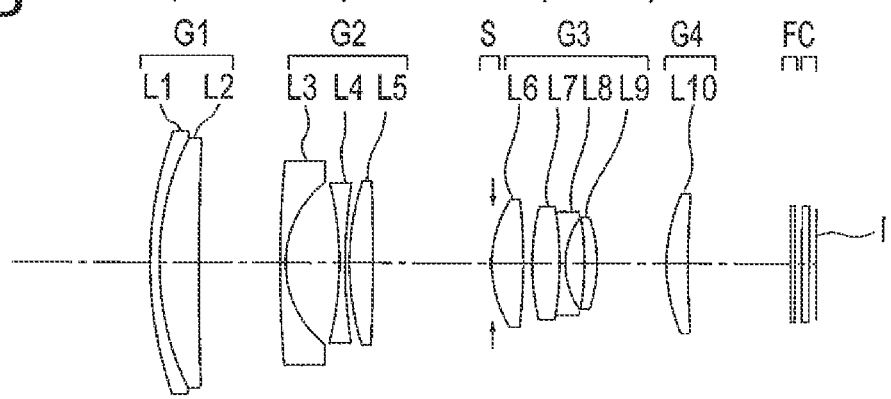
Figure 6C:
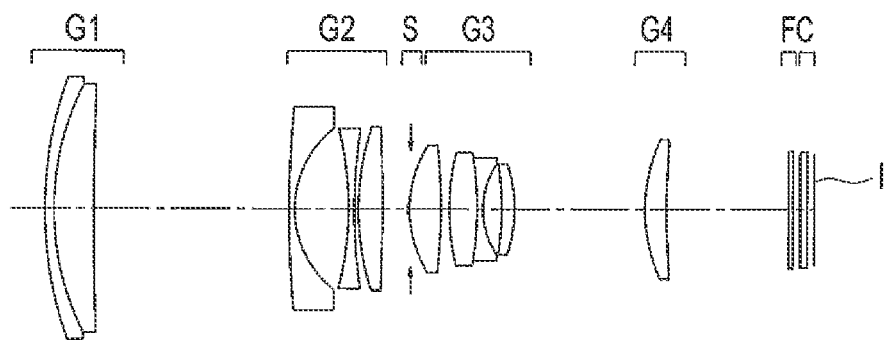

A zoom lens according to the sixth embodiment, as shown in FIG. 6A, FIG. 6B, and FIG. 6C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a biconvex positive lens L7 and a biconcave negative lens L8, and a positive meniscus lens L9 having a convex surface directed toward the image side.

The fourth lens unit G4 includes a positive meniscus lens L10 having a convex surface directed toward the object side.

Here, the biconvex positive lens L6 is the first lens component having a positive refractive power, and the cemented lens of the biconvex positive lens L7 and the biconcave negative lens L8 is the second lens component having a negative refractive power.

An aspheric surface is provided to four surfaces namely, both surfaces of the biconvex positive lens L6, a surface on the image side of the positive meniscus lens L9, and a surface on the object side of the positive meniscus lens L10.

Figure 7A:
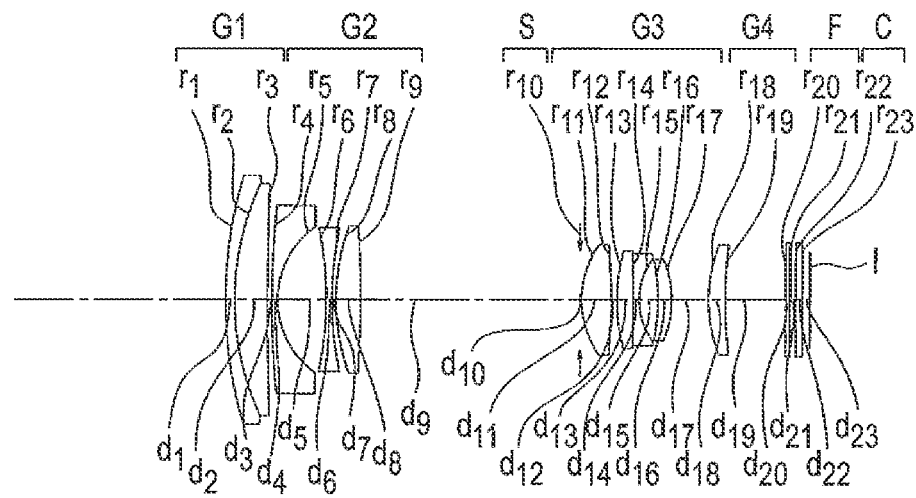
FIG. 7A, FIG. 7B, and FIG. 7C are cross-sectional views along an optical axis showing an optical arrangement at the time of infinite object point focusing of a zoom lens according to a seventh embodiment of the present invention, where.
Figure 7B:
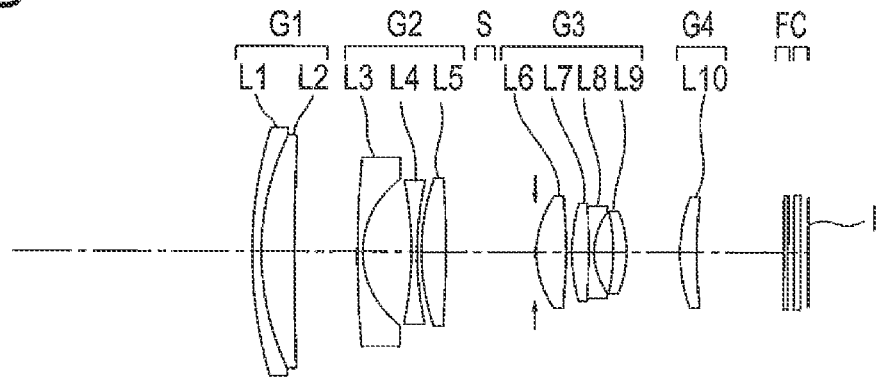
Figure 7C:
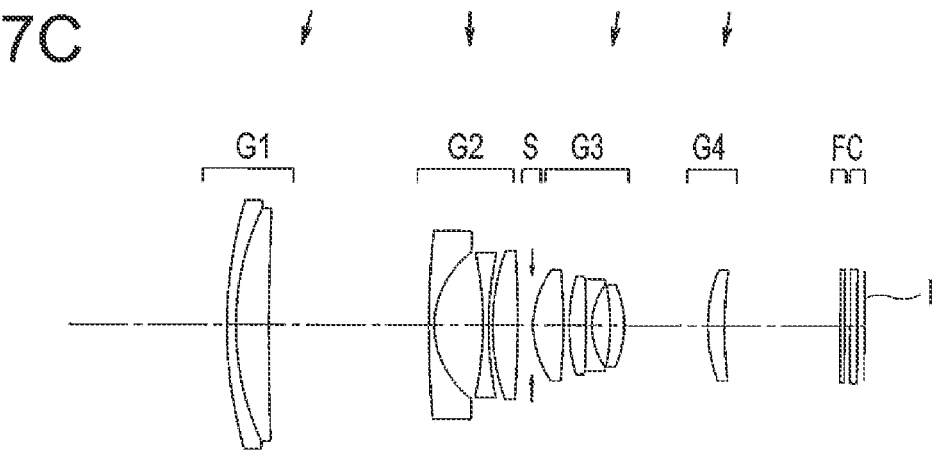

A zoom lens according to the seventh embodiment, as shown in FIG. 7A, FIG. 7B, and FIG. 7C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a biconvex positive lens L7 and a biconcave negative lens L8, and a positive meniscus lens L9 having a convex surface directed toward the image side.

The fourth lens unit G4 includes a positive meniscus lens L10 having a convex surface directed toward the object side.

Here, the biconvex positive lens L6 is the first lens component having a positive refractive power, and the cemented lens of the biconvex positive lens L7 and the biconcave negative lens L8 is the second lens component.

An aspheric surface is provided to four surfaces namely, both surfaces of the biconvex positive lens L6, a surface on the image side of the positive meniscus lens L9, and a surface on the object side of the positive meniscus lens L10.

Figure 8A:
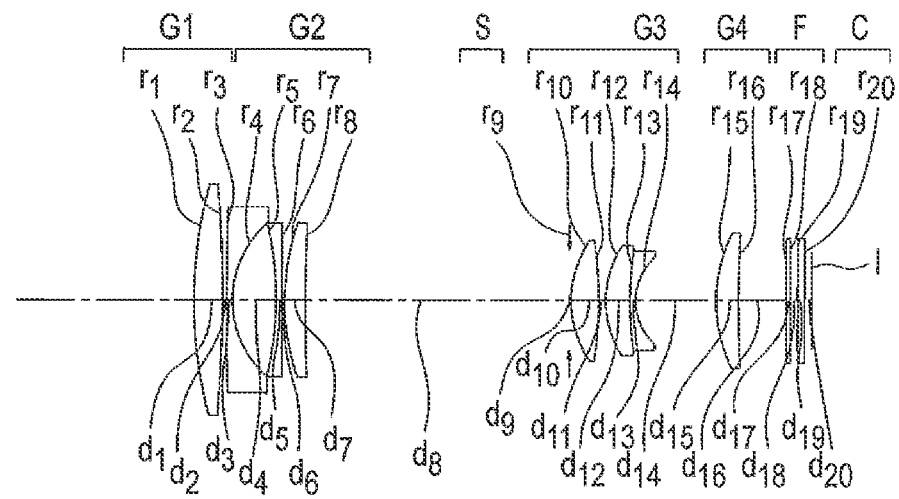
FIG. 8A, FIG. 8B, and FIG. 8C are cross-sectional views along an optical axis showing an optical arrangement at the time of infinite object point focusing of a zoom lens according to an eighth embodiment of the present invention, where.
Figure 8B:
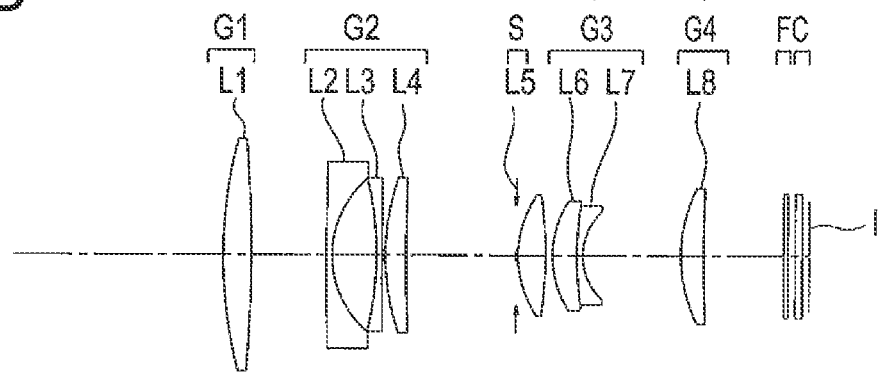
Figure 8C:
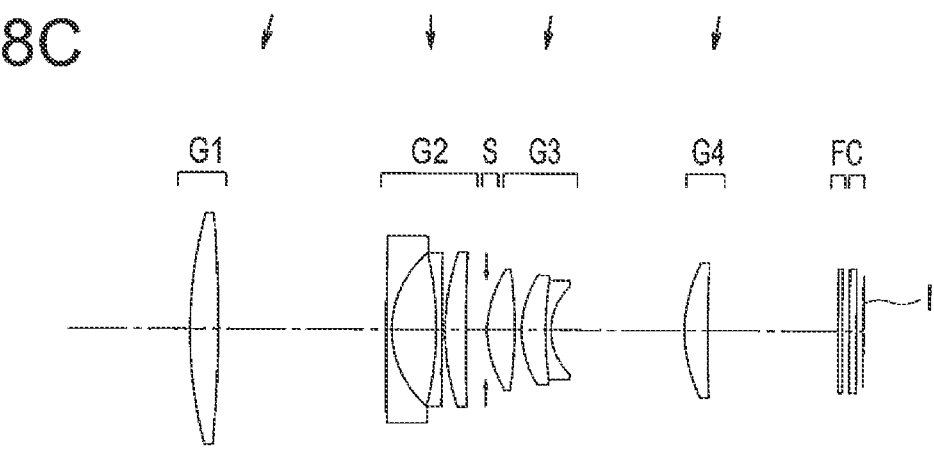

A zoom lens according to the eighth embodiment, as shown in FIG. 8A, FIG. 8B, and FIG. 8C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a negative meniscus lens L2 having a convex surface directed toward the object side, biconcave negative lens L3, and a positive meniscus lens L4 having a convex surface directed toward the object side.

The third lens unit G3 includes a biconvex positive lens L5, and a cemented lens of a positive meniscus lens L6 having a convex surface directed toward the object side and a negative meniscus lens L7 having a convex surface directed toward the object side. The fourth lens unit G4 includes a positive meniscus lens L8 having a convex surface directed toward the object side.

Here, the biconvex positive lens L5 is the first lens component having a positive refractive power, and the cemented lens of the positive meniscus lens L6 and the negative meniscus lens L7 is the second lens component having a negative refractive power.

An aspheric surface is provided to three surfaces namely, both surfaces of the biconvex positive lens L6, and a surface on the object side of the positive meniscus lens L8.

Figure 9A:
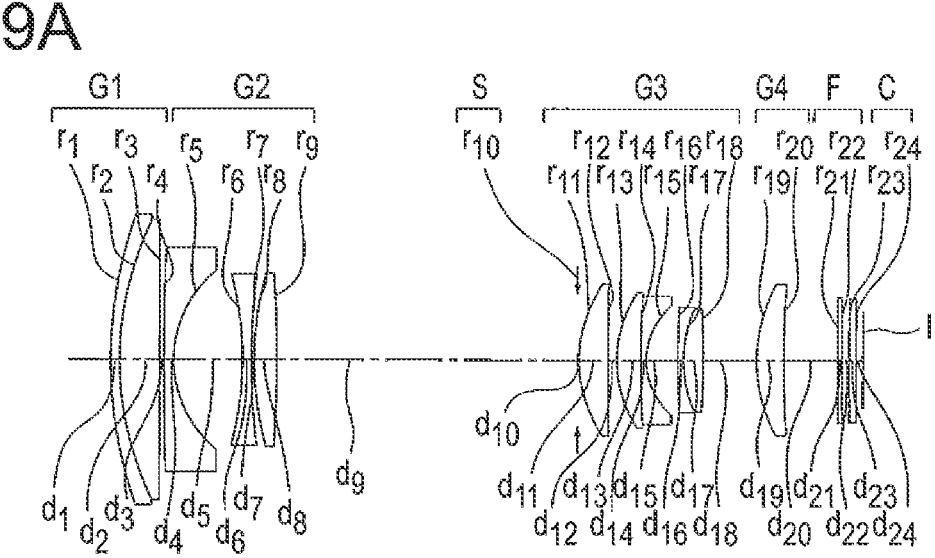
FIG. 9A, FIG. 9B, and FIG. 9C are cross-sectional views along an optical axis showing an optical arrangement at the time of infinite object point focusing of a zoom lens according to a ninth embodiment of the present invention, where.
Figure 9B:
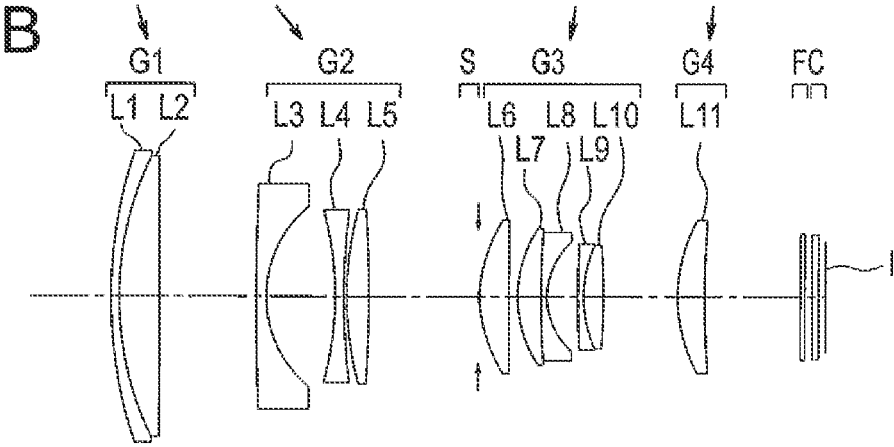
Figure 9C:
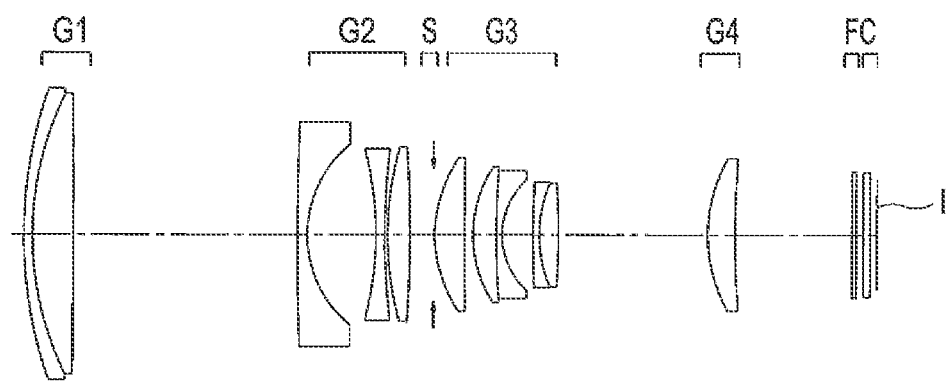

A zoom lens according to the ninth embodiment, as shown in FIG. 9A, FIG. 9B, and FIG. 9C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, moves toward the object side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a biconvex positive lens L2.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a cemented lens of a positive meniscus lens L7 having a convex surface directed toward the object side and a negative meniscus lens L8 having a convex surface directed toward the object side, and a cemented lens of a negative meniscus lens L9 having a convex surface directed toward the object side and the biconvex positive lens L10.

The fourth lens unit G4 includes a positive meniscus lens L11 having a convex surface directed toward the object side.

Here, the positive meniscus lens L6 is the first lens component having a positive refractive power, and the cemented lens of the positive meniscus lens L7 and the negative meniscus lens L8 is the second lens component having a negative refractive power.

An aspheric surface is provided for four surfaces namely, both surfaces of the positive meniscus lens L6, a surface on the image side of the biconvex positive lens L10, and a surface on the object side of the positive meniscus lens L11.

Figure 10A:
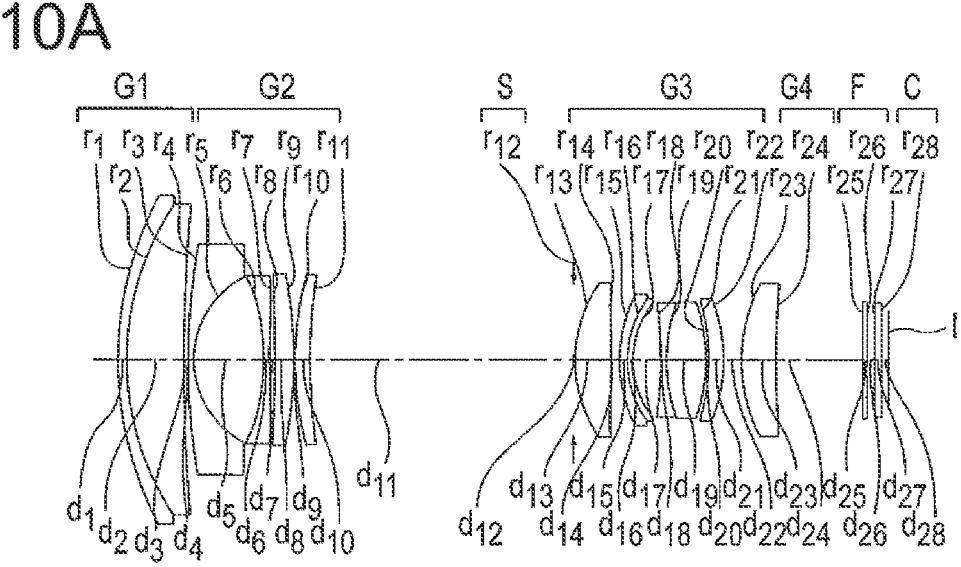
FIG. 10A, FIG. 10B, and FIG. 10C are cross-sectional views along an optical axis showing an optical arrangement at the time of infinite object point focusing of a zoom lens according to a tenth embodiment of the present invention, where.
Figure 10B:
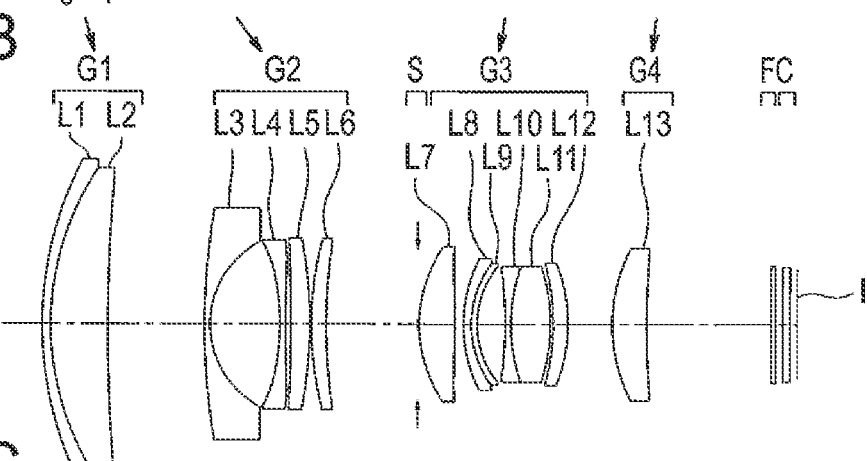
Figure 10C:
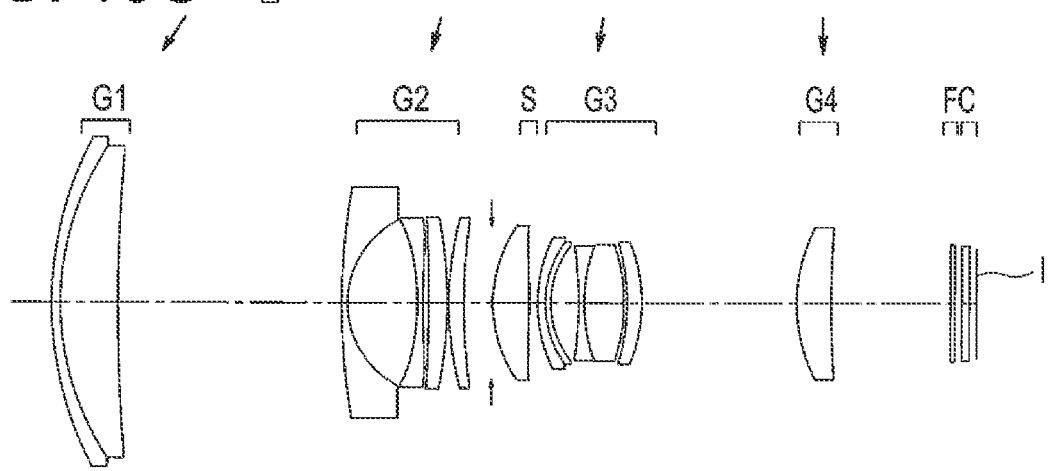

A zoom lens according to the tenth embodiment, as shown in FIG. 10A, FIG. 10B, and FIG. 10C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, moves toward the object side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, a positive meniscus lens L5 having a convex surface directed toward the image side, and a positive meniscus lens L6 having a convex surface directed toward the object side.

The third lens unit G3 includes a biconvex positive lens L7, a cemented lens of a negative meniscus lens L8 having a convex surface directed toward the object side and a negative meniscus lens L9 having a convex surface directed toward the object side, a cemented lens of a biconcave negative lens L10 and a biconvex positive lens L11, and a positive meniscus lens L12 having a convex surface directed toward the image side.

The fourth lens unit G4 includes a positive meniscus lens L13 having a convex surface directed toward the object side.

Here, the biconvex positive lens L7 is the first lens component having a positive refractive power, and the cemented lens of the negative meniscus lens L8 and the negative meniscus lens L9 is the second lens component having a negative refractive power.

An aspheric surface is provided to six surfaces namely, both surfaces of the biconcave negative lens L4, both surfaces of the biconvex positive lens L7, a surface on the image side of the positive meniscus lens L12, and a surface on the object side of the positive meniscus lens L13.

Figure 11A:
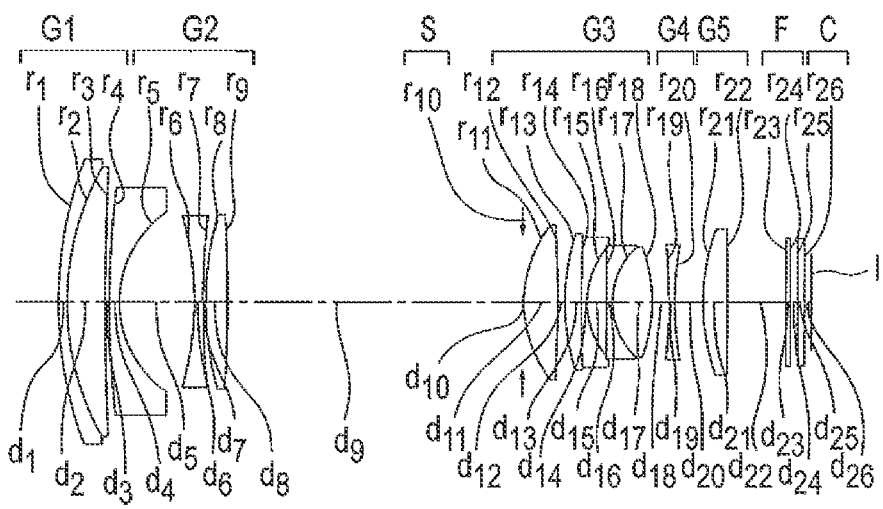
FIG. 11A, FIG. 11B, and FIG. 11C are cross-sectional views along an optical axis showing an optical arrangement at the time of infinite object point focusing of a zoom lens according to an eleventh embodiment of the present invention, where.
Figure 11B:
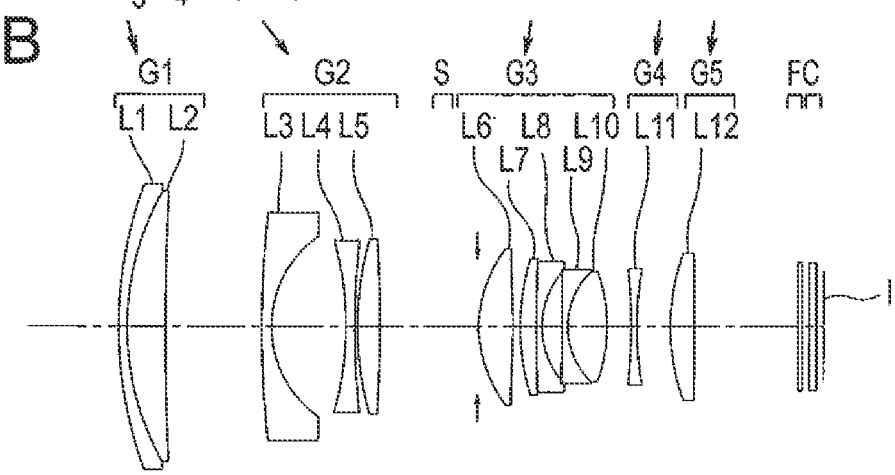
Figure 11C:
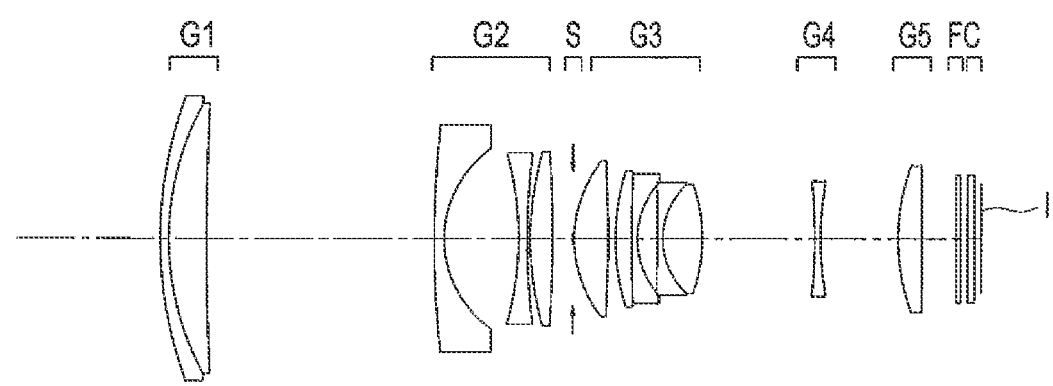

A zoom lens according to the eleventh embodiment, as shown in FIG. 11A, FIG. 11B, and FIG. 11C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4, after moving toward the object side, moves toward the image side. The fifth lens unit G5, after moving toward the object side, moves toward the image side. The aperture stops S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a positive meniscus lens L7 having a convex surface directed toward the object side and a negative meniscus lens L8 having a convex surface directed toward the object side, and a cemented lens of a biconcave negative lens L9 and a biconvex positive lens L10.

The fourth lens unit G4 includes a biconcave negative lens L11.

The fifth lens unit G5 includes a biconvex positive lens L12.

Here, the biconvex positive lens L6 is the first lens component having a positive refractive power, and the cemented lens of the positive meniscus lens L7 and the negative meniscus lens L8 is the second lens component having a negative refractive power.

An aspheric surface is provided to four surfaces namely, both surfaces of the positive meniscus lens L6, a surface on the image side of the biconvex positive lens L10, a surface on the image side of the biconcave negative lens L11, and a surface on the object side of the biconvex positive lens L12.

Numerical data of each of the abovementioned embodiments is shown below. Apart from the symbols described above, fb denotes back focus, f1, f2, . . . denote a focal length of each lens unit, FNO denotes an F-number, ω denotes a half angle of field, r denotes a radius of curvature of each lens surface, d denotes distance between lenses, nd denotes a refractive index for a d-line of each lens, and νd denotes Abbe's number for each lens. The total length of the lens which will be described later is a length in which, the back focus is added to a distance from a front-most lens surface up to a rear-most lens surface. fb (back focus) is a value which is obtained by letting a distance from the rear-most lens surface up to a paraxial image plane to be subjected to air-conversion Moreover, each aspheric surface is expressed by the following conditional expression (I) by using each aspheric-surface coefficient in each embodiment.

Here, a coordinate in an optical axial direction is let to be Z and a coordinate in a direction perpendicular to an optical axis is let to be Y.

$$Z=(Y^2/r)/[1+\{1-(K+1)(Y/r)^2\}^{1/2}]A_4Y^4+A_6Y^6+A_8Y^8+A_{10}Y^{10}+A_{12}Y^{12} \quad (I)$$

where, r denotes a paraxial radius of curvature,

K denotes a conical coefficient,

A4, A6, A8, A10, and A12 ($A_4$, $A_6$, $A_8$, $A_{10}$, and $A_{12}$) denote an aspherical coefficient of a fourth order, a sixth order, an eighth order, a tenth order, and a twelfth order respectively.

Moreover, in the aspherical coefficients, 'e-n' (where, n is an integral number) indicates $10^{-n}$.

Example 1

Unit mm

Surface data

| Surface no. | r | d | nd | νd |
|---|---|---|---|---|
| Object plane | ∞ | ∞ | | |
| 1 | 32.135 | 2.00 | 1.49700 | 81.54 |
| 2 | −102.316 | Variable | | |
| 3 | 328.385 | 0.40 | 1.88300 | 40.76 |
| 4 | 7.290 | 3.10 | | |
| 5 | −22.607 | 0.40 | 1.88300 | 40.76 |
| 6 | 833.870 | 0.20 | | |
| 7 | 17.699 | 1.45 | 1.92286 | 18.90 |
| 8 | 307.224 | Variable | | |
| 9 (stop) | ∞ | 0.10 | | |
| 10* | 6.919 | 1.99 | 1.58313 | 59.38 |
| 11* | −28.825 | 0.10 | | |
| 12 | 7.122 | 1.70 | 1.88300 | 40.76 |
| 13 | 21.541 | 0.40 | 1.80810 | 22.76 |
| 14 | 4.206 | Variable | | |
| 15* | 10.426 | 1.60 | 1.52542 | 55.78 |
| 16 | 90.000 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane | ∞ | | | |

(Image pickup surface)
Aspherical surface data

10th surface

K = 0.000
A4 = −3.56614e−04,   A6 = −2.66751e−07,   A8 = −2.38109e−07

11th surface

K = 0.000
A4 = 1.04332e−04,   A6 = 1.85779e−06,   A8 = −1.38006e−07

15th surface

K = 0.000
A4 = −1.67784e−04,   A6 = 7.36083e−07,   A8 = 2.38133e−08

Zoom data

| | Wide angle | Intermediate | Telephoto |
|---|---|---|---|
| Focal length | 5.06 | 9.82 | 19.43 |
| Fno. | 2.04 | 2.46 | 3.06 |
| Angle of field 2ω | 76.16 | 43.39 | 22.23 |
| fb (in air) | 4.76 | 7.15 | 10.50 |
| Lens total length (in air) | 43.08 | 40.81 | 47.33 |
| d2 | 0.30 | 5.30 | 12.29 |
| d8 | 18.49 | 7.68 | 1.44 |
| d14 | 6.09 | 7.23 | 9.66 |
| d16 | 3.23 | 5.63 | 8.97 |

Unit focal length

| f1 = 49.45 | f2 = −9.73 | f3 = 11.71 | f4 = 22.29 |
|---|---|---|---|

Example 2

Unit mm

Surface data

| Surface no. | r | d | nd | νd |
|---|---|---|---|---|
| Object plane | ∞ | ∞ | | |
| 1 | 27.270 | 0.65 | 1.94595 | 17.98 |
| 2 | 20.019 | 2.64 | 1.83481 | 42.71 |
| 3 | 203.376 | Variable | | |
| 4 | 73.749 | 0.40 | 1.91082 | 35.25 |
| 5 | 7.249 | 3.99 | | |
| 6 | −21.829 | 0.40 | 1.83481 | 42.71 |
| 7 | 32.903 | 0.10 | | |
| 8 | 17.612 | 1.80 | 1.92286 | 18.90 |
| 9 | −89.189 | Variable | | |
| 10 (stop) | ∞ | 0.10 | | |
| 11* | 7.510 | 2.25 | 1.74320 | 49.34 |
| 12* | −48.545 | 0.33 | | |
| 13 | 14.459 | 1.65 | 1.83481 | 42.71 |
| 14 | −52.242 | 0.40 | 1.80518 | 25.42 |
| 15 | 5.370 | 1.46 | | |
| 16 | −61.650 | 0.98 | 1.49700 | 81.54 |
| 17* | −12.375 | Variable | | |
| 18* | 13.813 | 1.60 | 1.52542 | 55.78 |
| 19 | 58.824 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane | ∞ | | | |

(Image pickup surface)
Aspherical surface data

11th surface

K = 0.000
A4 = −1.92439e−04, A6 = −4.01467e−06, A8 = −7.06408e−09

12th surface

K = 0.000
A4 = 2.80184e−04, A6 = −5.94716e−06, A8 = 1.14233e−07

17th surface

K = 0.000
A4 = −2.95183e−04, A6 = 2.10662e−06, A8 = −7.25857e−07

18th surface

K = 0.000
A4 = −6.51591e−05, A6 = 8.92210e−07

Zoom data

| | Wide angle | Intermediate | Telephoto |
|---|---|---|---|
| Focal length | 5.03 | 10.70 | 24.20 |
| Fno. | 1.84 | 2.23 | 2.89 |
| Angle of field 2ω | 75.25 | 39.93 | 17.88 |
| fb (in air) | 6.28 | 8.72 | 10.04 |
| Lens total length (in air) | 49.79 | 46.41 | 53.00 |
| d3 | 0.30 | 5.65 | 13.14 |
| d9 | 20.95 | 8.52 | 1.80 |
| d17 | 3.50 | 4.77 | 9.27 |
| d19 | 4.74 | 7.17 | 8.50 |

Unit focal length

| f1 = 39.50 | f2 = −9.06 | f3 = 12.62 | f4 = 33.94 |

Example 3

Unit mm

Surface data

| Surface no. | r | d | nd | νd |
|---|---|---|---|---|
| Object plane | ∞ | ∞ | | |
| 1 | 45.610 | 1.98 | 1.43700 | 95.10 |
| 2 | −62.539 | Variable | | |
| 3 | −177.607 | 0.40 | 1.88300 | 40.76 |
| 4 | 8.662 | 3.16 | | |
| 5 | −30.819 | 0.40 | 1.72916 | 54.68 |
| 6 | 106.371 | 0.19 | | |
| 7 | 18.181 | 1.57 | 1.92286 | 18.90 |
| 8 | 107.134 | Variable | | |
| 9 (stop) | ∞ | 0.10 | | |
| 10* | 8.164 | 1.80 | 1.74320 | 49.29 |
| 11* | 2266.058 | 0.10 | | |
| 12 | 7.396 | 1.74 | 1.88300 | 40.76 |
| 13 | 52.632 | 0.40 | 1.84666 | 23.78 |
| 14 | 4.647 | 1.70 | | |
| 15 | −19.473 | 0.40 | 1.60342 | 38.03 |
| 16 | 20.125 | 1.15 | 1.74320 | 49.29 |
| 17* | −17.070 | Variable | | |
| 18* | 10.632 | 1.38 | 1.52542 | 55.78 |
| 19 | 38.861 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane | ∞ | | | |

(Image pickup surface)
Aspherical surface data

10th surface

K = 0.000
A4 = −1.37600e−04, A6 = −2.97778e−06, A8 = −3.44388e−08

11th surface

K = 0.000
A4 = 7.33111e−05, A6 = −2.67414e−06

17th surface

K = 0.000
A4 = 8.08396e−05, A6 = 8.15239e−07

18th surface

K = 0.000
A4 = −9.67408e−05, A6 = −7.54455e−07, A8 = 2.45503e−08

Zoom data

| | Wide angle | Intermediate | Telephoto |
|---|---|---|---|
| Focal length | 5.05 | 9.50 | 19.49 |
| Fno. | 1.85 | 2.22 | 2.82 |
| Angle of field 2ω | 77.56 | 45.15 | 21.99 |
| fb (in air) | 5.34 | 6.84 | 8.50 |
| Lens total length (in air) | 45.02 | 41.43 | 50.20 |
| d2 | 0.30 | 4.91 | 14.26 |
| d8 | 19.58 | 7.86 | 1.15 |
| d17 | 3.33 | 5.35 | 9.82 |
| d19 | 3.82 | 5.31 | 6.97 |

Unit focal length

| f1 = 60.69 | f2 = −11.16 | f3 = 12.03 | f4 = 27.40 |

Example 4

Unit mm

Surface data

| Surface no. | r | d | nd | vd |
|---|---|---|---|---|
| Object plane | ∞ | ∞ | | |
| 1 | 28.889 | 0.60 | 1.84666 | 23.78 |
| 2 | 20.000 | 2.88 | 1.72916 | 54.68 |
| 3 | 208.957 | Variable | | |
| 4 | 77.769 | 0.70 | 1.88300 | 40.76 |
| 5 | 7.884 | 4.72 | | |
| 6 | −19.304 | 0.60 | 1.88300 | 40.76 |
| 7 | 77.522 | 0.20 | | |
| 8 | 25.964 | 1.58 | 1.92286 | 18.90 |
| 9 | −63.164 | Variable | | |
| 10 (stop) | ∞ | 1.10 | | |
| 11* | 8.590 | 2.31 | 1.80610 | 40.92 |
| 12* | −48.184 | 0.10 | | |
| 13 | 15.611 | 1.64 | 2.00069 | 25.46 |
| 14 | 47.686 | 0.40 | 1.80810 | 22.76 |
| 15 | 6.466 | 1.49 | | |
| 16 | −67.532 | 0.40 | 1.68893 | 31.07 |
| 17 | 5.514 | 2.62 | 1.61800 | 63.40 |
| 18* | −11.933 | Variable | | |
| 19 | −36.251 | 0.40 | 1.49700 | 81.54 |
| 20 | 25.420 | Variable | | |
| 21* | 13.202 | 1.90 | 1.58313 | 59.38 |
| 22 | −490.562 | 4.57 | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.50 | | |
| Image plane | ∞ | | | |

(Image pickup surface)
Aspherical surface data

11th surface

K = 0.000
A4 = −1.56695e−04, A6 = 8.23410e−07, A8 = −1.98009e−08

12th surface

K = 0.000
A4 = 1.89134e−04, A6 = 3.70857e−07, A8 = −1.08528e−08

18th surface

K = 0.000
A4 = −2.99070e−05, A6 = 1.75807e−06, A8 = −1.36656e−08

21th surface

K = 0.000
A4 = −4.43828e−05, A6 = 1.52765e−07, A8 = 3.77505e−08

Zoom data

| | Wide angle | Intermediate | Telephoto |
|---|---|---|---|
| Focal length | 5.06 | 11.08 | 24.29 |
| Fno. | 1.68 | 2.22 | 2.97 |
| Angle of field 2ω | 76.31 | 39.15 | 17.81 |
| fb (in air) | 6.10 | 9.33 | 4.80 |
| Lens total length (in air) | 53.44 | 50.13 | 57.73 |
| d3 | 0.30 | 6.80 | 16.00 |
| d9 | 21.21 | 7.30 | 1.45 |
| d18 | 1.20 | 1.68 | 10.85 |
| d20 | 2.00 | 2.39 | 2.00 |

Unit focal length f1 = 49.58   f2 = −9.53   f3 = 11.74   f4 = −30.00   f5 = 22.08

Example 5

Unit mm

Surface data

| Surface no. | r | d | nd | vd |
|---|---|---|---|---|
| Object plane | ∞ | ∞ | | |
| 1 | 25.744 | 0.65 | 1.94595 | 17.98 |
| 2 | 19.718 | 2.55 | 1.80400 | 46.57 |
| 3 | 250.000 | Variable | | |
| 4 | 65.024 | 0.40 | 1.91082 | 35.25 |
| 5 | 7.193 | 3.78 | | |
| 6* | −17.800 | 0.40 | 1.80610 | 40.88 |
| 7 | 40.605 | 0.40 | | |
| 8 | 20.930 | 1.61 | 1.94595 | 17.98 |
| 9 | −73.524 | Variable | | |
| 10 (stop) | ∞ | 1.10 | | |
| 11* | 8.465 | 1.77 | 1.74320 | 49.34 |
| 12* | 140.514 | 0.81 | | |
| 13 | 9.005 | 1.94 | 1.83481 | 42.71 |
| 14 | 583.497 | 0.40 | 1.84666 | 23.78 |
| 15 | 5.444 | 1.12 | | |
| 16 | 26.539 | 0.91 | 1.49700 | 81.54 |
| 17* | −40.105 | Variable | | |
| 18* | 11.498 | 1.45 | 1.52542 | 55.78 |
| 19 | 52.632 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane | ∞ | | | |

(Image pickup surface)
Aspherical surface data

6th surface

K = 0.000
A4 = −5.60812e−06, A6 = 1.47467e−08, A8 = −1.27786e−08

11th surface

K = 0.000
A4 = −1.12422e−04, A6 = −2.83973e−06, A8 = 2.92981e−08

12th surface

K = 0.000
A4 = 7.31733e−05, A6 = −2.82801e−06, A8 = 6.43179e−08

17th surface

K = 0.000
A4 = 3.19602e−07, A6 = 2.81612e−06

18th surface

K = 0.000
A4 = −1.36174e−04, A6 = 4.97578e−07

Zoom data

| | Wide angle | Intermediate | Telephoto |
|---|---|---|---|
| Focal length | 5.03 | 10.70 | 24.20 |
| Fno. | 1.85 | 2.24 | 2.83 |
| Angle of field 2ω | 75.21 | 39.88 | 17.73 |
| fb (in air) | 6.40 | 8.94 | 10.02 |
| Lens total length (in air) | 48.08 | 45.30 | 52.64 |
| d3 | 0.30 | 5.45 | 13.26 |
| d9 | 19.59 | 7.83 | 1.80 |
| d17 | 3.50 | 4.79 | 9.27 |
| d19 | 4.88 | 7.42 | 8.50 |

Unit focal length f1 = 37.61   f2 = −8.73   f3 = 12.65   f4 = 27.67

Example 6

Unit mm

Surface data

| Surface no. | r | d | nd | vd |
|---|---|---|---|---|
| Object plane | ∞ | ∞ | | |
| 1 | 27.332 | 0.65 | 1.94595 | 17.98 |
| 2 | 19.889 | 2.75 | 1.83481 | 42.71 |
| 3 | 231.126 | Variable | | |
| 4 | 78.762 | 0.40 | 1.91082 | 35.25 |
| 5 | 7.268 | 3.77 | | |
| 6 | −22.696 | 0.40 | 1.83481 | 42.71 |
| 7 | 36.446 | 0.30 | | |
| 8 | 18.632 | 1.65 | 1.94595 | 17.98 |
| 9 | −144.225 | Variable | | |
| 10(stop) | ∞ | 0.10 | | |
| 11* | 8.132 | 2.19 | 1.74320 | 49.34 |
| 12* | −31.189 | 0.59 | | |
| 13 | 17.117 | 1.94 | 1.91082 | 35.25 |
| 14 | −22.696 | 0.40 | 1.84666 | 23.78 |
| 15 | 5.835 | 1.30 | | |
| 16 | −21.739 | 0.88 | 1.49700 | 81.54 |
| 17* | −10.689 | Variable | | |
| 18* | 11.532 | 1.50 | 1.52542 | 55.78 |
| 19 | 58.824 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

Aspherical surface data

11th surface

K = 0.000
A4 = −2.03141e−04, A6 = −2.06946e−06, A8 = −3.64167e−08

12th surface

K = 0.000
A4 = 2.67444e−04, A6 = −4.23733e−06, A8 = 5.06036e−08

17th surface

K = 0.000
A4 = −3.17240e−04, A6 = 5.39901e−06, A8 = −7.22464e−07

18th surface

K = 0.000
A4 = −1.11797e−04, A6 = 6.20333e−07

Zoom data

| | Wide angle | Intermediate | Telephoto |
|---|---|---|---|
| Focal length | 5.03 | 10.70 | 24.20 |
| Fno. | 1.85 | 2.23 | 2.83 |
| Angle of field 2ω | 75.29 | 39.91 | 17.81 |
| fb (in air) | 6.20 | 8.69 | 10.03 |
| Lens total length(in air) | 49.18 | 46.13 | 53.31 |
| d3 | 0.30 | 5.63 | 13.59 |
| d9 | 20.36 | 8.17 | 1.80 |
| d17 | 3.50 | 4.82 | 9.07 |
| d19 | 4.65 | 7.15 | 8.50 |

Unit focal length f1 = 38.95  f2 = −8.97  f3 = 12.78  f4 = 27.00

Example 7

Unit mm

Surface data

| Surface no. | r | d | nd | vd |
|---|---|---|---|---|
| Object plane | ∞ | ∞ | | |
| 1 | 30.801 | 0.65 | 1.94595 | 17.98 |
| 2 | 19.462 | 2.33 | 1.91082 | 35.25 |
| 3 | 221.469 | Variable | | |
| 4 | 66.846 | 0.40 | 1.91082 | 35.25 |
| 5 | 6.458 | 3.43 | | |
| 6 | −24.711 | 0.40 | 1.91082 | 35.25 |
| 7 | 25.114 | 0.28 | | |
| 8 | 15.744 | 1.74 | 1.94595 | 17.98 |
| 9 | −82.384 | Variable | | |
| 10(stop) | ∞ | 0.10 | | |
| 11* | 6.485 | 2.11 | 1.74320 | 49.29 |
| 12* | −27.523 | 0.40 | | |
| 13 | 12.878 | 1.17 | 1.83481 | 42.71 |
| 14 | −76.395 | 0.40 | 1.84666 | 23.78 |
| 15 | 4.920 | 1.32 | | |
| 16 | −14.943 | 0.97 | 1.49700 | 81.54 |
| 17* | −7.709 | Variable | | |
| 18* | 10.579 | 1.18 | 1.52542 | 55.78 |
| 19 | 31.493 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.53 | | |
| Image plane (Image pickup surface) | ∞ | | | |

Aspherical surface data

11th surface

K = 0.000
A4 = −2.98400e−04, A6 = −4.77058e−06

12th surface

K = 0.000
A4 = 5.68408e−04, A6 = −1.01359e−05, A8 = 2.33434e−07

17th surface

K = 0.000
A4 = −3.00895e−04, A6 = 6.51196e−06

18th surface

K = 0.000
A4 = −1.48167e−04, A6 = 2.74589e−06

Zoom data

| | Wide angle | Intermediate | Telephoto |
|---|---|---|---|
| Focal length | 4.59 | 8.80 | 17.70 |
| Fno. | 1.85 | 2.21 | 2.75 |
| Angle of field 2ω | 81.31 | 47.97 | 24.25 |
| fb (in air) | 5.71 | 7.59 | 9.58 |
| Lens total length(in air) | 40.87 | 38.85 | 44.63 |
| d3 | 0.30 | 4.41 | 11.27 |
| d9 | 15.39 | 6.21 | 1.01 |
| d17 | 2.60 | 3.77 | 5.89 |
| d19 | 4.24 | 6.11 | 8.14 |

Unit focal length f1 = 40.00  f2 = −8.21  f3 = 10.69  f4 = 29.74

Example 8

Unit mm

Surface data

| Surface no. | r | d | nd | vd |
|---|---|---|---|---|
| Object plane | ∞ | ∞ | | |
| 1 | 32.414 | 2.00 | 1.49700 | 81.54 |
| 2 | −97.605 | Variable | | |
| 3 | 313.814 | 0.40 | 1.88300 | 40.76 |
| 4 | 7.277 | 3.10 | | |
| 5 | −23.619 | 0.40 | 1.88300 | 40.76 |
| 6 | 2994.422 | 0.20 | | |
| 7 | 17.053 | 1.45 | 1.92286 | 18.90 |
| 8 | 130.798 | Variable | | |
| 9(stop) | ∞ | 0.10 | | |
| 10* | 7.220 | 1.94 | 1.58313 | 59.38 |
| 11* | −28.414 | 0.50 | | |
| 12 | 7.159 | 1.70 | 1.88300 | 40.76 |
| 13 | 24.199 | 0.40 | 1.80810 | 22.76 |
| 14 | 4.288 | Variable | | |
| 15* | 10.186 | 1.60 | 1.52542 | 55.78 |
| 16 | 90.000 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane (Image pickup surface) | ∞ | | | |

Aspherical surface data

10th surface

K = 0.000
A4 = −3.37324e−04, A6 = 3.49675e−07, A8 = −2.71205e−07

11th surface

K = 0.000
A4 = 8.31355e−05, A6 = 1.91057e−06, A8 = −1.87205e−07

15th surface

K = 0.000
A4 = −1.64352e−04, A6 = 1.02631e−06, A8 = 1.53888e−08

Zoom data

| | Wide angle | Intermediate | Telephoto |
|---|---|---|---|
| Focal length | 5.02 | 9.74 | 19.28 |
| Fno. | 2.03 | 2.44 | 3.04 |
| Angle of field 2ω | 76.64 | 43.66 | 22.46 |
| fb (in air) | 4.91 | 7.21 | 10.72 |
| Lens total length(in air) | 43.20 | 40.99 | 47.14 |
| d2 | 0.30 | 5.30 | 11.83 |
| d8 | 18.60 | 7.84 | 1.44 |
| d14 | 5.59 | 6.85 | 9.36 |
| d16 | 3.39 | 5.68 | 9.19 |

Unit focal length f1 = 49.21    f2 = −9.72    f3 = 11.78    f4 = 21.71

Example 9

Unit mm

Surface data

| Surface no. | r | d | nd | vd |
|---|---|---|---|---|
| Object plane | ∞ | ∞ | | |
| 1 | 32.075 | 0.60 | 1.84666 | 23.78 |
| 2 | 23.000 | 2.84 | 1.72916 | 54.68 |
| 3 | −1300.138 | Variable | | |
| 4 | 233.228 | 0.70 | 1.88300 | 40.76 |
| 5 | 8.384 | 4.83 | | |
| 6 | −23.708 | 0.60 | 1.88300 | 40.76 |
| 7 | 50.710 | 0.20 | | |
| 8 | 23.688 | 1.57 | 1.92286 | 18.90 |
| 9 | −95.265 | Variable | | |
| 10(stop) | ∞ | 0.10 | | |
| 11* | 9.233 | 2.07 | 1.80610 | 40.92 |
| 12* | 7180.221 | 0.60 | | |
| 13 | 8.833 | 1.66 | 1.88300 | 40.76 |
| 14 | 67.747 | 0.40 | 1.80810 | 22.76 |
| 15 | 5.247 | 2.20 | | |
| 16 | 93.595 | 0.40 | 1.63980 | 34.46 |
| 17 | 9.237 | 1.37 | 1.58313 | 59.38 |
| 18* | −52.709 | Variable | | |
| 19* | 10.837 | 1.90 | 1.52542 | 55.78 |
| 20 | 70.000 | Variable | | |
| 21 | ∞ | 0.30 | 1.51633 | 64.14 |
| 22 | ∞ | 0.50 | | |
| 23 | ∞ | 0.50 | 1.51633 | 64.14 |
| 24 | ∞ | 0.50 | | |
| Image plane (Image pickup surface) | ∞ | | | |

Aspherical surface data

11th surface

K = 0.000
A4 = −1.31857e−04, A6 = −2.64640e−08, A8 = −3.53586e−08

12th surface

K = 0.000
A4 = 2.94426e−05, A6 = 3.87098e−07, A8 = −2.11287e−08

18th surface

K = 0.000
A4 = −4.19872e−05, A6 = 3.86970e−06, A8 = −2.50064e−07

19th surface

K = 0.000
A4 = −1.00184e−04, A6 = 5.05708e−07, A8 = −4.91562e−09

Zoom data

| | Wide angle | Intermediate | Telephoto |
|---|---|---|---|
| Focal length | 5.06 | 11.08 | 24.29 |
| Fno. | 1.66 | 2.11 | 2.75 |
| Angle of field 2ω | 76.37 | 38.77 | 17.77 |
| fb (in air) | 5.38 | 8.31 | 9.78 |
| Lens total length(in air) | 52.64 | 50.03 | 59.73 |
| d3 | 0.30 | 6.80 | 15.76 |
| d9 | 21.19 | 7.72 | 1.67 |
| d18 | 3.73 | 5.16 | 10.47 |
| d20 | 3.85 | 6.78 | 8.25 |

Unit focal length f1 = 45.73    f2 = −9.43    f3 = 13.35    f4 = 24.14

Example 10

Unit mm
Surface data

| Surface no. | r | d | nd | vd |
|---|---|---|---|---|
| Object plane | ∞ | ∞ | | |
| 1 | 25.351 | 0.60 | 1.94595 | 17.98 |
| 2 | 20.000 | 4.05 | 1.77250 | 49.60 |
| 3 | 126.326 | Variable | | |
| 4 | 48.078 | 0.40 | 1.88300 | 40.76 |
| 5 | 6.638 | 4.92 | | |
| 6* | −17.274 | 0.40 | 1.74320 | 49.34 |
| 7* | 60.049 | 0.39 | | |
| 8 | −120.845 | 1.33 | 1.94595 | 17.98 |
| 9 | −32.157 | 0.10 | | |
| 10 | 23.594 | 1.06 | 1.94595 | 17.98 |
| 11 | 42.083 | Variable | | |
| 12(stop) | ∞ | 0.10 | | |
| 13* | 9.377 | 2.52 | 1.85135 | 40.10 |
| 14* | −75.696 | 0.60 | | |
| 15 | 10.511 | 0.55 | 2.00069 | 25.46 |
| 16 | 7.380 | 0.40 | 1.92286 | 18.90 |
| 17 | 6.633 | 1.97 | | |
| 18 | −28.937 | 0.40 | 1.80810 | 22.76 |
| 19 | 12.534 | 2.79 | 1.58913 | 61.14 |
| 20 | −12.932 | 0.20 | | |
| 21 | −15.332 | 1.02 | 1.80610 | 40.92 |
| 22* | −11.942 | Variable | | |
| 23* | 11.827 | 2.42 | 1.49700 | 81.54 |
| 24 | 70.000 | Variable | | |
| 25 | ∞ | 0.30 | 1.51633 | 64.14 |
| 26 | ∞ | 0.50 | | |
| 27 | ∞ | 0.50 | 1.51633 | 64.14 |
| 28 | ∞ | 0.50 | | |
| Image plane (Image pickup surface) | ∞ | | | |

Aspherical surface data

6th surface $K = 0.000$
$A4 = -5.23081e-05, A6 = -9.36403e-07, A8 = -2.59551e-08,$
$A10 = -1.67452e-09$ 7th surface $K = 0.000$
$A4 = -1.61371e-04, A6 = 2.00053e-06, A8 = -1.86006e-07,$
$A10 = -1.78281e-09$ 13th surface $K = 0.000$
$A4 = -1.06873e-04, A6 = 8.66670e-07, A8 = -3.76373e-08,$
$A10 = 1.09596e-09$ 14th surface $K = 0.000$
$A4 = 1.84878e-04, A6 = -6.30759e-07, A8 = 3.67989e-08$ 22th surface $K = 0.000$
$A4 = -3.16628e-05, A6 = 3.28018e-07, A8 = -2.59225e-08$ 23th surface $K = 0.000$
$A4 = -3.63964e-05, A6 = 1.42219e-07, A8 = 2.20879e-09$

Zoom data

| | Wide angle | Intermediate | Telephoto |
|---|---|---|---|
| Focal length | 4.33 | 9.48 | 20.79 |
| Fno. | 1.41 | 1.81 | 2.30 |
| Angle of field 2ω | 85.58 | 45.24 | 20.83 |
| fb (in air) | 7.65 | 10.29 | 9.94 |
| Lens total length(in air) | 53.95 | 52.85 | 64.73 |
| d3 | 0.30 | 6.80 | 15.73 |
| d11 | 18.50 | 6.40 | 1.95 |
| d22 | 1.29 | 3.14 | 10.89 |
| d24 | 6.12 | 8.77 | 8.41 |

Unit focal length

| f1 = 43.30 | f2 = −7.75 | f3 = 14.11 | f4 = 28.24 |
|---|---|---|---|

Example 11

Unit mm
Surface data

| Surface no. | r | d | nd | vd |
|---|---|---|---|---|
| Object plane | ∞ | ∞ | | |
| 1 | 29.329 | 0.60 | 1.84666 | 23.78 |
| 2 | 20.000 | 2.67 | 1.72916 | 54.68 |
| 3 | 199.464 | Variable | | |
| 4 | 72.337 | 0.70 | 1.88300 | 40.76 |
| 5 | 7.875 | 5.24 | | |
| 6 | −22.605 | 0.60 | 1.88300 | 40.76 |
| 7 | 53.479 | 0.20 | | |
| 8 | 23.126 | 1.56 | 1.92286 | 18.90 |
| 9 | −102.060 | Variable | | |
| 10(stop) | ∞ | 0.10 | | |
| 11* | 8.608 | 2.38 | 1.85135 | 40.10 |
| 12* | −47.916 | 0.50 | | |
| 13 | 16.202 | 1.16 | 2.00069 | 25.46 |
| 14 | 153.120 | 0.40 | 1.80810 | 22.76 |
| 15 | 6.128 | 1.38 | | |
| 16 | −253.771 | 0.40 | 1.63893 | 31.07 |
| 17 | 5.385 | 2.78 | 1.61800 | 63.40 |
| 18* | −11.836 | Variable | | |
| 19 | −39.801 | 0.40 | 1.49700 | 81.54 |
| 20* | 23.921 | Variable | | |
| 21* | 15.309 | 1.70 | 1.58313 | 59.38 |
| 22 | −362.387 | 4.15 | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | | | |
| Image plane (Image pickup surface) | ∞ | | | |

Aspherical surface data

11th surface $K = 0.000$
$A4 = 1.71668e-04, A6 = 7.89953e-07, A8 = -2.03423e-08$ 12th surface $K = 0.000$
$A4 = 1.95242e-04, A6 = 3.35389e-07, A8 = -9.59960e-09$ 18th surface $K = 0.000$
$A4 = -7.09271e-05, A6 = 7.99792e-07, A8 = -8.04326e-08$ 20th surface $K = 0.000$
$A4 = 2.24056e-05, A6 = 5.35969e-06, A8 = -4.45368e-07$ -continued Unit mm 21th surface K = 0.000
A4 = −4.63026e−06, A6 = 3.29948e−06, A8 = −1.18044e−07,
A10 = 9.76282e−11

Zoom data

|  | Wide angle | Intermediate | Telephoto |
|---|---|---|---|
| Focal length | 4.98 | 10.90 | 23.90 |
| Fno. | 1.63 | 2.09 | 2.89 |
| Angle of field 2ω | 77.23 | 39.64 | 18.03 |
| fb (in air) | 5.67 | 8.83 | 3.91 |
| Lens total length(in air) | 52.69 | 49.32 | 57.49 |
| d3 | 0.30 | 6.80 | 16.00 |
| d9 | 20.74 | 6.87 | 1.45 |
| d18 | 1.20 | 1.69 | 7.90 |
| d20 | 2.00 | 2.35 | 5.46 |

Unit focal length

| f1 = 51.14 | f2 = −9.51 | f3 = 11.32 | f4 = −30.00 | f5 = 25.23 |
|---|---|---|---|---|

Aberration diagrams at the time of infinite object point focusing of the embodiments from the first embodiment to the eleventh embodiment are shown in diagrams from FIG. 12A to FIG. 22L. In the aberration diagrams, ω represents the half angle of view.

FIG. 12A to FIG. 12L are aberration diagrams at the time of infinite object point focusing in the first embodiment, where, FIG. 12A, FIG. 12B, FIG. 12C, and FIG. 12D indicate spherical aberration (SA), astigmatism (AS), distortion (DT), and chromatic aberration of magnification (CC) in a wide angle end state, FIG. 12E, FIG. 12F, FIG. 12G, and FIG. 12H indicate spherical aberration, astigmatism, distortion, and chromatic aberration of magnification in an intermediate focal length state, and FIG. 12I, FIG. 12J, FIG. 12K, and FIG. 12L indicate spherical aberration, astigmatism, distortion, and chromatic aberration of magnification in a telephoto end state.

FIG. 13A to FIG. 13L are aberration diagrams at the time of infinite object point focusing in the second embodiment, where, FIG. 13A, FIG. 13B, FIG. 13C, and FIG. 13D indicate spherical aberration, astigmatism, distortion, and chromatic aberration of magnification in a wide angle end state, FIG. 13E, FIG. 13F, FIG. 13G, and FIG. 13H indicate spherical aberration, astigmatism, distortion, and chromatic aberration of magnification in an intermediate focal length state, and FIG. 13I, FIG. 13J, FIG. 13K, and FIG. 13L indicate spherical aberration, astigmatism, distortion, and chromatic aberration of magnification in a telephoto end state.

FIG. 14A to FIG. 14L are aberration diagrams at the time of infinite object point focusing in the third embodiment, where, FIG. 14A, FIG. 14B, FIG. 14C, and FIG. 14D indicate spherical aberration, astigmatism, distortion, and chromatic aberration of magnification in a wide angle end state, FIG. 14E, FIG. 14F, FIG. 14G, and FIG. 14H indicate spherical aberration, astigmatism, distortion, and chromatic aberration of magnification in an intermediate focal length state, and FIG. 14I, FIG. 14J, FIG. 14K, and FIG. 14L indicate spherical aberration, astigmatism, distortion, and chromatic aberration of magnification in a telephoto end state.

FIG. 15A to FIG. 15L are aberration diagrams at the time of infinite object point focusing in the fourth embodiment, where, FIG. 15A, FIG. 15B, FIG. 15C, and FIG. 15D indicate spherical aberration, astigmatism, distortion, and chromatic aberration of magnification in a wide angle end state, FIG. 15E, FIG. 15F, FIG. 15G, and FIG. 15H indicate spherical aberration, astigmatism, distortion, and chromatic aberration of magnification in an intermediate focal length state, and FIG. 15I, FIG. 15J, FIG. 15K, and FIG. 15L indicate spherical aberration, astigmatism, distortion, and chromatic aberration of magnification in a telephoto end state.

FIG. 16A to FIG. 16L are aberration diagrams at the time of infinite object point focusing in the fifth embodiment, where, FIG. 16A, FIG. 16B, FIG. 16C, and FIG. 16D indicate spherical aberration, astigmatism, distortion, and chromatic aberration of magnification in a wide angle end state, FIG. 16E, FIG. 16F, FIG. 16G, and FIG. 16H indicate spherical aberration, astigmatism, distortion, and chromatic aberration of magnification in an intermediate focal length state, and FIG. 16I, FIG. 16J, FIG. 16K, and FIG. 16L indicate spherical aberration, astigmatism, distortion, and chromatic aberration of magnification in a telephoto end state.

FIG. 17A to FIG. 17L are aberration diagrams at the time of infinite object point focusing in the sixth embodiment, where, FIG. 17A, FIG. 17B, FIG. 17C, and FIG. 17D indicate spherical aberration, astigmatism, distortion, and chromatic aberration of magnification in a wide angle end state, FIG. 17E, FIG. 17F, FIG. 17G, and FIG. 17H indicate spherical aberration, astigmatism, distortion, and chromatic aberration of magnification in an intermediate focal length state, and FIG. 17I, FIG. 17J, FIG. 17K, and FIG. 17L indicate spherical aberration, astigmatism, distortion, and chromatic aberration of magnification in a telephoto end state.

FIG. 18A to FIG. 18L are aberration diagrams at the time of infinite object point focusing in the seventh embodiment, where, FIG. 18A, FIG. 18B, FIG. 18C, and FIG. 18D indicate spherical aberration, astigmatism, distortion, and chromatic aberration of magnification in a wide angle end state, FIG. 18E, FIG. 18F, FIG. 18G, and FIG. 18H indicate spherical aberration, astigmatism, distortion, and chromatic aberration of magnification in an intermediate focal length state, and FIG. 18I, FIG. 18J, FIG. 18K, and FIG. 18L indicate spherical aberration, astigmatism, distortion, and chromatic aberration of magnification in a telephoto end state.

FIG. 19A to FIG. 19L are aberration diagrams at the time of infinite object point focusing in the eighth embodiment, where, FIG. 19A, FIG. 19B, FIG. 19C, and FIG. 19D indicate spherical aberration, astigmatism, distortion, and chromatic aberration of magnification in a wide angle end state, FIG. 19E, FIG. 19F, FIG. 19G, and FIG. 19H indicate spherical aberration, astigmatism, distortion, and chromatic aberration of magnification in an intermediate focal length state, and FIG. 19I, FIG. 19J, FIG. 19K, and FIG. 19L indicate spherical aberration, astigmatism, distortion, and chromatic aberration of magnification in a telephoto end state.

FIG. 20A to FIG. 20L are aberration diagrams at the time of infinite object point focusing in the ninth embodiment, where, FIG. 20A, FIG. 20B, FIG. 20C, and FIG. 20D indicate spherical aberration, astigmatism, distortion, and chromatic aberration of magnification in a wide angle end state, FIG. 20E, FIG. 20F, FIG. 20G, and FIG. 20H indicate spherical aberration, astigmatism, distortion, and chromatic aberration of magnification in an intermediate focal length state, and FIG. 20I, FIG. 20J, FIG. 20K, and FIG. 20L indicate spherical aberration, astigmatism, distortion, and chromatic aberration of magnification in a telephoto end state.

FIG. 21A to FIG. 21L are aberration diagrams at the time of infinite object point focusing in the tenth embodiment, where, FIG. 21A, FIG. 21B, FIG. 21C, and FIG. 21D indicate spherical aberration, astigmatism, distortion, and chromatic aberration of magnification in a wide angle end state, FIG. 21E, FIG. 21F, FIG. 21G, and FIG. 21H indicate spherical aberration, astigmatism, distortion, and chromatic aberration of magnification in an intermediate focal length state, and FIG. 21I, FIG. 21J, FIG. 21K, and FIG. 21L indicate spherical aberration, astigmatism, distortion, and chromatic aberration of magnification in a telephoto end state.

FIG. 22A to FIG. 22L are aberration diagrams at the time of infinite object point focusing in the eleventh embodiment, where, FIG. 22A, FIG. 22B, FIG. 22C, and FIG. 22D indicate spherical aberration, astigmatism, distortion, and chromatic aberration of magnification in a wide angle end state, FIG. 22E, FIG. 22F, FIG. 22G, and FIG. 22H indicate spherical aberration, astigmatism, distortion, and chromatic aberration of magnification in an intermediate focal length state, and FIG. 22I, FIG. 22J, FIG. 22K, and FIG. 22L indicate spherical aberration, astigmatism, distortion, and chromatic aberration of magnification in a telephoto end state.

Next, parameter and values of conditional expressions in each embodiments are described.

| | Conditional expressions | Example 1 | Example 2 | Example 3 | Example 4 |
|---|---|---|---|---|---|
| (1) | \|f3_2p/f3_2n\| | 1.75 | 2.28 | 1.58 | 2.43 |
| (2) | nd3_2p − nd3_2n | 0.07 | 0.03 | 0.04 | 0.19 |
| (3) | nd3_2n | 1.81 | 1.85 | 1.81 | 1.85 |
| (4) | Σd3G/ft | 0.22 | 0.29 | 0.37 | 0.37 |
| (5) | f3_1/f3 | 0.83 | 0.71 | 0.92 | 0.78 |
| (6) | \|f3_2/f3\| | 1.92 | 0.97 | 2.15 | 1.51 |
| (7) | \|f3_1/f3_2\| | 2.30 | 1.37 | 2.35 | 1.92 |
| (8) | f3/fw | 2.31 | 2.51 | 2.38 | 2.32 |
| (9) | Lt/ft | 2.44 | 2.19 | 2.58 | 2.38 |
| (10) | nd3_2p | 1.88 | 1.83 | 1.88 | 2.00 |
| (11) | (β2t/β2w)/(β3t/β3w) | 0.36 | 0.61 | 0.43 | 0.64 |

| | Conditional expressions | Example 5 | Example 6 | Example 7 | Example 8 |
|---|---|---|---|---|---|
| (21) | d3_12air/Σd3_12 | 0.16 | 0.11 | 0.10 | 0.11 |
| (22) | f3/fw | 2.51 | 2.54 | 2.33 | 2.34 |
| (23) | f3_1/f3 | 0.95 | 0.70 | 0.68 | 0.86 |
| (24) | \|f3_2/f3\| | 1.78 | 0.98 | 0.96 | 2.03 |
| (25) | \|f3_2/f3_1\| | 1.87 | 1.41 | 1.41 | 2.37 |
| (26) | Σd3G/ft | 0.29 | 0.30 | 0.36 | 0.24 |
| (27) | Lt/ft | 2.18 | 2.20 | 2.52 | 2.44 |
| (28) | (β2t/β2w)/(β3t_β3w) | 0.65 | 0.63 | 0.54 | 0.33 |

| | Conditional expressions | Example 9 | Example 10 | Example 11 |
|---|---|---|---|---|
| (21) | d3_12air/Σd3_12 | 0.13 | 0.15 | 0.11 |
| (22) | f3/fw | 2.64 | 3.26 | 2.27 |
| (23) | f3_1/f3 | 0.86 | 0.70 | 0.77 |
| (24) | \|f3_2/f3\| | 1.96 | 1.47 | 1.36 |
| (25) | \|f3_2/f3_1\| | 2.29 | 2.09 | 1.76 |
| (26) | Σd3G/ft | 0.36 | 0.50 | 0.38 |
| (27) | Lt/ft | 2.46 | 3.11 | 2.41 |
| (28) | (β2t/β2w)/(β3t/β3w) | 0.53 | 0.70 | 0.66 |

(Correction of Distortion)

Incidentally, when the zoom lens system of the present invention is used, a digital correction of distortion of an image is carried out electrically. A basic concept for the digital correction of the distortion of an image will be described below.

Figure 23:
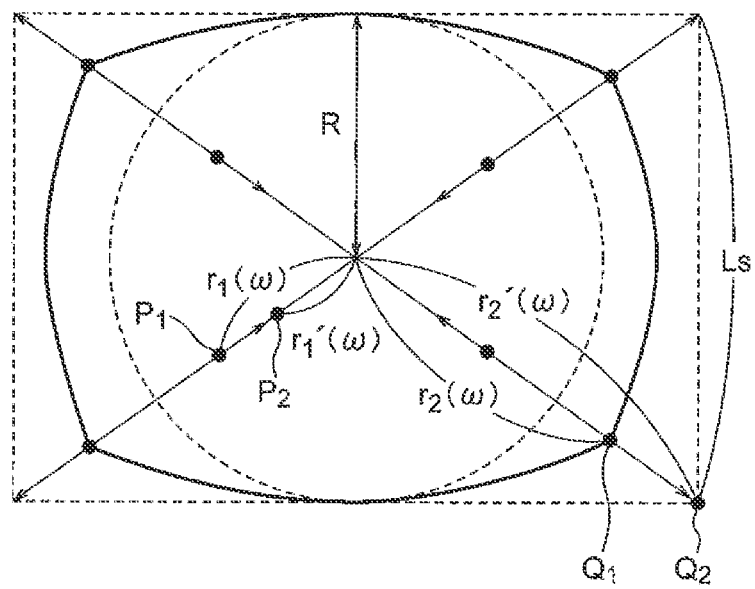
FIG. 23 is a diagram explaining a correction of distortion.

For example, as shown in FIG. 23, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, distortion of an image is corrected by moving each point on a circumference (image height) of an arbitrary radius $r(\omega)$ other than the radius R in a substantial direction of radiation. In concrete terms, the correction is carried out by moving the point on the circumference on a concentric circle such that the arbitrary radius $r(\omega)$ becomes $r'(\omega)$.

For example, in FIG. 23, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega$$

where, $\omega$ is a half image angle of an object, f is a focal length of an imaging optical system (the zoom lens system in the present invention), and $\alpha$ is not less than 0 and not more than 1.

Here, when an ideal image height corresponding to a circle (image height) of radius R is let to be Y, then $$\alpha = R/Y = R/(f \tan \omega).$$

The optical system, ideally, is rotationally symmetric with respect to an optical axis. Accordingly, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, such method is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging optical system, the relationship becomes $$f > y/\tan \omega.$$

In other words, when the focal length f of the imaging optical system, and the image height y are let to be fixed, a value of ω becomes large.

(Digital Camera)

Figure 24:
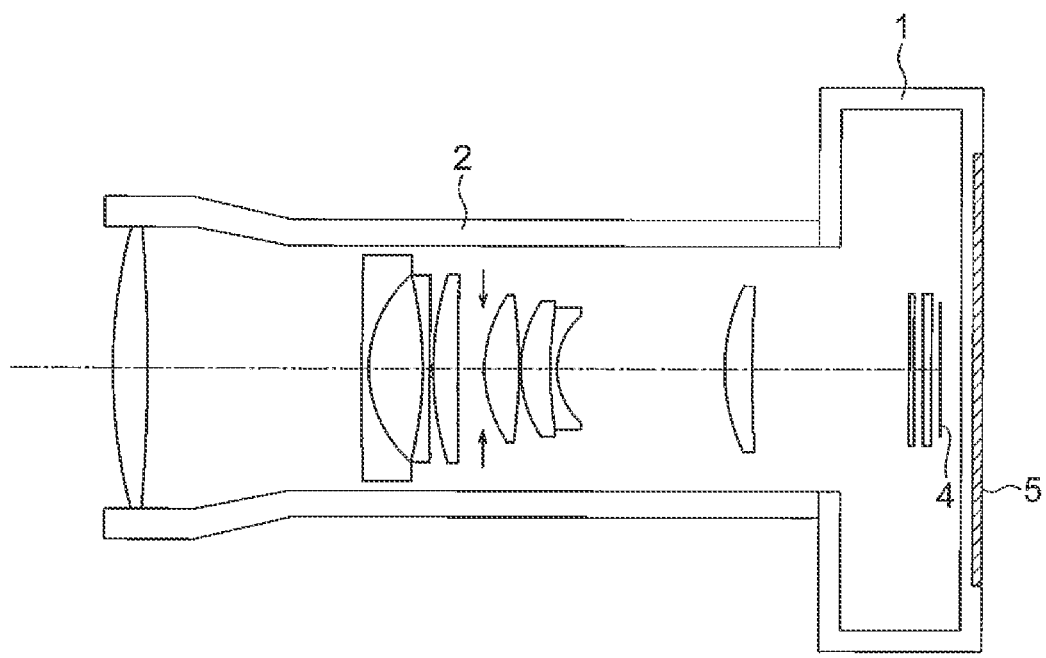
FIG. 24 is a cross-sectional view of a compact camera as an image pickup apparatus in which, the zoom lens according to the present invention is used, and a small-size CCD or a CMOS is used as an image pickup element

FIG. 24 is a cross-sectional view of a compact camera 1 as an image pickup apparatus in which, the zoom lens according to the present invention is used, and a small-size CCD (charge coupled device) or a CMOS (complementary metal oxide semiconductor) is used. An image pickup lens system 2 is disposed inside a lens barrel of the compact camera 1, and an image pickup element surface 4, and a back monitor 5 are disposed inside a camera body.

Here, it is also possible to let the image pickup lens system 2 to be detachable from a single-lens mirrorless camera by providing a mounting portion to the lens barrel. As the mounting portion, for example, a screw type mount or a bayonet type mount could be used.

Moreover, the compact camera 1 has a driving section which is a mechanism for driving a field lens and an image pickup device integrally. By the driving section, small-sizing of the zoom lens portion can be achieved easily and influence of ghost can be depressed.

The zoom lens described in the embodiments from the first embodiment to the eighth embodiment is to be used as the image pickup lens system 2 of the compact camera 1 having such structure.

Figure 25:
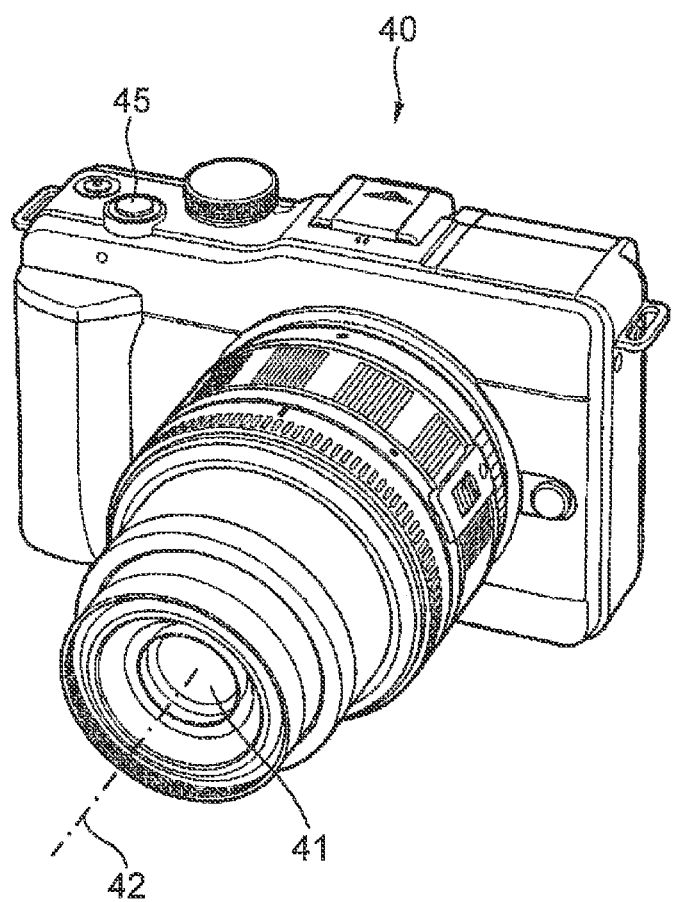
FIG. 25 is a front perspective view showing an appearance of a digital camera as an image pickup apparatus.
Figure 26:
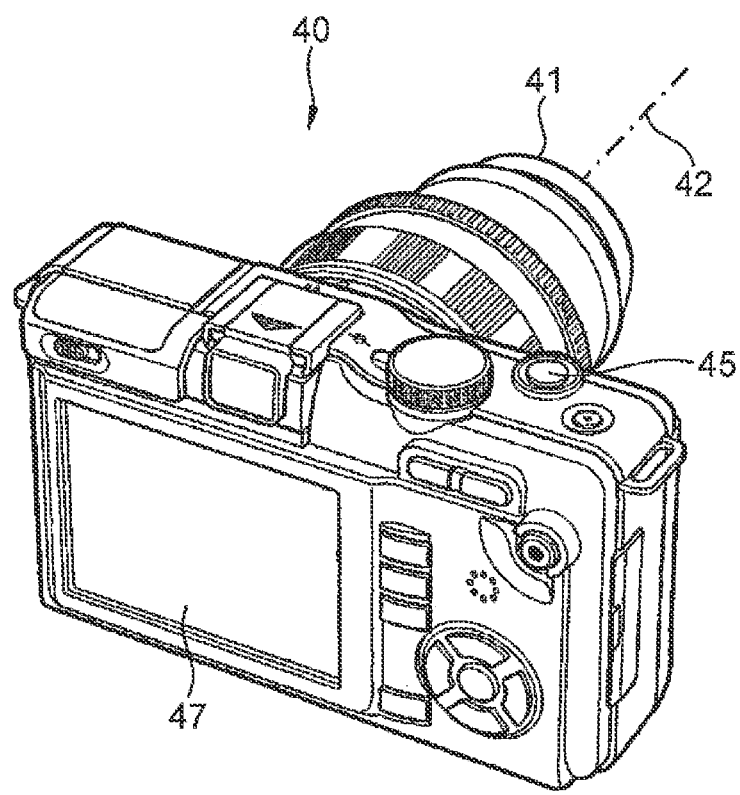
FIG. 26 is a rear perspective view showing an appearance of a digital camera as an image pickup apparatus.

FIG. 25 and FIG. 26 show conceptual diagrams of a structure of the image pickup apparatus according to the present invention in which, the zoom lens has been incorporated in a photographic optical system 41. FIG. 25 is a front perspective view showing an appearance of a digital camera 40 as an image pickup apparatus, and FIG. 26 is a rear perspective view showing an appearance of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the zoom lens according to the first embodiment. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera 40 by a processing unit. Moreover, it is possible to record the electronic image which has been captured in a recording unit.

(Internal Circuit Structure)

Figure 27:
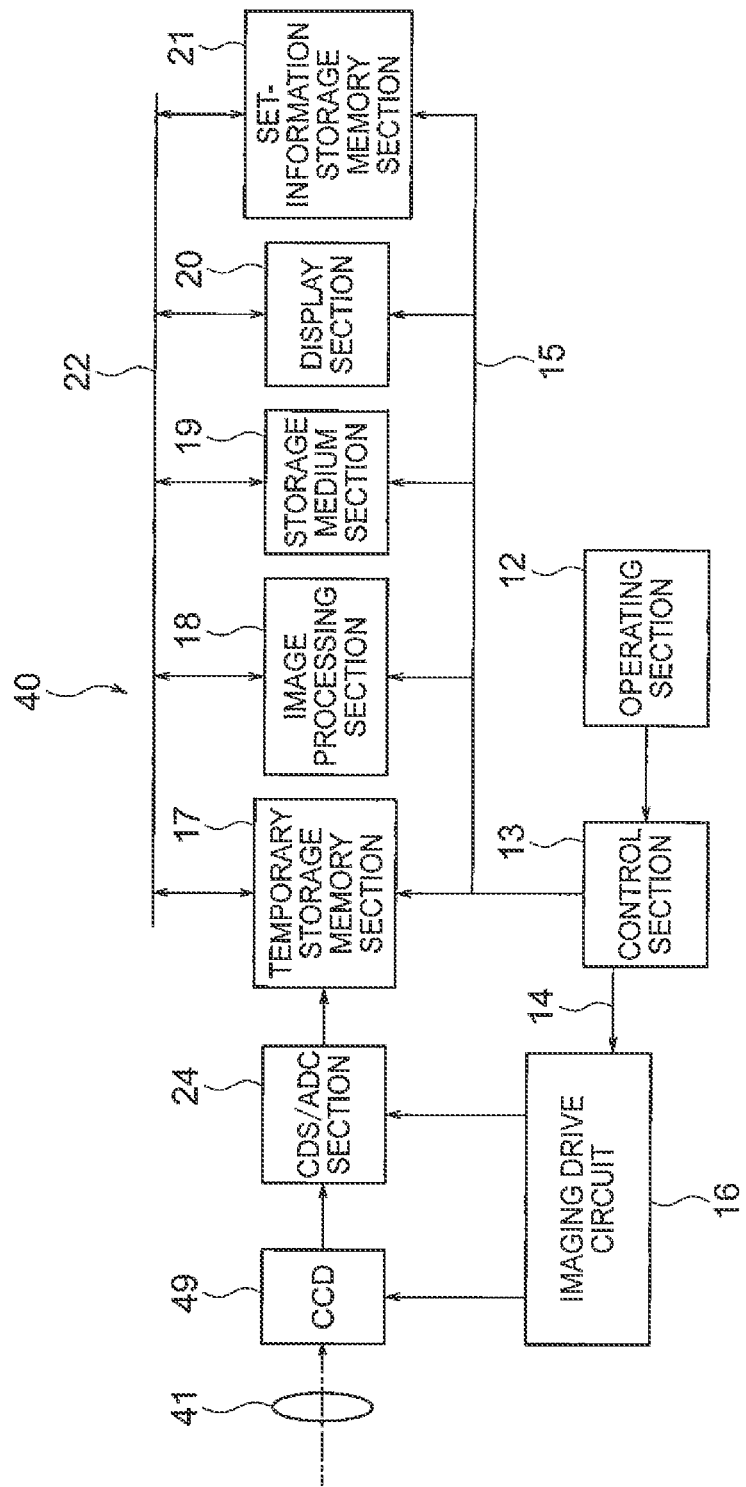
FIG. 27 is a block diagram showing an internal circuit of main sections of the digital camera.

FIG. 27 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium As shown in FIG. 27, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the zoom lens according to the present invention as the photographic optical system 41, enables to provide an image pickup apparatus in which a fluctuation of aberration can be prevented and space in the optical axial direction can be used efficiently while the angle is widened and high zoom ratio.

In the digital camera 40 which has been structured as described above, by adopting the zoom lens according to the present invention as the photographic optical system 41, the zooming is possible. Also, it is possible to set a first mode which enables focusing including (focusing) at infinity and a second mode which enables to achieve a large (high) magnification ratio of image, thereby making it possible to let to be an image pickup apparatus which is advantageous for achieving both, a small-sizing and high performance.

As it has been described above, the zoom lens and the image pickup apparatus according to the present invention are useful for a zoom lens and an image pickup apparatus which have a high aberration performance and a compact structure, while being a zoom lens with a small F-number (large aperture) and high zooming.

The present invention shows an effect that it is possible to provide a zoom lens which has a high aberration performance and a compact structure, while being a zoom lens with a large aperture and high zooming, and an image pickup apparatus using such zoom lens.

What is claimed is:

1. A zoom lens comprising in order from an object side:
a first lens unit having a positive refractive power;
a second lens unit having a negative refractive power; and
a third lens unit having a positive refractive power, wherein
the third lens unit having a positive refractive power comprises in order from the object side,
a first lens component having a positive refractive power, and
a second lens component having a negative refractive power in which, a lens having a positive refractive power and a lens having a negative refractive power are cemented, and
the zoom lens satisfies the following conditional expressions (1), (2), and (3)

$$1.4 < |f_{3\_2p}/f_{3\_2n}| < 2.6 \quad (1)$$

$$n_{d3\_2p} - n_{d3\_2n} \geq 0 \quad (2)$$

$$n_{d3\_2n} \geq 1.8 \quad (3)$$

where,
$f_{3\_2p}$ denotes a focal length of the lens having a positive refractive power, in the second lens component having a negative refractive power, in the third lens unit having a positive refractive power,
$f_{3\_2n}$ denotes a focal length of the lens having a negative refractive power, in the second lens component having a negative refractive power, in the third lens unit having a positive refractive power,
$n_{d3\_2p}$ denotes a refractive index for a d-line of the lens having a positive refractive power, in the second lens component having a negative refractive power, in the third lens unit having a positive refractive power, and
$n_{d3\_2n}$ denotes a refractive index for the d-line of the lens having a negative refractive power, in the second lens component having a negative refractive power, in the third lens unit having a positive refractive power.

2. The zoom lens according to claim 1, wherein the zoom lens satisfies the following conditional expression (5)

$$0.6 < |f_{3\_1}/f_3| < 1.2 \quad (5)$$

where,
$f_{3\_1}$ denotes a focal length of the first lens component having a positive refractive power, in the third lens unit, and
$f_3$ denotes a focal length of the third lens unit.

3. The zoom lens according to claim 1, wherein the zoom lens satisfies the following conditional expression (6)

$$0.7 < |f_{3\_2}/f_3| < 3 \quad (6)$$

where, $f_{3\_2}$ denotes a focal length of the second lens component having a negative refractive power, in the third lens unit, and $f_3$ denotes a focal length of the third lens unit.

4. The zoom lens according to claim 1, wherein the zoom lens satisfies the following conditional expression (7)

$$1<|f_{3\_2}/f_{3\_1}|<4 \qquad (7)$$

where, $f_{3\_1}$ denotes a focal length of the first lens component having a positive refractive power, in the third lens unit, and $f_{3\_2}$ denotes a focal length of the second lens component having a negative refractive power, in the third lens unit.

5. The zoom lens according to claim 1, wherein the zoom lens satisfies the following conditional expression (8)

$$2<|f_3/f_w|<4 \qquad (8)$$

where, $f_3$ denotes a focal length of the third lens unit, and $f_w$ denotes a focal length at a wide angle end of an overall zoom lens system.

6. The zoom lens according to claim 1, wherein the zoom lens satisfies the following conditional expression (4)

$$\Sigma d_{3G}/f_t<0.42 \qquad (4)$$

where, $\Sigma d_{3G}$ denotes a total length of the third lens unit, and $f_t$ denotes a focal length at the telephoto end of the overall zoom lens system.

7. The zoom lens according to claim 1, wherein the zoom lens satisfies the following conditional expression (9)

$$L_t/f_t<2.7 \qquad (9)$$

where, $L_t$ denotes a total length at a telephoto end of the overall zoom lens system, and $f_t$ denotes a focal length at the telephoto end of the overall zoom lens system.

8. The zoom lens according to claim 1, wherein the zoom lens satisfies the following conditional expression (10)

$$n_{d3\_2p} \geq 1.8 \qquad (10)$$

where, $n_{d3\_2p}$ denotes the refractive index for the d-line of the lens having a positive refractive power, in the second lens component having a negative refractive power, in the third lens unit having a positive refractive power.

9. The zoom lens according to claim 1, wherein the zoom lens satisfies the following conditional expression (11)

$$0.3<(\beta_{2t}/\beta_{2w})/(\beta_{3t}/\beta_{3w})<0.7 \qquad (11)$$

where, $\beta_{2t}$ denotes a lateral magnification at a telephoto end of the second lens unit, $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

10. An image pickup apparatus comprising:

a zoom lens according to claim 1; and an image pickup element which is disposed on an image side of the zoom lens, and which has an image pickup surface which receives an image by the zoom lens.

* * * * *